US012619995B2

(12) United States Patent
Srivastava et al.

(10) Patent No.: US 12,619,995 B2
(45) Date of Patent: *May 5, 2026

(54) DETECTING AND PREVENTING DUPLICATE TRANSACTIONS ON A TRANSACTION EXCHANGE PLATFORM

(71) Applicant: Capital One Services, LLC, McLean, VA (US)

(72) Inventors: Nishant Srivastava, Glen Allen, VA (US); Eric K. Barnum, Midlothian, VA (US); Suresh Chander Ramaraj, Glen Allen, VA (US); Eric Smith, Henrico, VA (US); Earle Michael Lee, Midlothian, VA (US); Kumari Bhawprita, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/882,278

(22) Filed: Sep. 11, 2024

(65) Prior Publication Data

US 2025/0005588 A1 Jan. 2, 2025

Related U.S. Application Data

(63) Continuation of application No. 18/149,544, filed on Jan. 3, 2023, now Pat. No. 12,118,567, which is a
(Continued)

(51) Int. Cl.
*G06F 11/14* (2026.01)
*G06F 11/07* (2006.01)
(Continued)

(52) U.S. Cl.
CPC ....... *G06Q 20/425* (2013.01); *G06F 11/0745* (2013.01); *G06F 11/0757* (2013.01);
(Continued)

(58) Field of Classification Search
CPC ............. G06F 11/0745; G06F 11/0757; G06F 16/2379; G06F 11/07; G06F 16/23; G06Q 20/401
See application file for complete search history.

(56) References Cited

U.S. PATENT DOCUMENTS 5,596,754 A 1/1997 Lomet
7,110,969 B1 9/2006 Bennett et al.
(Continued)

FOREIGN PATENT DOCUMENTS

CN 108052996 A 5/2018
CN 111666291 A 9/2020

OTHER PUBLICATIONS

Rimma Nehme, Efficient Query Processing for Rich and Diverse Real-Time Data, Purdue University, Jun. 10, 2009 (Year: 2009).
(Continued)

*Primary Examiner* — Maher N Algibhah
(74) *Attorney, Agent, or Firm* — Banner & Witcoff, Ltd.

(57) ABSTRACT

Aspects described herein may relate to a transaction exchange platform using a streaming data platform (SDP) and microservices to process transactions according to review and approval workflows. The transaction exchange platform may receive transactions from origination sources, which may be added to the SDP as transaction objects. As the transactions are received, the transactions may be analyzed to detect duplicate transactions and/or errors in the transactions. The transaction exchange platform may take steps to remediate transactions that are recognized as duplicates or predicted to generate one or more errors. Similarly, the transaction exchange platform may take steps to remediate transactions that are rejected by a clearinghouse.

20 Claims, 26 Drawing Sheets

Related U.S. Application Data continuation-in-part of application No. 17/389,045, filed on Jul. 29, 2021, now Pat. No. 11,562,368, which is a continuation of application No. 16/723,545, filed on Dec. 20, 2019, now Pat. No. 11,080,120.

(51) Int. Cl.

| | | |
|---|---|---|
| *G06F 11/1474* | (2026.01) | |
| *G06F 16/23* | (2019.01) | |
| *G06Q 20/08* | (2012.01) | |
| *G06Q 20/40* | (2012.01) | |
| *G06Q 20/42* | (2012.01) | |

(52) U.S. Cl.
CPC ...... *G06F 11/1405* (2013.01); *G06F 11/1474* (2013.01); *G06F 16/2379* (2019.01); *G06Q 20/085* (2013.01); *G06Q 20/401* (2013.01)

(56) References Cited

U.S. PATENT DOCUMENTS

| | | | |
|---|---|---|---|
| 9,092,447 | B1 | 7/2015 | Anderson et al. |
| 9,477,955 | B2 | 10/2016 | Goncalves |
| 9,754,318 | B1 | 9/2017 | Spies et al. |
| 10,129,078 | B2 | 11/2018 | Kumar et al. |
| 10,474,977 | B2 | 11/2019 | Stevens et al. |
| 10,839,022 | B1 | 11/2020 | Klein et al. |
| 2005/0015425 | A1 | 1/2005 | Kumar et al. |
| 2006/0149611 | A1* | 7/2006 | Diep ....................... G06F 9/542 709/226 |
| 2007/0100961 | A1 | 5/2007 | Moore |
| 2007/0185872 | A1 | 8/2007 | Ho et al. |
| 2007/0276714 | A1 | 11/2007 | Beringer |
| 2007/0288459 | A1 | 12/2007 | Kashiyama et al. |
| 2007/0288635 | A1 | 12/2007 | Gu et al. |
| 2008/0010198 | A1 | 1/2008 | Eliscu |
| 2009/0313311 | A1 | 12/2009 | Hoffmann et al. |
| 2010/0138438 | A1 | 6/2010 | Torikai et al. |
| 2010/0232286 | A1 | 9/2010 | Takahashi et al. |
| 2011/0047054 | A1 | 2/2011 | Ginter et al. |
| 2012/0030094 | A1 | 2/2012 | Khalil |
| 2012/0310881 | A1 | 12/2012 | Shadmon |
| 2013/0152021 | A1 | 6/2013 | Hatfield et al. |
| 2013/0152041 | A1 | 6/2013 | Hatfield et al. |
| 2014/0006273 | A1 | 1/2014 | Gopinath et al. |
| 2014/0372394 | A1 | 12/2014 | Frankel et al. |
| 2015/0088756 | A1 | 3/2015 | Makhotin et al. |
| 2015/0379514 | A1 | 12/2015 | Poole |
| 2016/0004751 | A1 | 1/2016 | Lafuente Alvarez et al. |
| 2016/0035014 | A1 | 2/2016 | Smith |
| 2016/0092488 | A1 | 3/2016 | Sun et al. |
| 2016/0110687 | A1 | 4/2016 | Kamat et al. |
| 2016/0124742 | A1 | 5/2016 | Rangasamy et al. |
| 2016/0253645 | A1 | 9/2016 | Ciabarra et al. |
| 2016/0307190 | A1 | 10/2016 | Zarakas et al. |
| 2017/0011373 | A1 | 1/2017 | Todasco |
| 2017/0041189 | A1 | 2/2017 | Aswathanarayana et al. |
| 2018/0032534 | A1 | 2/2018 | Koerner et al. |
| 2018/0077038 | A1 | 3/2018 | Leff et al. |
| 2018/0101848 | A1 | 4/2018 | Castagna et al. |
| 2018/0307514 | A1 | 10/2018 | Koutyrine et al. |
| 2018/0332138 | A1 | 11/2018 | Liu et al. |
| 2019/0043207 | A1 | 2/2019 | Carranza et al. |
| 2019/0199626 | A1* | 6/2019 | Thubert ................. H04L 47/19 |
| 2019/0333069 | A1 | 10/2019 | Noble et al. |
| 2019/0347080 | A1 | 11/2019 | Benjamin et al. |
| 2019/0347667 | A1 | 11/2019 | Zhang |
| 2020/0004604 | A1 | 1/2020 | Lavoie et al. |
| 2020/0241944 | A1 | 7/2020 | Derdak et al. |
| 2020/0257676 | A1 | 8/2020 | Zhang et al. |
| 2020/0310830 | A1 | 10/2020 | Morgan et al. |
| 2021/0192515 | A1 | 6/2021 | Lee et al. |
| 2021/0357947 | A1 | 11/2021 | Lee et al. |

OTHER PUBLICATIONS

Nov. 25, 2020—Final Rejection—U.S. Appl. No. 16/723,545.
Oct. 16, 2020—Final Rejection—U.S. Appl. No. 16/723,509.
Feb. 1, 2021—Notice of Allowance—U.S. Appl. No. 16/723,439.
Rathnayake, A Realtime Monitoring Platform forWorkflow Subroutines, 2018 IEEE (Year: 2018).
Feb. 12, 2021—Notice of Allowance—U.S. Appl. No. 16/723,509.
Apr. 1, 2021—International Search Report and Written Opinion—PCT/US2020/065979.
Mar. 21, 2024—(WO) International Search Report and Written Opinion—App No. PCT/US2023/085884.
Anonymous: "Documentation : Redis", Jan. 3, 2023, XP093137739, https://redis.io/docs, pp. 1-65.
Apr. 3, 2024—(WO) International Search Report and Written Opinion—App No. PCT/US2023/082686.
May 13, 2024—(WO) International Search Report and Written Opinion—App No. PCT/US2023/085366.

\* cited by examiner

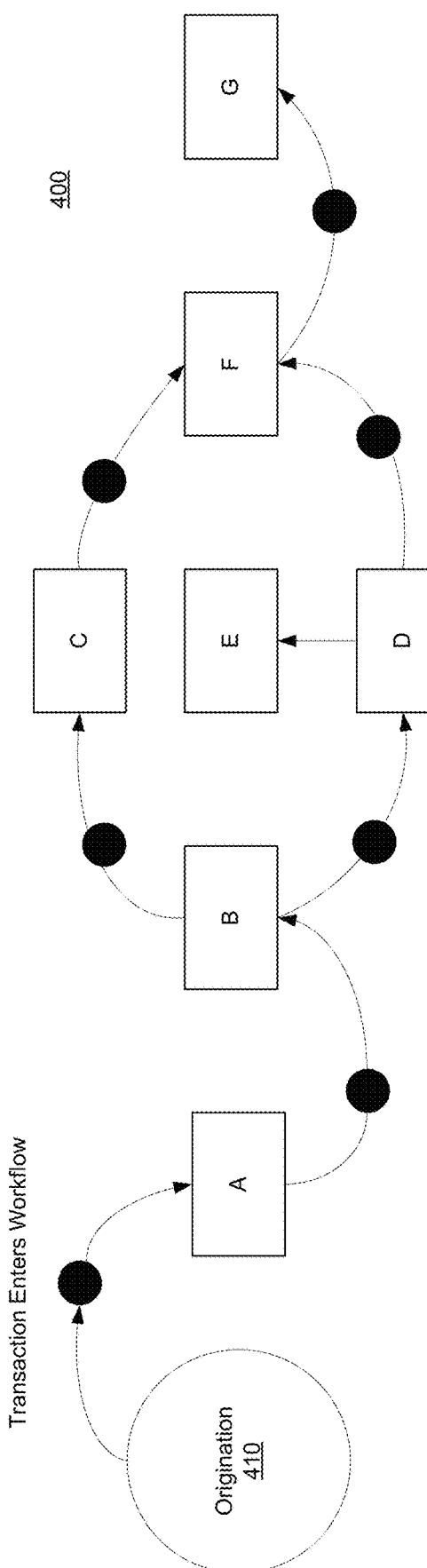

400

Transaction Enters Workflow

Origination
410

Sample Wire Transaction Workflow:

A – Verify the recipient account is valid.

B – High value thresholder causes a split to C for enhanced verification.

C – Enhanced verification for high value transactions.

D – Regulatory check that, would go to E if an international Wire.

E – International wire processing.

F – Occurs when C, D, and E pass and obligates the customer's account for the value until such time as the wire is actually processed.

G – Sends the Wire.

DETECTING AND PREVENTING DUPLICATE TRANSACTIONS ON A TRANSACTION EXCHANGE PLATFORM

CROSS-REFERENCE TO RELATED APPLICATIONS

This application is a continuation of U.S. application Ser. No. 18/149,544, filed on Jan. 3, 2023 and entitled "Detecting and Preventing Duplication Transactions on a Transaction Exchange Platform," which is a continuation-in-part of U.S. application Ser. No. 17/389,045, filed on Jul. 29, 2021 and entitled "Transaction Exchange Platform with Watchdog Microservice," which is a continuation of U.S. application Ser. No. 16/723,545 (now U.S. Pat. No. 11,080,120), filed on Dec. 20, 2019 and entitled "Transaction Exchange Platform with Watchdog Microservice," the entireties of which are incorporated herein by reference.

This application is related to the following U.S. patent applications, filed on the same day:

U.S. application Ser. No. 18/149,444, entitled "Removing Duplicate Transactions from a Transaction Exchange Platform" and filed on Jan. 3, 2023;

U.S. application Ser. No. 18/149,522, entitled "Transaction Exchange Platform for Handling Returned Transactions" and filed on Jan. 3, 2023; and U.S. application Ser. No. 18/149,493, entitled "Transaction Exchange Platform with a Validation Microservice for Validating Transactions Before Being Processed" and filed on Jan. 3, 2023.

Each of the related applications is incorporated by reference herein in its entirety for all purposes.

TECHNICAL FIELD OF THE INVENTION

Aspects of the disclosure relate generally to a transaction exchange platform. More specifically, aspects of the disclosure may provide for detecting and/or preventing duplicate transactions. Additional aspects of the disclosure may provide for remediating one or more errors associated with transactions and, more specifically, duplicate transactions.

BACKGROUND OF THE INVENTION

Computer systems and applications have revolutionized the handling of transactions and greatly accelerated clearing and settlement processes. Software solutions have been created to facilitate processing, validation, and approval of transactions. These systems serve to interface transaction originators with clearing and settlement operations, allowing transactions to flow between enterprises and facilitating the movement of trillions of dollars per year. Yet regulations, security, and risk management processes have grown increasingly important and detailed, thereby complicating the approval and settlement of transactions. Further, any issues with a transaction may cause the transaction to fail out. In particular, duplicates in transaction processing are part of an industry-wide challenge facing institutions that process transactions and/or transfer money. For example, an error in certain types of transaction files, such as National Automated Clearing House Association (NACHA) files, may cause the entire transaction file to fail, which could delay the processing of up to $9.999 billion dollars. Errors in these types of files are fairly common due to the requirements of the file. For example, NACHA files require that each transaction contained therein have a unique, 15-digit identifier and all the dates be Julian. Moreover, NACHA files have to be sent to the Federal Automated Clearing House (FedACH) system via the NACHA standard. Any errors may cause the transaction file (e.g., NACHA file) to be returned to the financial institution to correct the error. If there is an error, the transaction would have to be re-worked, outside the system, and re-submitted. And, until the error is found, removed or corrected, and the file re-processed, all transactions in that file may be delayed. This causes delays to both the financial institution and its customers. Further, this puts an increased burden on the payment processing systems of the financial institution. These outcomes are undesirable since they result in delays in processing transactions, which disrupt customer experiences and leads to lost revenue.

In an attempt to address potential problems, financial institutions would attempt to detect duplicate transactions using spreadsheet row checking and/or database integrity checking. In this regard, most payment originators use spreadsheets to manage transactions and transaction processing. Spreadsheet row checking would sort the spreadsheet by column and use macros to identify potential, duplicate transactions. Any duplicate transactions would then be corrected manually prior to being uploaded to a vendor, or other electronic data exchange (EDE) system, that interfaces with the FedACH system. However, spreadsheet row checking is time-intensive and prone to user-errors. Database integrity checking, on the other hand, is when a database assigns a unique identifier (e.g., a foreign key) to identify each transaction uniquely. However, the problem with assigning a unique identifier to each transaction means that even duplicate transactions will receive a unique identifier. Accordingly, duplicate transactions may be missed and included in the transaction file. Moreover, the error may be compounded and missed by the FedACH system. The duplicate transaction would then be processed twice. The error would have to be corrected leading to additional processing and cost overhead.

Aspects described herein may address these and other shortcomings present in existing solutions. Novel aspects discussed herein may implement a transaction exchange platform using a streaming data platform and microservices to provide faster, more dynamic, and more robust processing and approval of transactions. The novel transaction exchange platform may provide benefits such as improving the flexibility and reliability of transaction approval and processing systems, while offering robust record keeping for transaction audit purposes. The novel platform may also provide other benefits such as support for legacy and ongoing operations, solving for new and changing requirements in today's environment, and adapting to future technologies.

SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To address the issues with spreadsheet row checking and database integrity checking, the present disclosure provides several solutions to detect and prevent duplicate transactions in transaction files and detect errors with transactions. These solutions ensure efficient processing of transaction files by downstream processors (e.g., FedACH system). Moreover, the present disclosure describes taking remedial action (e.g., corrective action), for example, if one or more transactions, or transaction files, are rejected by a downstream processor.

The transaction exchange platform may receive a plurality of transaction objects, with each of the plurality of transaction objects being associated with a transaction. A streaming data platform may determine whether each of the plurality of transaction objects are associated with a prior transaction object. The streaming data platform may render the determination by performing a field-by-field check. That is, the streaming data platform may compare the fields of a received transaction object with data stored in a database. If a predetermined number of fields match an entry in the database or if all the fields match an entry, the received transaction object may be rejected (e.g., failed) as being a duplicate of another transaction object. In addition to performing a field-by-field check, the streaming data platform may also determine whether the format of the received transaction object is valid. If not, the received transaction object may be rejected.

When the received transaction object is not a duplicate of a previously received transaction object and when the received transaction object is properly formatted, the streaming data platform may analyze (e.g., review) the received transaction object for any issues and/or problems that may cause processing of the received transaction object to fail. Additionally or alternatively, the streaming data platform may analyze (e.g., review) the received transaction object for any issues and/or problems that may cause the received transaction object to be rejected by a downstream processor (e.g., FedACH system). The streaming data platform may use one or more machine learning models to determine whether the received transaction object contains a problem or issue that may cause processing of the received transaction object to fail. The one or more machine learning models may be trained using a dataset of transactions that were rejected by a downstream processor. The dataset may comprise an indication as to why each transaction object was rejected by the downstream processor. In some instances, the dataset may also compromise a remedial action (e.g., corrective action) to correct the problem or issue with the transaction object. Additionally or alternatively, the one or more machine learning models may be trained using a dataset of transactions that the streaming data platform failed to process. Like the dataset from the downstream processor, the dataset from the streaming data platform may comprise an indication of why processing failed and what, if any, remedial action was taken to correct the reason for the failure.

If any issues are identified in the received transaction object, the streaming data platform may perform a remedial action to correct the defect with the received transaction object. The remedial action object may be determined using the one or more machine learning models. Additionally or alternatively, the streaming data platform may generate an alert (e.g., a notification) indicating the defect with the received transaction object. The alert may include sending an electronic communication (e.g., message) to one or more parties associated with the received transaction object. The electronic communication may indicate the defect and a suggested corrective action. In response to the electronic communication, the one or more parties may perform one or more steps to remediate the defect with the received transaction object. In some instances, remediating the defect may comprise approving the suggested corrective action.

Once any defects with the received transaction object are rectified and/or remediated, or if no defects are detected with the received transaction object, the streaming data platform may generate a unique identifier for the received transaction object. The unique identifier may be an alphanumeric string generated using a hash function, such as SHA256. After the received transaction object is assigned a unique identifier, the received transaction object may be processed by one or more microservices in accordance with a workflow associated with the received transaction object. In some instances, a microservice may perform a validation check on the received transaction object. The validation check may access a client register to determine whether the transaction associated with the received transaction object is allowed (e.g., permitted by law). If the transaction is not allowed, the received transaction object may be removed from the streaming data platform or other remedial actions may be taken. However, if the transaction is allowed to proceed, a client identifier may be appended to the unique identifier. The combination of the client identifier and the unique identifier may create a 1:1 link with the 15-digit tracking identifier used in the transaction file that is routed to the downstream processor (e.g., FedACH system). Accordingly, any subsequent attempt by this client to inject the same transaction, or a duplication of the transaction, may spawn write error logs based on the 1:1 link between the tracking identifier and the combined the client identifier and the unique identifier.

After the validation check, one or more microservices may process the received transaction object in accordance with a workflow (e.g., a saga) associated with the transaction type. The microservices may process the received transaction object asynchronously. After being processed by each of the one or more microservices associated with a workflow, the received transaction object may be removed from the transaction exchange platform. The received transaction object may be passed to a sub-layer, referred to an intermediary integrator. The sub-layer may include a request processor. The request processor may host a data model. Additionally or alternatively, the request processor may perform a validation check on the received transaction object to ensure that the format of the received transaction object complies with the format of the downstream processor. The request processor may assign a batch identifier to the received transaction object, as well. The batch identifier may be another important layer in preventing the processing of duplicate transactions. That is, when the request processor receives a transaction, the request processor may append the batch identifier to each transaction, for example, after clearing the format check. The batch identifier may function like a bucket at both the ACH transaction and NACHA file level. At the ACH transaction level, the batch identifier may be a backstop to the initial field-by-field validation performed when the transaction object is received by the transaction exchange platform. Assigning the batch identifier to the transaction may schedule the transaction to be processed for the time window associated with the batch identifier. This may create a 1:1 ACH batch identifier-NACHA batch identifier relationship. For example, if the transaction needs to be rerun (e.g., the NACHA file failed and all of the transactions contained therein need to be rerun due to some other transaction being incorrect), the original batch identifier may be removed from the transaction and a new batch identifier will be associated with the transaction. The transaction, with the new batch identifier, will be added to a new NACHA file and resubmitted to the downstream processor. By using a unique batch identifier, the integrity and/or uniqueness of each of the transactions in the NACHA file will be maintained, which improves the probability that the NACHA file, and the transactions contained therein, will be processed.

When the downstream processor (e.g., FedACH system) processes transactions in real-time, or near real-time, the batch identifier may no longer correlate to a batch processing window. Instead, the batch identifier may be repurposed to a Fed Real-Time ACH pre-staging function, where quasi-real-time ACH transactions may be screened for regulatory compliance. At the NACHA file level, the FedACH system may perform its own transaction and file-level duplication checking. Because of this, every transaction and file must be unique, and the 2-layer approach described herein ensures that each transaction and file is uniquely identified.

Despite the precautions described above, transactions may be rejected by the downstream processor. Typically, the rejection of one or more transactions may include a reason why the transaction failed. In the context of ACH processing, the reason for why the transaction failed may be indicated by a return code. Traditionally, the transactions associated with the return codes would have to be corrected manually. However, the present disclosure describes automatically remediating rejected transactions, for example, based on the return code. Specifically, the present disclosure describes an adjudicator microservice that remediates rejected transactions, for example, using a codex and/or based on the return code. By automating the remediation of rejected transactions, the present disclosure is able to re-process rejected transactions more quickly and efficiently than previous techniques, while using fewer resources to do so.

One or more aspects described herein may provide for detecting duplicate transactions, as well as other flaws or errors associated with transactions. The techniques described herein may provide one or more techniques for remediating duplicate transactions, or other errors, that may cause processing of the transactions to fail. Additionally, the techniques described herein provide for the generation of a unique transaction identifier. The unique transaction identifier may be generated by concatenating a version number and an identification token associated with the transaction identifier. The unique transaction identifier may be used by both the transaction exchange platform and downstream processors, such as clearinghouses (e.g., ACH clearinghouses), to ensure that the transaction is not rejected for being a duplicate of another transaction. Finally, the present disclosure provides for an adjudication microservice, which may be used to remediate transactions that were rejected and/or returned by downstream processors.

Corresponding apparatus, systems, and computer-readable media are also within the scope of the disclosure.

These features, along with many others, are discussed in greater detail below.

BRIEF DESCRIPTION OF DRAWINGS

The present disclosure is illustrated by way of example and not limited in the accompanying figures in which like reference numerals indicate similar elements and in which:

FIG. 4 depicts an illustrative workflow as a directed acyclic graph according to one or more aspects of the disclosure;

DETAILED DESCRIPTION OF THE INVENTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects described herein may relate to a transaction exchange platform using a streaming data platform and microservices to process transactions according to review and approval workflows. A transaction exchange platform, according to one or more aspects discussed herein, may provide a version agnostic data streaming, reactive microservice solution that facilitates payment related workflows to be executed. Although the term "microservice" is used throughout this disclosure, aspects are not limited to "microservices" as used in cloud computing contexts. Generally, as used herein "microservice" may refer to a technology process that does work on an object on a streaming data platform in any given step of a workflow. Aspects discussed herein may refer to "approval" of transactions. This generally refers to the processing necessary to move a transaction through the transaction exchange platform from intake to output, and does not necessarily mean that the payment exchange platform affirmatively approves the nature of the transaction. Instead, "approval" as used herein may refer to processing, validating, and/or affirmatively approving a transaction according to a workflow indicating the steps necessary to process a transaction on the platform before it is ready for output to downstream processors.

Before discussing these concepts in greater detail, however, several examples of a computing device that may be used in implementing and/or otherwise providing various aspects of the disclosure will first be discussed with respect to FIG. 1.

Figure 1:
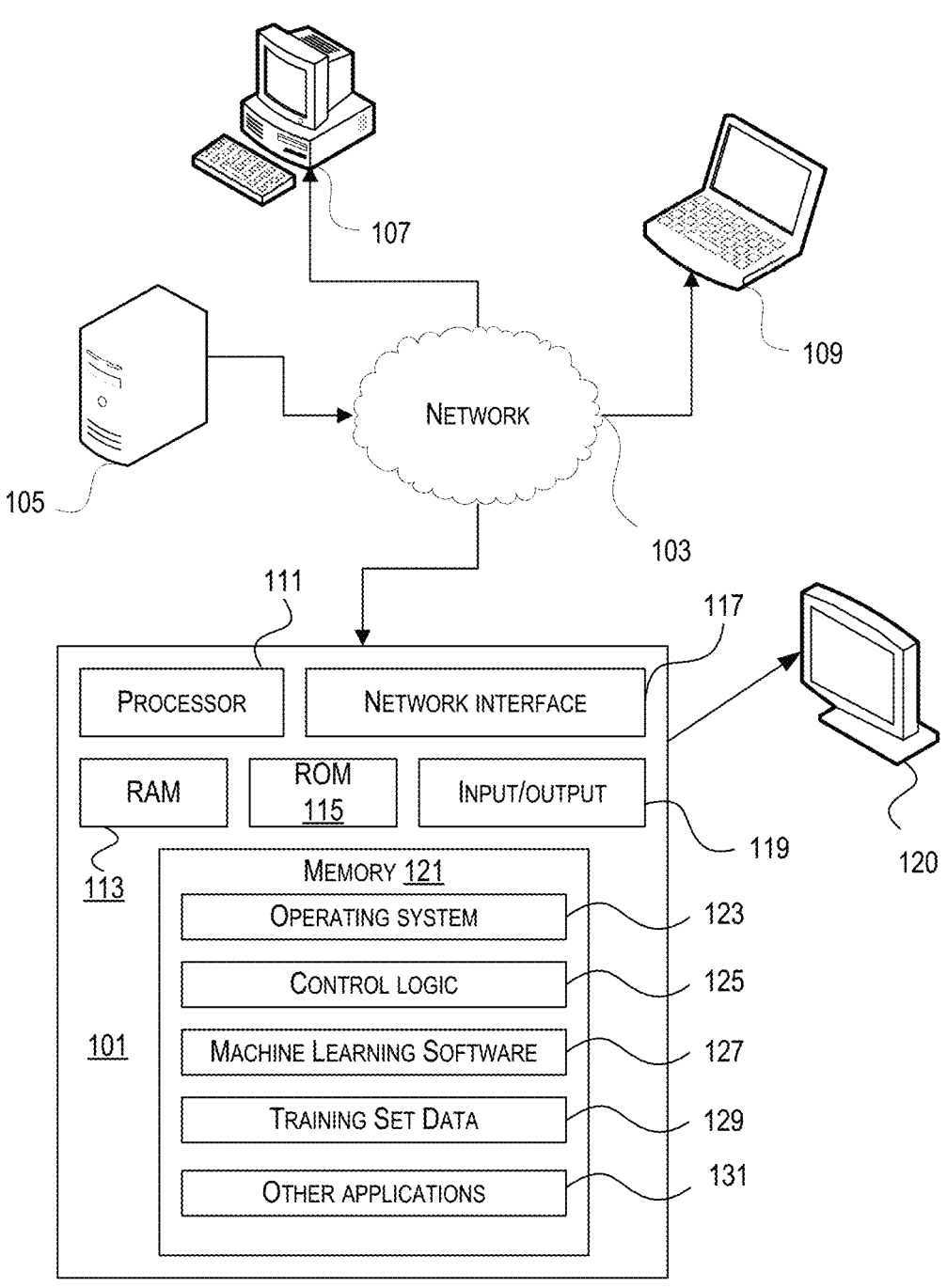
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, transaction exchange platform software 125 for instructing computing device 101 to perform aspects discussed herein, machine learning software 127, smart database 129, and other applications 131. Machine learning software 127 may be incorporated in and may be a part of transaction exchange platform software 125. In embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to methods and techniques for implementing a transaction exchange platform.

Transaction Exchange Platform—Processing Streaming Transaction Data Using Microservices Aspects described herein may provide a transaction exchange platform implemented using a streaming data platform (SDP) and a plurality of microservices to process transactions according to workflows corresponding to different transaction types. Microservices on the transaction exchange platform may be configured to retrieve transactions having a current workflow stage that is assigned to the microservice from the SDP. The microservice may perform one or more steps of the approval/review workflow for the type of transaction, update the status of the object, and put it back to the SDP. Other microservices, later in the workflow, may see that the current workflow status of a transaction indicates that earlier pre-requisite processing steps have completed and may accordingly retrieve the transaction objects and perform their respective workflow steps. When the current workflow stage of a transaction indicates that all requisite steps of the workflow have been completed, the transaction may be removed from the SDP of the transaction exchange platform and output to downstream systems for further processing.

Figure 2:
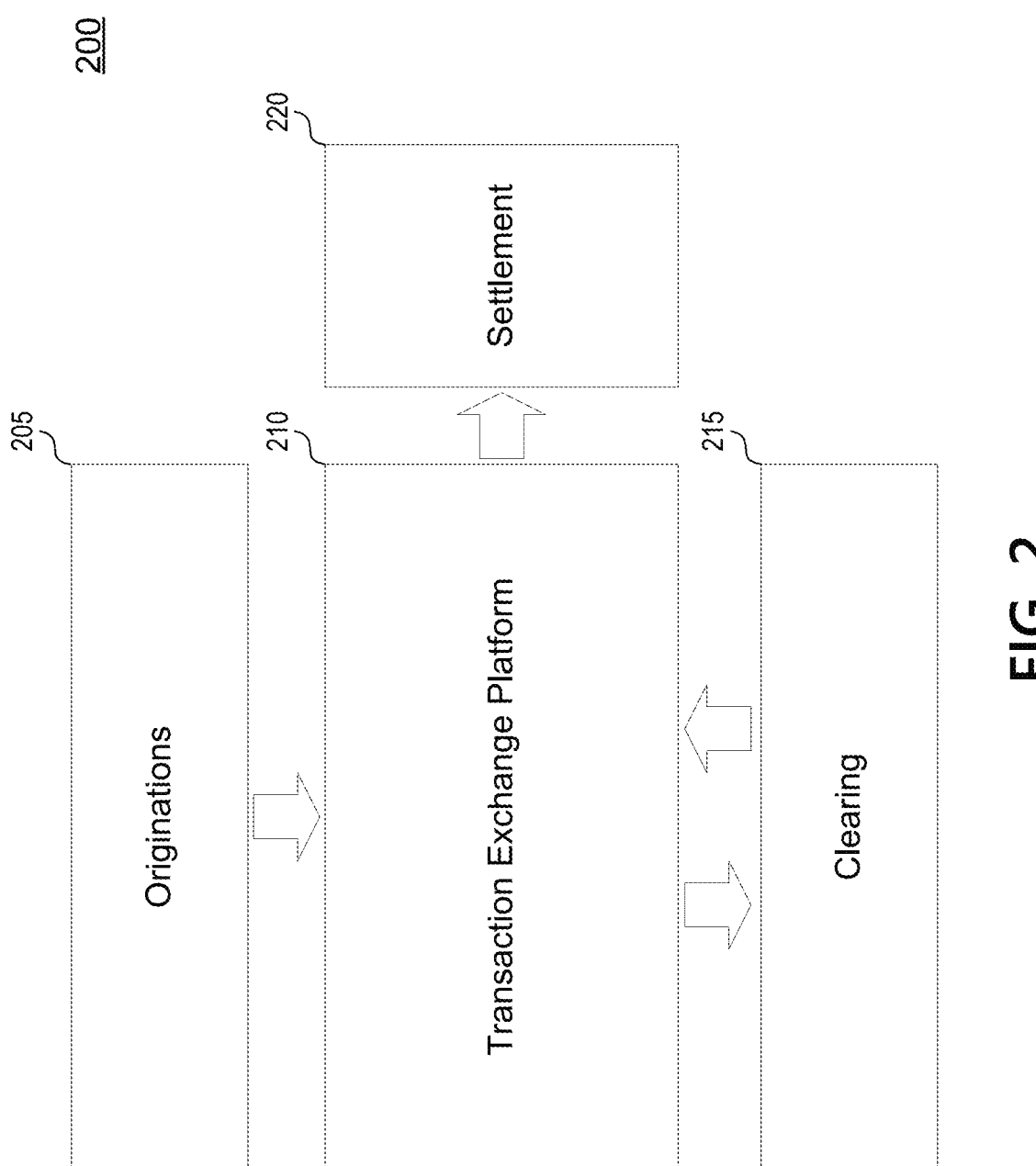
FIG. 2 depicts an example operating environment used to discuss illustrative aspects of a transaction exchange according to one or more aspects of the disclosure.

A high level system 200 for processing transactions, such as payments, is illustrated in FIG. 2. Transaction processing system 200 may broadly illustrate the flow of transactions from origination source 205 through to settlement systems 220. Transactions handled by system 200 may take any suitable form, generally as payment transactions. Example types of payment transactions include: wires, automated clearing house (ACH) payments, checks, cashier checks, real-time payments (RTP), credit cards, and/or many other types of payment transactions. Other factors that may inform the "type" of a transaction may include whether the transaction originates domestically or internationally, whether the destination is domestic or international, an amount of the transaction, the identity of one or more financial entities associated with the transaction, and the like. For purposes of the discussion herein, a transaction type may be relevant primarily for informing the review/approval steps that should be applied to the transaction prior to final settlement.

Transactions may begin at origination sources 205. For example, if a customer were to purchase a donut at a bakery using a credit card, the transaction may be sent via a point-of-sale (POS) terminal at the bakery to a payment processor. As another example, an investor may cause a wire payment to be sent to their broker via a banking website. The banking website may receive the wire payment transaction and begin the process of facilitating settlement of the wire transaction via a transaction processing system 200.

Transactions may be routed to settlement systems 220 to affect the transfer of the monies indicated in the transaction. For example, the wire transaction may be routed to respective financial institutions associated with the investor and broker to indicate the respective debit/credit to their accounts. However, substantial review and approval processing may be required before a transaction may be settled. This processing may involve regulatory, security, and/or risk management.

Transaction exchange platform 210 may serve as an interface between the origination source 205 and settlement systems 220, and according to some aspects may implement the transaction review and approval workflow for each supported transaction type. Origination sources 205 may send transactions to transaction exchange platform 210 for review and approval processing, and ultimately for routing to settlement systems 220. Transaction exchange platform 210 may be provided by the same entity operating settlement systems 220 and/or one or more of origination sources 205, or may be provided by a third-party entity.

Transaction exchange platform 210 may perform the review and approval processing for transactions. This may include interfacing with clearing systems 215. Clearing systems 215 may provide regulatory, security, and/or risk management support for transactions. For example, transactions may be referred to systems provided by the U.S. Federal Reserve as part of a clearance process. As another example, the identities of the parties to the transaction may need to be evaluated against various criteria in support of anti-money laundering or other such efforts. Clearing systems 215 may be provided as part of transaction exchange platform 210, or as logically separate systems. Clearing systems 215 may be provided by the entities operating origination sources 205, transaction exchange platform 210, settlement systems 220, government entities, and/or other third parties.

Transaction exchange platform 210 may interface with clearing systems 215 to complete review and approval processing on the transaction. Transactions that are approved on transaction exchange platform 210 may be routed to settlement systems 220 for settlement and/or further processing.

Figure 3A:
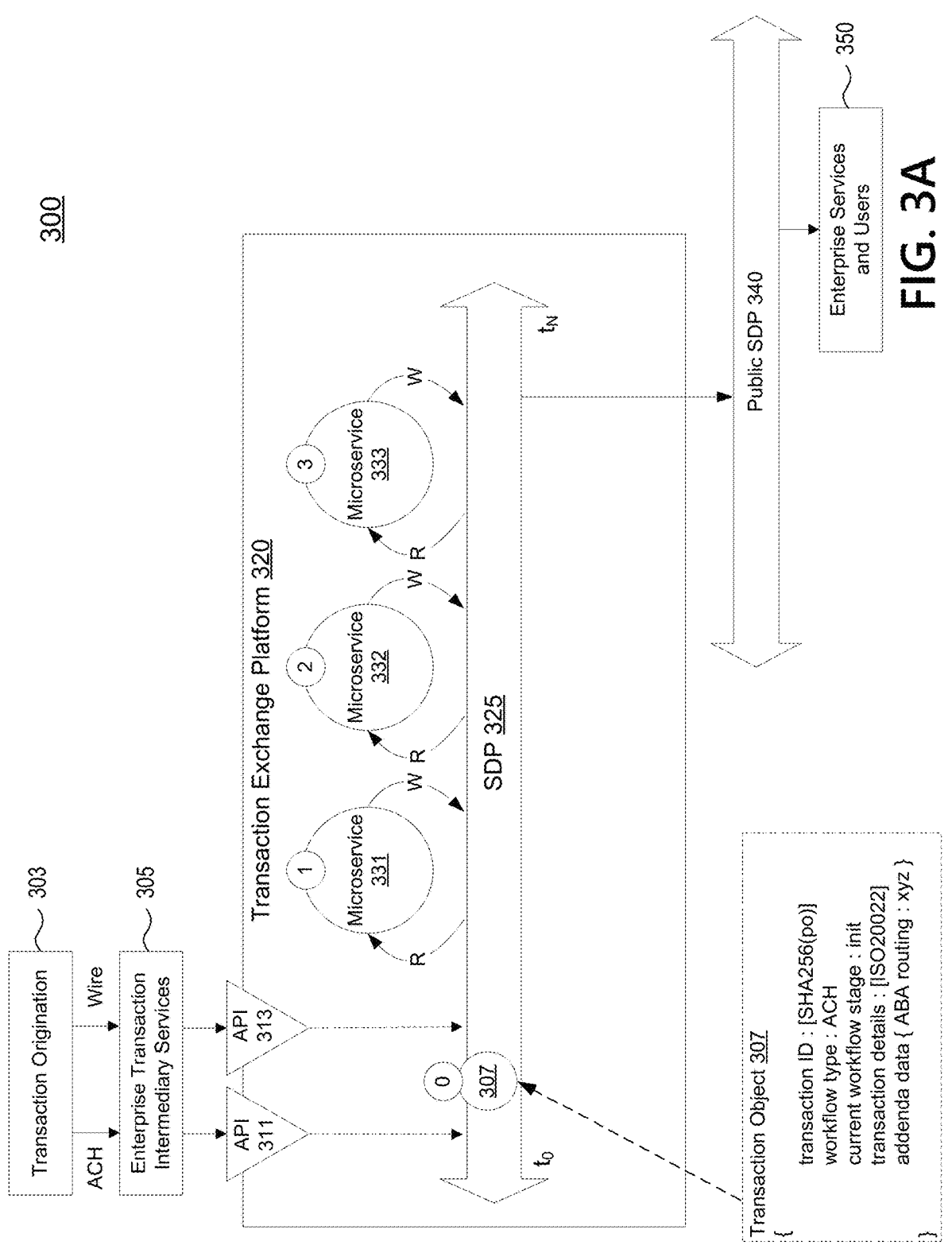
FIG. 3A depicts an example transaction exchange platform according to one or more aspects of the disclosure.

FIG. 3A illustrates a system 300 that may provide further details of a novel transaction exchange platform 320 than provided in FIG. 2, according to some aspects described herein. Similarly, transactions may originate at transaction origination sources 303 and route to downstream settlement systems, illustrated in FIG. 3A as enterprise systems and users 350.

Transaction exchange platform 320 may serve to perform review and approval workflow processing on transactions received from transaction origination sources 303 via enterprise transaction intermediary services 305. Transaction origination sources 303 may include both first- and third-party sources of transactions. The enterprise providing transaction exchange platform 320 may provide transaction intermediary services 305 to receive transactions, whether from third-parties or not, and route those transactions to transaction exchange platform 320. Enterprise transaction intermediary service 305 may perform validation, pre-processing, standardization, and/or any other suitable processing to prepare transactions for further handling by transaction exchange platform 320.

Transactions may be sent to transaction exchange platform 320 via application programming interfaces (APIs), such as API 311 and API 313. The APIs may validate aspects of the transaction details, and may package and/or standardize transactions into transaction objects suitable for processing on transaction exchange platform 320. In some implementations, transaction exchange platform 320 may provide different APIs for each type of transaction. For example, API 311 may correspond to ACH transactions while API 313 corresponds to wire transactions. In some implementations, fewer APIs (such as a single centralized API) may be used to flexibly validate and initialize transactions for processing by transaction exchange platform 320. The APIs for interfacing with transaction exchange platform 320 may comprise a number of components, such as a public API front-end, basic input validation logic, message level integrity processes, monitoring, and/or integration aspects.

Transaction objects may be pushed to a streaming data platform (SDP) 325 underlying transaction exchange platform 320. Streaming data platforms, such as those based on the Apache Kafka open-source platform, may be used to process real-time data in computer systems. Message objects pushed to the streaming data platform may be read by consumer software modules, processed, and put back to the streaming data platform. Transaction objects on SDP 325 may be subject to processing by microservices on transaction exchange platform 320, such as microservice 331, microservice 332, and microservice 333. The microservices can read and write transaction objects from/to SDP 325. Objects on SDP 325 may proceed logically through time, e.g., t0 through tn, as they progress through stages of the workflow associated with a corresponding transaction type.

Transaction objects, such as transaction object 307, may include transaction details, addenda, and transaction metadata. The transaction details and/or addenda may include the particulars of the transaction, such as the parties and/or accounts involved, as well as the amount of the payment. Addenda data of the transaction object may include, e.g., ABA routing numbers and other details that may be added, updated, and/or processed by the microservices on transaction exchange platform 320. The transaction metadata may include at least an indication of a workflow corresponding to a transaction type of the transaction object and a current workflow stage of the transaction object. In some implementations, discussed further herein, the transaction metadata may also include workflow version information.

As an example, transaction object 307 may include the following:

```
{        transaction ID : a SHA256 encoded token
         workflow type : ACH
         current workflow stage : init
         transaction details : ISO20022 token
}        addenda data { ABA routing : xyz }
```

Transaction object 307 may encapsulate any suitable standard payment object, such as one storing transaction details in a recognized JSON format. As mentioned, and as illustrated further in FIG. 6, transaction objects may also include a current workflow version assigned to the transaction object. Still other metadata may be included, such as a replay tracking count indicating the number of times that the transaction has been subject to replay through one or more steps of the workflow. Transaction details may be immutable, not subject to change while the transaction object is on the streaming data platform, whereas metadata and/or addenda data may be subject to change through additions, removals, updates, and/or other processing or modification by the microservices on transaction exchange platform 320.

A current workflow stage value may be maintained as part of the transaction metadata in each transaction object. The current workflow stage may indicate which processing steps of the associated workflow have been completed on the transaction. The current workflow stage may indicate the completion status of each respective step of the workflow. As such, in an example implementation the current workflow stage value may be a set of values and/or a data structure indicating the completion of individual workflow steps, e.g., processing by respective microservices. Microservices may be configured to poll the SDP for transactions having a current workflow stage value that indicates completion of each of the pre-requisite steps for processing by the microservice.

Microservices on the transaction exchange platform may poll the SDP to identify and retrieve transaction objects having a current workflow stage matching a workflow stage associated with the microservice. Transaction objects matching the microservice's assigned workflow stage may be processed by the microservice for review, approval, and/or any other suitable processing as part of the overall series of steps required to approve a transaction of the corresponding transaction type. Processing may result in updating one or more elements of the transaction metadata. Once the microservice completes its processing of the transaction object, the microservice can put the transaction object back to the SDP with an updated current workflow stage indicating that the microservice completed its processing. The updated transaction object may then be identified and processed by a next microservice based on the workflow.

Figure 3B:
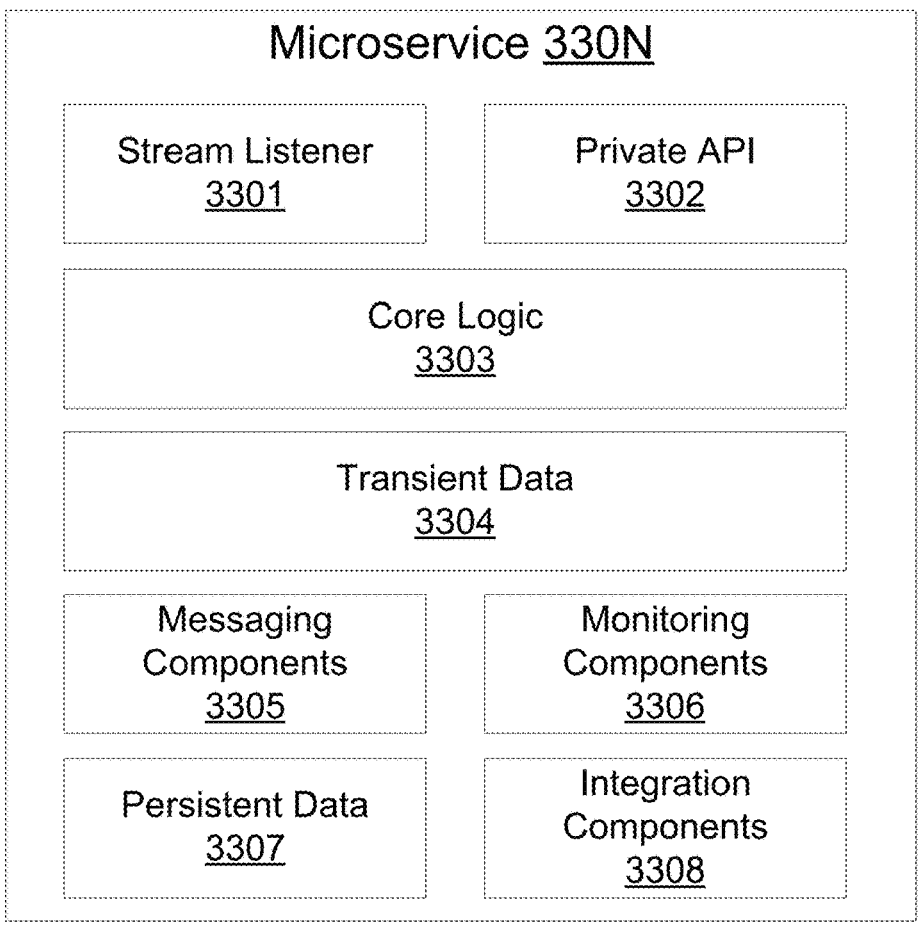
FIGS. 3B-3C depict example structures for microservices according to one or more aspects of the disclosure.
Figure 3C:
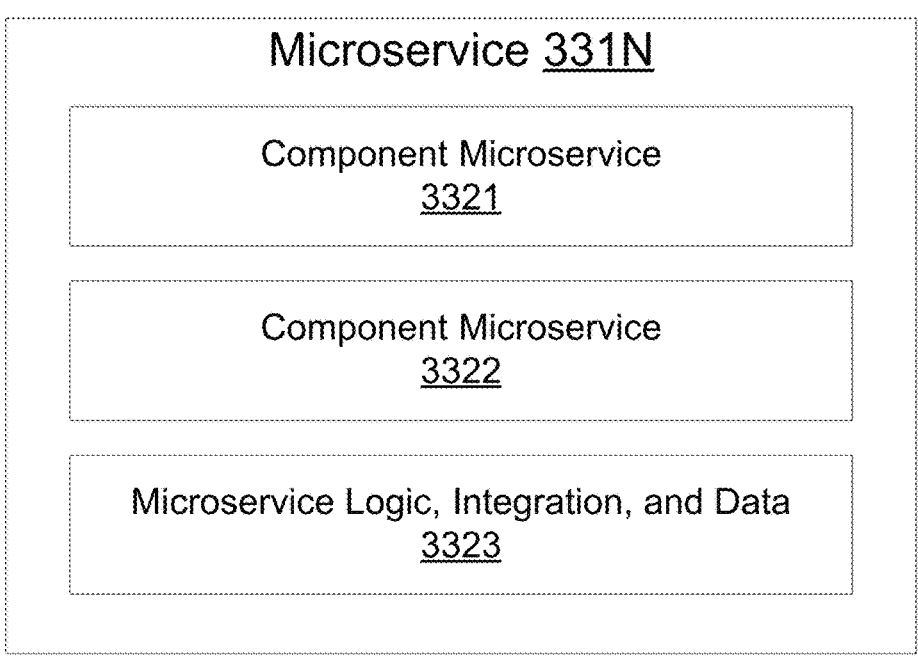

Turning briefly to FIGS. 3B and 3C, FIG. 3B illustrates an example structure for a microservice 330N. The microservice may comprise subcomponents configured to work in concert to apply processing logic associated with a workflow step assigned to the microservice. In the illustrated structure, microservice 330N comprises a stream listener 3301 which may operate as a standardized way to read from SDP 325 and consume transaction objects that meet the workflow criteria (e.g., stage) associated with microservice 330N. Microservice 330N may also include private API 3302, which may be a RESTful implementation used in synchronous calls supporting singleton integrations into transaction exchange platform 320, and its use may allow only the response to be exposed to the public API aspect of microservice 330N. Microservice 330N may also include core logic 3303, which may contain the business logic and associated computer instructions to fulfill microservice 330N's assigned role in the workflow. Core logic 3303 may be adapted to process transaction objects in accordance with one or more steps of regulatory, security, and/or risk management processes. Microservice 330N may further include transient data 3304, which may include a data management layer that deals with data that is attributed to the local functionality of the system, for example truth tables used in processing by core logic 3303, and persistent data 3307, which may include a construct to capture state data for the associated workflow stage. Microservice 330N may further include messaging components 3305 to track message level integrity via natural key encryption derivations of the payment object. And microservice 330N may include monitoring components 3306, configured to provide oversight and tracking, and integration components 3308, configured to provide the ability to integrate with software structure patterns such as Async SDP, SOAP, RESTful API, and the like. As illustrated in FIG. 3C, however, a microservice may be made up of a collection of other microservices. For example, as illustrated microservice 331N comprises component microservices 3321, 3322, and 3323.

Returning to FIG. 3A, illustrative transaction exchange platform 320 includes three microservices (microservices 331, 332, and 333) configured to operate on ACH transactions. Transaction object 307 is an example ACH transaction, and is added to SDP 325 via API 311. Transaction object 307 may be added to SDP 325 in an "init" or initialization stage, indicating that none of the workflow steps have yet been completed. In some implementations, the initialization stage may be a separate stage that is marked completed prior to processing by a first microservice, or may be commensurate in scope with a first workflow stage associated with a first microservice of the workflow. In some implementations, the initialization stage for the object may be handled as part of the processing by the APIs 311, 313 or otherwise handled alongside workflow processing by the respective microservices.

Walking through the example, transaction object 307 may be added to SDP 325 in the initialization stage (stage '0'). Microservice 331 may be configured to perform a first step in an approval workflow for any transaction(s) having a transaction type of ACH. For example, microservice 331 may be configured to verify that the recipient account of the ACH transaction is valid. Microservice 331 may look for transaction objects on SDP 325 having a first workflow stage (stage '1'), for example a stage that indicates initialization pre-processing was completed or, in some implementations, transaction objects in the initialization stage itself. As mentioned above, the current workflow stage of transaction object 307 may indicate each (and/or a subset) of the workflow steps that have been completed on transaction object 307, and the current workflow stage thus may comprise a data structure listing the completion status of each (and/or a subset) of the workflow steps. Microservice 331 may poll SDP 325 to retrieve transaction objects having a current workflow stage matching (e.g., meeting) the first workflow stage assigned to microservice 331. In this manner, microservice 331 may extract transaction objects from SDP 325 that have met the criteria for microservice 331 to begin processing. For example, microservice 331 may be configured to wait until initialization steps such as new object snapshotting is completed before performing its processing to verify the recipient account. Transaction objects retrieved by microservice 331 may be removed and/or otherwise blocked on SDP 325 pending processing by microservice 331.

Microservice 331, having retrieved one or more transaction objects such as transaction object 307, may perform its corresponding workflow step on the transaction object. The workflow step may comprise suitable processing of the transaction object, such as according to core logic of microservice 331 (similar to core logic 3303 of FIG. 3B). Processing of the transaction object by microservice 331 (or any other microservice) may comprise any of: retrieving the transaction object; reviewing values and other characteristics of the transaction object; interfacing with clearing systems such as clearing systems 215 and/or other systems; comparing values or characteristics to rules, regulations, policies, and the like; adding, removing, updating, or otherwise changing any aspect of the transaction addenda data or transaction metadata; generating reports and/or alerts; presenting the transaction for manual or other review; and/or any other suitable processing associated with the respective step of the workflow for transactions of that type. For example, processing by a microservice may comprise verifying a value of the transaction details, addenda data, and/or transaction metadata against at least one rule. As another example, processing may comprise verifying a value of the transaction details, addenda data, and/or transaction metadata against a watchlist. Processing may comprise determining that the transaction details, addenda data, and/or transaction metadata fail at least one rule; flagging the transaction object for further review; and holding the transaction object in the current workflow stage pending the further review, where updating the current workflow stage of the transaction object to the third workflow stage is based on determining that the further review is completed. Flagging the transaction object for further review may comprise flagging the transaction object for manual review by a user and/or setting the current workflow stage of the transaction object to a current workflow stage associated with another microservice, other than the microservice that typically processes transactions after the first microservice.

The processed transaction object may be put back to SDP 325 by microservice 331, and the current workflow stage of the transaction object may be updated to indicate that microservice 331 has completed its processing. For example, transaction object 307 may be updated to have a current workflow stage of '2' after microservice 331 completes its processing.

Back on the SDP 325, the updated transaction object may be subject to further processing by other microservices in like fashion. For example, microservice 332 may correspond to a second step of processing in the workflow corresponding to ACH transactions, such as a regulatory check associated with anti-money laundering efforts. Microservice 332 may be configured to look for transaction objects having a second current workflow stage, e.g., stage '2', on SDP 325. Microservice 332 can poll SDP 325 to retrieve such transaction objects and process them according to its own core logic, similarly to that described above with respect to microservice 331. The processed transaction object may be put back to the SDP 325 with an updated current workflow stage indicating that processing by microservice 332 is completed. Microservice 333 may be configured to look for a third current workflow stage, e.g., stage '3', and may process transaction objects similarly. For example, microservice 333 could perform processing to obligate a customer's account for the value of the transaction.

When the current workflow stage of a transaction object indicates it has completed the steps of the corresponding workflow, the transaction object may be removed from SDP 325 and routed or otherwise made available to other components of the overall transaction system. For example, the approved transaction object, having passed through all steps of the corresponding workflow, may be published to a public streaming data platform 340 accessible outside of the transaction exchange platform. Enterprise systems, applications, users, and others (e.g., enterprise services and users 350) may access the completed transaction objects on the public streaming data platform and further process for transaction settlement or other purposes.

The structure described herein, where microservices poll SDP 325 for transaction objects having corresponding current workflow stages, may drive payments and other transactions through the system and requisite review and approval workflows. As mentioned, the workflow for a given transaction type may comprise a plurality of processing steps required to approve a given transaction of the transaction type. Workflows may be implemented in the configurations of what workflow stage metadata each microservice is configured to look for on the SDP 325. However, workflows may also be logically described and/or defined using a directed acyclic graph structure, as described further with respect to FIG. 4.

FIG. 4 illustrates a sample directed acyclic graph (DAG) 400 that may correspond to a workflow corresponding to transactions having a wire transaction type. The steps of the workflow corresponding to a given transaction type may be organized as a DAG. The DAG may comprise nodes corresponding to the individual steps of the workflow, and edges corresponding to pre-requisite relationships between the steps. The DAG may indicate how transactions from an origination source such as origination 410 flow through the transaction exchange platform 320, until approval is completed and the transaction is ready for further processing by downstream systems. The DAG may include parallel paths, whereby the transaction object may be subject to concurrent processing by multiple microservices. The DAG may indicate pre-requisite conditions that govern the progression of the transaction object through the stages of the workflow. For example, processing by a microservice in the DAG may be conditioned on the completion of processing by one or more other microservices. The DAG may also indicate branching, conditional paths where a transaction object may be subject to processing by different microservices (and/or different processing generally) based on certain transaction attributes.

In the example workflow for wire transactions 400 illustrated in FIG. 4, a transaction object added to transaction platform 320 from origination 410 may first enter step 'A'. Step 'A' may correspond to a microservice that performs processing to verify that a recipient account in the transaction details and/or addenda is valid. Once step 'A' processing is complete, the workflow proceeds to step 'B', which may correspond to a high value threshold that operates to split transactions for different processing based on their value (also implemented as a microservice). For example, once step 'A' is completed and a first microservice updates the current workflow stage of the transaction object, a microservice associated with step 'B' may pick up the transaction object and determine if it involves a payment over a certain value, e.g., payments more than $5000. The microservice associated with step 'B' may update the transaction object with different current workflow stages depending on whether the transaction should be subject to high value processing (e.g., step 'C') or standard processing (e.g., step 'D'). Step 'C' may occur subsequent to step 'B' determining that a high value transaction should be subject to enhanced verification, and may comprise performing the enhanced verification by a corresponding microservice. Step 'D' may comprise performing standard regulatory verification by a corresponding microservice. Step 'D' may also determine if the transaction is an international or domestic wire, and may update the current workflow stage and/or other transaction metadata accordingly. If the transaction is an international wire, it may be routed (by means of the updated transaction metadata) to a microservice associated with step 'E', which may perform further international wire processing. If the transaction is a domestic wire, it may proceed to step 'F' once regulatory checks are completed. Step 'F' may comprise a step to obligate the customer's account for the amount of the wire, and may be conditioned on successful completion of steps 'C', 'D', or 'E' depending on how the transaction progressed through the workflow. For example, a microservice corresponding to step 'F' may be configured to poll SDP 325 for transactions having a current workflow stage that indicates they have completed steps 'C', 'D', or 'E'. Finally, completing the workflow step 'G' may correspond to a microservice configured to send the wire transaction for settlement, such as to settlement systems 220 of FIG. 2 or enterprise services and users 350 of FIG. 3A. Having completed workflow step 'G', the transaction metadata may be updated to indicate completion of the workflow. For example, the current workflow stage of the transaction object may be updated to indicate completion of step 'G'. As another example, the current workflow stage of the transaction object may reflect the completion of each of steps 'A', 'B', 'D', 'F', and 'G'.

Workflow 400 is just one example of a workflow corresponding to a transaction type, and the transaction exchange platform 320 may have many such workflows corresponding to different transaction types. Microservices on transaction exchange platform 320 may be involved in one or more workflows, and may operate on different stages of different workflows.

Workflow steps may proceed in parallel, and may be independent of one or more other steps in the workflow. For example, if validating the account number of the sending party and validating the account number of the receiving party were handled by different microservices, the workflow may indicate that both may occur once the transaction is brought onto the platform. However, later steps may be conditioned on the completion of both steps. Either step may occur first in time, depending on the availability of each respective microservice to handle the transaction.

Microservices on transaction exchange platform 320 may be automatically configured to look for a corresponding current workflow stage. This automatic configuration may be based on the DAG structure used to logically define the workflow. For example, the individual microservices may be automatically configured to poll SDP 325 for transactions having a current workflow stage that indicates that the pre-requisite criteria represented in the DAG is met prior to processing by the microservice. Each microservice may be configured to look for transaction objects on SDP 325 that have a given workflow type and also have a current workflow stage matching that which has been assigned to the microservice. Thus, microservices may be configured to operate as part of multiple workflows, and can look for transaction objects at different stages of the workflows. As discussed further herein with respect to FIG. 6, changes to the DAG may be used to automatically re-configure the microservices to watch for transaction objects in different workflows and/or different workflow stages.

Figure 5:
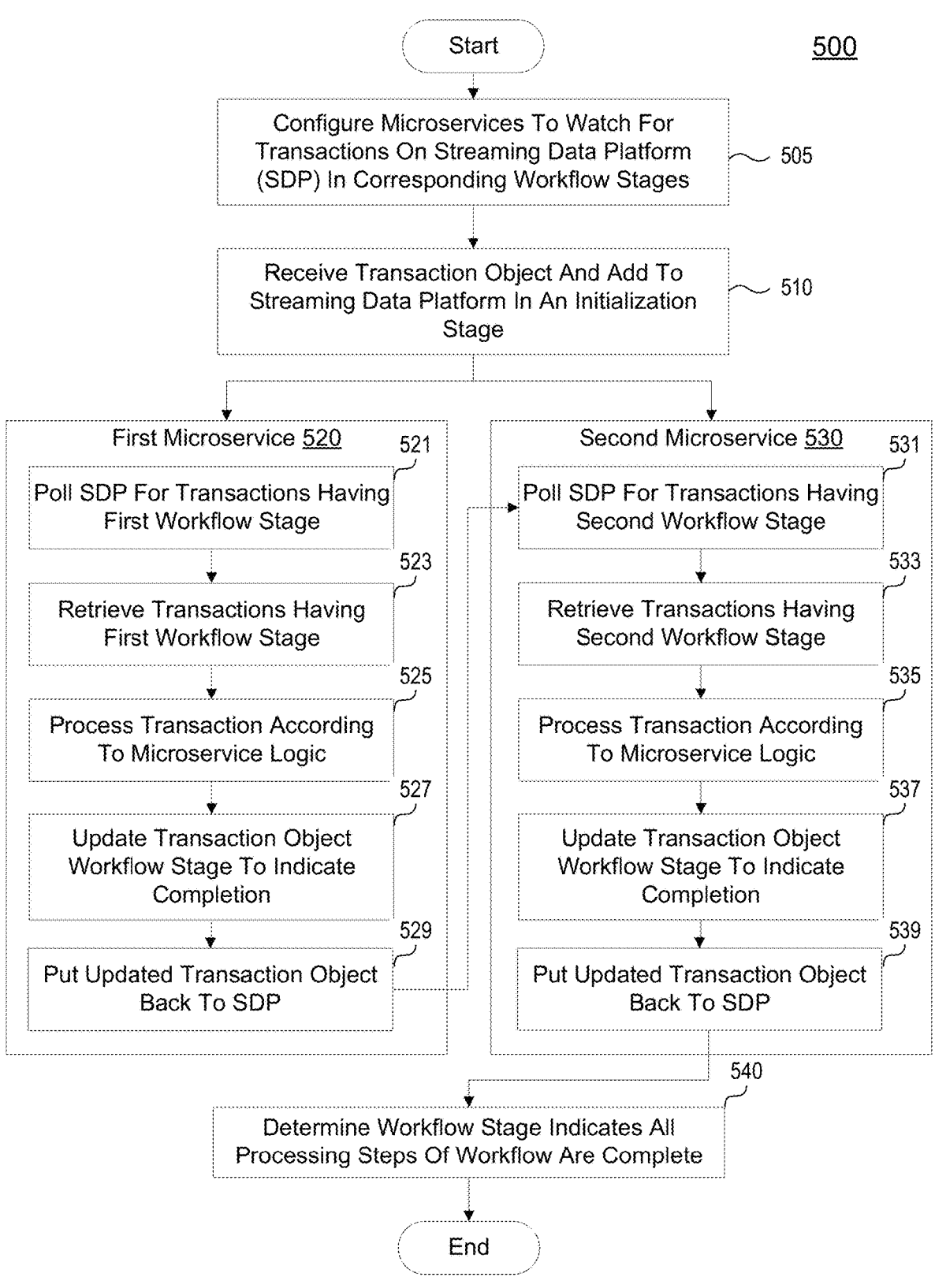
FIG. 5 depicts an illustrative method for processing transactions on a streaming data platform according to one or more aspects of the disclosure.

FIG. 5 depicts a flowchart illustrating an example method 500 to process transactions by a transaction exchange platform, such as transaction exchange platform 320. Method 500 may be performed by any suitable computing device and/or combination of computing devices, referred to as the system implementing method 500.

At step 505, the system may configure microservices on the transaction exchange platform to watch for transactions of the streaming data platform (SDP) that have transaction metadata indicating that they are in a current workflow stage corresponding to the individual microservice. As discussed above with respect to FIG. 4, the system may automatically configure the microservices based on a DAG structure that logically defines the steps of the workflow and their relationships.

At step 510, the system may receive a transaction object and add it to the streaming data platform. The transaction object may be received from a transaction origination source such as origination source 303, and may be received from an enterprise intermediary service, such as enterprise transaction intermediary service 305. The transaction object may be received via one or more APIs of the transaction exchange platform, such as APIs 311 and 313 of transaction exchange platform 320. The transaction object may be added to the SDP in an initialization stage, which may be implemented through setting a current workflow stage of the transaction object's transaction metadata to an initialization value. The initialization stage may be separate from a first workflow stage associated with a first microservice of the workflow, or could be the same as the first workflow stage. Objects in the initialization stage may be subject to various system processes on the transaction exchange platform, such as format or other verifications, standardization, snapshots, and the like. If the initialization stage is separate from a first workflow stage of the workflow, the transaction object may be updated to have the first workflow stage once initialization processing is completed.

The transaction object, on the SDP, may be subject to processing by one or more microservices including first microservice 520 and second microservice 530. First microservice may be configured to poll the SDP for transactions in a first workflow stage, while second microservice may be configured to poll the SDP for transactions in a second workflow stage.

At step 521, first microservice 520 may poll the SDP for transactions having a particular workflow type (corresponding to a transaction type) and having a first workflow stage within that workflow corresponding to first microservice 520. The SDP may identify transaction objects that have a current workflow stage value that matches the first workflow stage criteria associated with the first microservice 520.

Identification of one or more matching transactions may be based on transaction metadata indicating a type of workflow, a current workflow stage, and other information associated with the workflow (such as workflow version information, discussed below with respect to FIG. 6). At step 523, first microservice 520 may retrieve the matching transaction objects for processing. Although steps 521 and 523 are illustrated separately, it will be understood that in practice they may be part of a single contiguous act.

At step 525, first microservice 520 may process the transaction objects it retrieved from the SDP according to processing logic associated with first microservice 520. Processing a transaction object may include: reviewing, assessing, analyzing, updating, adding to, removing, and/or any other suitable processing of the transaction data, addenda data, and/or transaction metadata associated with the transaction object.

At step 527, first microservice 520 may update a current workflow stage of the transaction object to indicate completion of the processing corresponding to first microservice 520. In some embodiments, the current workflow stage may be updated to different next step values depending on the processing by first microservice 520. For example, as discussed with respect to workflow 400 in FIG. 4, a microservice may update the current workflow stage of a transaction object to route it to different next microservices depending on whether it meets certain criteria, such as having a value greater than a threshold amount.

At step 529, first microservice 520 may put the updated transaction object back to the SDP. The updated transaction object may have one or more changed values (or none) of its transaction data, addenda data, and/or transaction metadata, in addition to the updated current workflow stage.

In the example of method 500, first microservice 520 may update the current workflow stage of the transaction object to indicate completion of processing by the first microservice 520. This updated current workflow stage may correspond to the second current workflow stage that second microservice 530 is looking for on the SDP.

Thus, at step 531, the second microservice 530 may poll the SDP for transactions having the second workflow stage and, at step 533, may retrieve transaction objects matching the second workflow stage. The second microservice 530 may perform similar processing to that described above with respect to first microservice 520. That is, steps 531, 533, 535, 537, and 539 may be analogous to steps 521, 523, 525, 527, and 529, modified as appropriate for the role assigned to second microservice 530 in the workflow for a given transaction type. The processed, updated transaction object may be put back to the SDP with an updated current workflow stage indicating completion of the processing corresponding to second microservice 530.

At step 540, the system may determine that the current workflow stage metadata of the transaction object indicates that all requisite processing steps of the workflow have been completed. As a result, processing by the transaction exchange platform may be completed and the approved transaction object may be removed from the SDP and output for further processing and/or settlement. For example, as illustrated in FIG. 3A, a completed, approved transaction may be output to a public SDP for access by downstream systems and users.

Thus, according to some embodiments a computer-implemented method may receive a transaction object comprising transaction details and transaction metadata. That transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The computer-implemented method may further comprise adding the transaction object to a streaming data platform and updating the current workflow stage of the transaction object to a first workflow stage. A first microservice may poll the streaming data platform to retrieve transactions matching the first workflow stage. The first workflow stage may be associated with the first microservice based on the workflow corresponding to the transaction type. The first microservice may retrieve, from the streaming data platform, the transaction object based on the current workflow stage matching the first workflow stage. The first microservice may process the transaction object. The computer-implemented method may further comprise updating the current workflow stage of the transaction object to a second workflow stage based on completing processing, by the first microservice, of the transaction object. A second microservice may poll the streaming data platform to retrieve transactions matching the second workflow stage. The second workflow stage may be associated with the second microservice based on the workflow corresponding to the transaction type. The second microservice may retrieve, from the streaming data platform, the transaction object based on the current workflow stage matching the second workflow stage. The second microservice may process the transaction object. The computer-implemented method may further comprises updating the current workflow stage of the transaction object to a third workflow stage based on completing processing, by the second microservice, of the transaction object; determining that the current workflow stage of the transaction object indicates that the transaction object has completed processing corresponding to the workflow; and removing the transaction object from the streaming data platform and outputting the transaction object and an indication that the transaction object has completed the processing corresponding to the workflow.

The first and second microservice may be automatically configured to watch for transactions on the streaming data platform in the first and second workflow stages, respectively, based on the plurality of processing steps. A different second workflow may be associated with a second transaction type and may comprise a different second plurality of processing steps required to approve a given transaction of the second transaction type. The second transaction type may be different from the transaction type. The first microservice may operate on transactions associated with both the workflow and the different second workflow. The plurality of processing steps of the workflow may indicate that the first microservice processes the transaction object at a different stage than the different second plurality of processing steps of the different second workflow.

The workflow corresponding to the transaction type may comprise a directed acyclic graph (DAG) indicating the plurality of processing steps required to approve a given transaction of the transaction type. The first and second microservice may be automatically configured to watch for transactions on the streaming data platform in the first and second workflow stages, respectively, based on the DAG. The computer-implemented method may further comprise, responsive to an update to at least one of the plurality of processing steps indicated in the DAG, automatically reconfiguring at least one microservice based on the update.

The current workflow stage of the transaction object may comprise a data structure indicating completion status of each respective step of a plurality of processing steps associated with the workflow. The transaction object may be updated to have a current workflow stage corresponding to the second workflow stage based on the current workflow stage indicating that the transaction object has been processed by at least the first microservice and a different third microservice. The first workflow stage and a fourth workflow stage may be independent, such that a third microservice receives the transaction object based on the current workflow stage of the transaction object matching the fourth workflow stage irrespective of whether the first microservice has processed the transaction object.

The transaction details may be immutable and may not change while the transaction object is on the streaming data platform. The processing, by the first microservice, of the transaction object may comprise verifying a value of the transaction details, addenda data, and/or transaction metadata against at least one rule. Processing of the transaction object by the first microservice may comprise verifying a value of the transaction details, addenda data, and/or transaction metadata against a watchlist. Processing of the transaction object by the second microservice may comprise determining that the transaction details, addenda data, and/or transaction metadata fail at least one rule, flagging the transaction object for further review, and holding the transaction object in the second workflow stage pending the further review. Updating the current workflow stage of the transaction object to the third workflow stage may be based on determining that the further review is completed. Flagging the transaction object for further review may comprise flagging the transaction object for manual review by a user. Flagging the transaction object for further review may comprise setting the current workflow stage of the transaction object to a fourth workflow stage associated with a third microservice. Updating the current workflow stage of the transaction object to the third workflow stage may be based on determining that processing by the third microservice is completed.

As examples, the transaction type of the transaction object may be a wire type transaction. The workflow may comprise a plurality of processing steps required to approve a wire transaction. The transaction type of the transaction object may be an automated clearing house (ACH) type transaction. The workflow may comprise a plurality of processing steps required to approve an ACH transaction. The transaction type of the transaction object may be a cashier check type transaction. The workflow may comprise a plurality of processing steps required to approve a cashier check transaction. The first microservice may process the transaction object to validate a routing number associated with the transaction object. The second microservice may process the transaction object to verify compliance with at least one regulatory requirement associated with the transaction type. The transaction object may be received via an application programming interface (API).

According to some aspects, a transaction exchange platform may comprise a streaming data platform, a plurality of microservices, at least one processor, and memory. The plurality of microservices may comprise at least a first microservice and a second microservice. The first and second microservice may be automatically configured to watch for transactions on the streaming data platform in corresponding workflow stages based on a plurality of workflows corresponding to a plurality of transaction types. The memory may store instructions that, when executed by the at least one processor, cause the platform to receive a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The instructions, when executed by the at least one processor, may further cause the platform to add the transaction object to the streaming data platform; update the current workflow stage of the transaction object to a first workflow stage; and poll, by the first microservice, the streaming data platform to retrieve transactions matching the first workflow stage. The first workflow stage may be associated with the first microservice based on the workflow corresponding to the transaction type. The instructions, when executed by the at least one processor, may further cause the platform to retrieve, by the first microservice and from the streaming data platform, the transaction object based on the current workflow stage matching the first workflow stage; process, by the first microservice, the transaction object to add, remove, or update addenda data associated with the transaction object; update the current workflow stage of the transaction object to a second workflow stage based on completing processing, by the first microservice, of the transaction object; and poll, by the second microservice, the streaming data platform to retrieve transactions matching the second workflow stage. The second workflow stage may be associated with the second microservice based on the workflow corresponding to the transaction type. The instructions, when executed by the at least one processor, may further cause the platform to retrieve, by the second microservice and from the streaming data platform, the transaction object based on the current workflow stage matching the second workflow stage; process, by the second microservice, the transaction object; update the current workflow stage of the transaction object to a third workflow stage based on completing processing, by the second microservice, of the transaction object; determine that the current workflow stage of the transaction object indicates that the transaction object has completed processing corresponding to the workflow; and remove the transaction object from the streaming data platform and output the transaction object and an indication that the transaction object has completed the processing corresponding to the workflow.

According to some aspects, one or more non-transitory computer readable media may comprise instructions that, when executed by at least one processor, cause a transaction exchange platform to perform steps. Those steps may comprise receiving a transaction object comprising transaction details and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform; updating the current workflow stage of the transaction object to a first workflow stage; and polling, by a first microservice, the streaming data platform to retrieve transactions matching the first workflow stage. The first workflow stage may be associated with the first microservice based on the workflow corresponding to the transaction type. The steps may further comprise retrieving, by the first microservice and from the streaming data platform, the transaction object based on the current workflow stage matching the first workflow stage; processing, by the first microservice, the transaction object; and polling, by a second microservice, the streaming data platform to retrieve transactions matching the first workflow stage. The first workflow stage may be also associated with the second microservice based on the workflow corresponding to the transaction type. The steps may further comprise retrieving, by the second microservice and from the streaming data platform, the transaction object based on the current workflow stage matching the first workflow stage; processing, by the second microservice, the transaction object; updating the current workflow stage of the transaction object to a second workflow stage based on completing processing, by the first microservice and the second microservice, of the transaction object; and polling, by a third microservice, the streaming data platform to retrieve transactions matching the second workflow stage. The second workflow stage may be associated with the third microservice based on the workflow corresponding to the transaction type. The steps may further comprise retrieving, by the third microservice and from the streaming data platform, the transaction object based on the current workflow stage matching the second workflow stage; processing, by the third microservice, the transaction object; updating the current workflow stage of the transaction object to a third workflow stage based on completing processing, by the third microservice, of the transaction object; determining that the current workflow stage of the transaction object indicates that the transaction object has completed processing corresponding to the workflow; and removing the transaction object from the streaming data platform and outputting the transaction object and an indication that the transaction object has completed the processing corresponding to the workflow.

According to some aspects, a computer-implemented method may comprise steps comprising receiving a transaction object comprising transaction details and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform; and retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object; updating the current workflow stage of the transaction object to a second workflow stage based on completing processing, by the first microservice, of the transaction object; and retrieving, by a second microservice and from the streaming data platform, the transaction object based on the current workflow stage matching the second workflow stage. The second workflow stage may be associated with the second microservice based on the workflow corresponding to the transaction type. The steps may further comprise processing, by the second microservice, the transaction object; updating the current workflow stage of the transaction object to a third workflow stage based on completing processing, by the second microservice, of the transaction object; determining that the current workflow stage of the transaction object indicates that the transaction object has completed processing corresponding to the workflow; and removing the transaction object from the streaming data platform and outputting the transaction object and an indication that the transaction object has completed the processing corresponding to the workflow.

Configurator—Dynamic Microservice Configuration

One or more aspects described herein may provide for dynamic reconfiguration of the workflows and/or microservices. For example, a workflow may be modified to change a progression of a transaction object from one microservice to the next. This may be implemented by modifying the configuration of a microservice to look for a different current workflow stage on the streaming data platform. A microservice may be modified to change processing logic and/or any other aspect controlling how the microservice interacts with the streaming data platform and/or transaction objects, or any other aspect of the microservice. For example, processing logic of the microservice may be changed to an updated version to be used in processing future transactions.

A configuration interface may generate configuration transaction objects that cause the dynamic reconfiguration of the workflow and/or microservices. Configuration transaction objects may be added to the SDP with a configuration workflow type, and the microservices may retrieve and process the configuration transaction objects. The configuration transaction objects may operate such that a target microservice is reconfigured as a result of processing the configuration transaction object, whether to look for transactions on a different workflow and/or workflow stage, or to modify the processing logic applied to the transactions retrieved by the microservice.

As discussed above, each defined workflow on transaction exchange platform 320 may accept a transaction as part of the transaction's "saga" through the transaction exchange platform. Through the workflow, the transaction may or may not undergo different processing steps, where each step may be provided by one or many microservices or vendor systems. In this way, updating the "saga" that applies to the microservices, integrated vendor systems and datasets, and the entire transaction exchange ecosystem may be akin to an exercise in configuration control. Aspects described herein may allow configurations to be loaded into the transaction exchange platform via the streaming data platform, and may be used to update the entire transaction exchange platform, one or more components of the transaction exchange platform, and/or transactions on the platform.

Traditional methods for doing this may require that each element of the workflow be updated, creating exponentially expanding complexity, downtime, and consequently interjecting risk to the transaction exchange ecosystem. Dynamic reconfiguration as described further herein may solve a problem of traditional deployments that interrupt the entire system and require each component to be individually validated. It may also interject a level of control in the deployment by enabling any level of control from the level of remapping the system up to controlling which component gets transactions associated with different versions of the corresponding workflow. Dynamic reconfiguration may also provide control over the system so that configuration can work from the most tactical single transaction (singleton) level up to the entire transaction exchange. Coupled with other tools, such as cloud-based resiliency tools, dynamic reconfiguration may provide a level of flexibility not present in other deployment approaches or solutions to simplifying and/or mitigating the risk of a failed deployment.

The transaction exchange may exist in a space that includes numerous legacy, vendor, and future state solutions. Dynamic reconfiguration may provide advantages in supporting partnering with vendors and third parties of any kind as an integration approach can be agreed on and brought into the transaction exchange as a service controlled through dynamic reconfiguration. Once integrated, similarly to the version control described herein, the integration service can be toggled on and off easily through dynamic reconfiguration processes.

Figure 6:
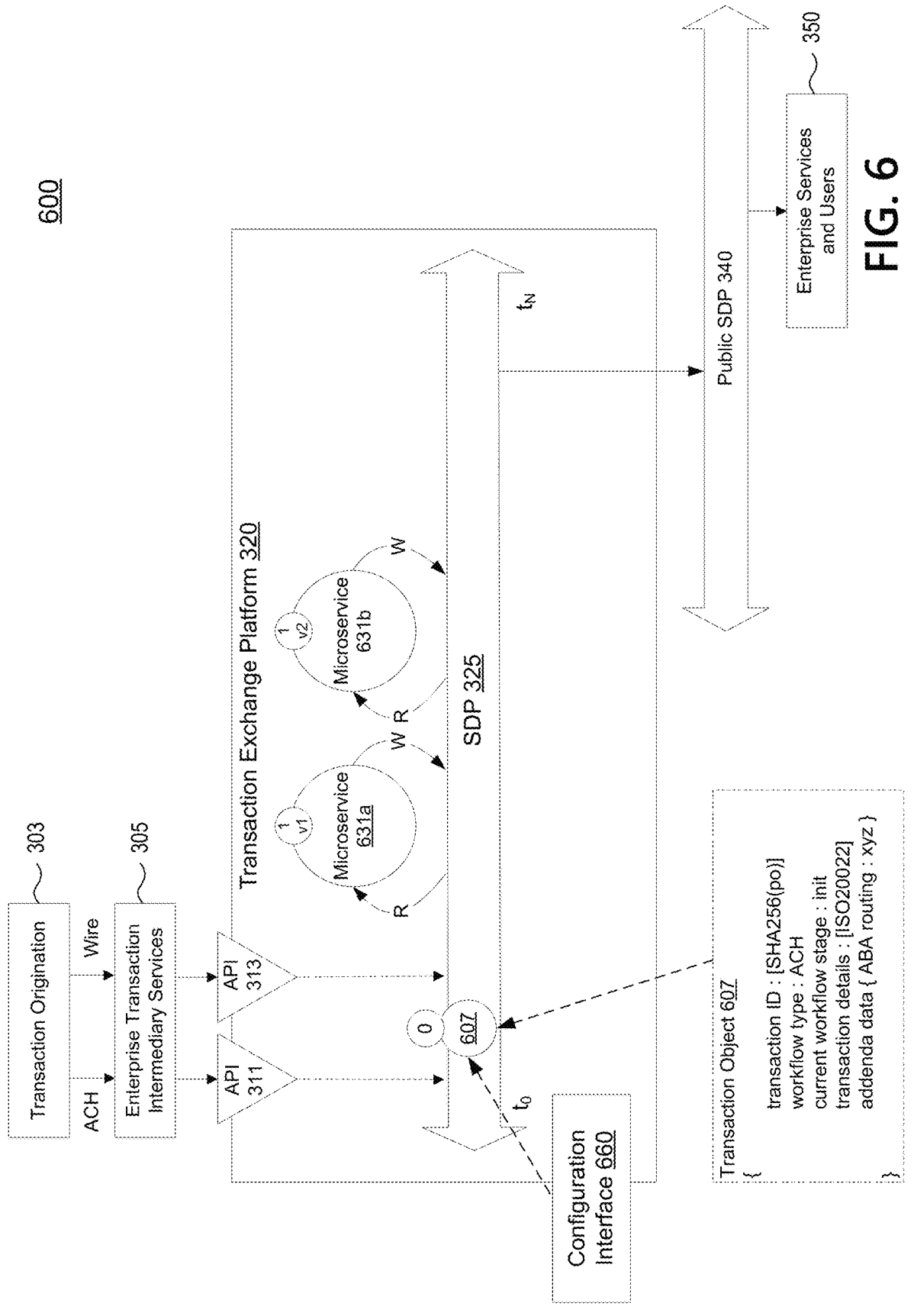
FIG. 6 depicts an example transaction exchange platform having a configuration interface according to one or more aspects of the disclosure.

FIG. 6 illustrates a transaction processing system 600, similar to that illustrated in FIG. 3A and sharing many like components. However, transaction processing system 600 includes configuration interface 660 to provide dynamic reconfiguration of the workflows and/or microservices. Configuration interface 660 may push configuration transaction objects to SDP 325 to cause re-configuration of a first microservice 631*a* (represented as first version 631*a*, which may be updated to second version 631*b*). Due to dynamic reconfiguration, transaction objects may be modified to keep track of the workflow version they should be processed under, as shown by example transaction object 607.

Users managing transaction exchange platform 320 may determine to dynamically reconfigure one or more aspects of the platform, such as by modifying a workflow or causing a new version of a microservice to be deployed. Reconfiguration may be prompted through other processes, such as via a watchdog microservice as discussed further below with respect to FIG. 9. Reconfiguration may be done to update and/or improve software processes. Reconfiguration may also be done to address problems that arise during processing, such as when certain systems become unavailable or otherwise encounter problems. Reconfiguration may be done as a new persistent configuration, or could be temporary pending resolution of an issue. The reconfiguration may target any aspect of the platform with desired granularity. For example, the reconfiguration may apply to the entire platform, one or more microservices, and/or one or more transactions, as appropriate. Workflows on transaction exchange platform 320 may also be reconfigured, which may be accomplished through modifying individual microservices to control the workflow type and workflow stages that they watch for.

Configuration interface 660 may generate configuration transaction objects that cause the dynamic reconfiguration of the workflow and/or microservices. Configuration transaction objects may be added to the SDP with a configuration workflow type, and the microservices may retrieve and process the configuration transaction objects. Each microservice on transaction exchange platform 320 may be configured to watch for transaction objects having a configuration workflow type (e.g., configuration transaction objects), and may have a corresponding workflow stage similar to that discussed above with respect to FIGS. 3A and 4.

A configuration transaction object may be configured such that, when processed by a microservice, it causes reconfiguration of that microservice. Microservices on the transaction exchange platform 320 may be programmed to process configuration transaction objects and make suitable changes to their parameters based on the processed objects. For example, a microservice may process one or more configuration transaction objects comprising instructions to update the workflow assigned to the microservice to a second version of the workflow, e.g., ACH v. 2, and may update a workflow stage assigned to the microservice. Reconfiguration of microservices can be used to update workflows to new versions, create new workflows, and/or modify existing workflows. Transactions requiring modified processing may be assigned to modified/updated/other workflows to change their assigned processing.

Versioning may be used to control processing by appropriate workflows, and may facilitate reliable and accurate record keeping and playback. By tracking which version of a workflow handles a transaction, the transaction can be replayed using the same version at a later time as part of an audit. To this end, microservices may maintain separate indications of each workflow and version handled by the microservice. Transactions may maintain transaction metadata indicating a version value for the workflow applied to the transaction. Transactions may be assigned a current workflow value when added to the transaction exchange platform, and this may be maintained through the life of the transaction. In some circumstances, the version may be changed later and the transaction re-run through the new version of the workflow.

Examples of some types of changes that may be implemented through dynamic reconfiguration will be discussed with references to FIGS. 7A-7C.

Figure 7A:
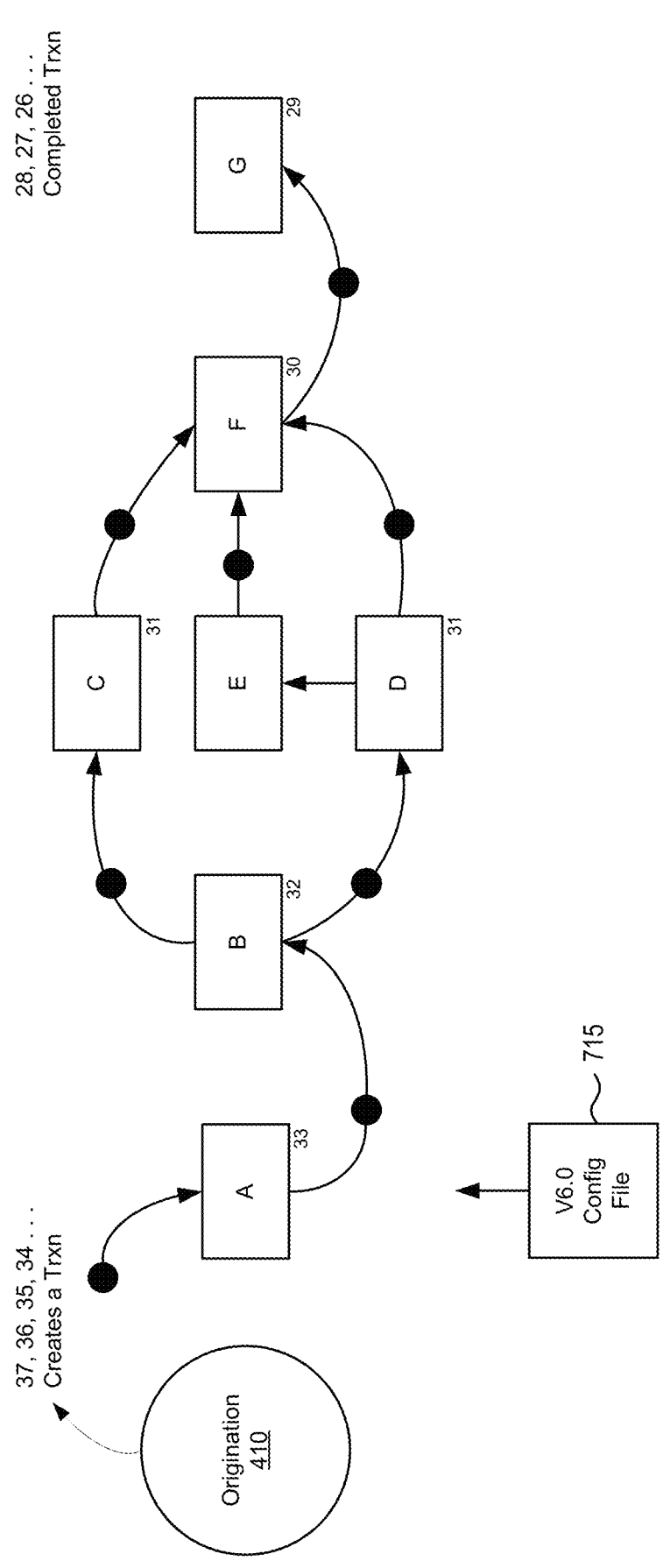
FIGS. 7A-7C depict illustrative changes to workflows, as graphs, according to one or more aspects of the disclosure.

FIG. 7A illustrates pushing a new configuration to one or more of the microservices associated with example workflow 710, which may correspond to example wire transaction workflow 400. This new configuration may modify the processing logic applied by one or more of the microservices corresponding to the steps of workflow 400/710. Configuration interface 660 may generate a configuration transaction object comprising the new configuration and push it to the SDP stream. The configuration transaction object may cause an update of the microservices mid-stream as part of the flow within the transaction exchange platform on the SDP. Each microservice, as with transaction objects, may be configured to watch for configuration transaction objects associated with a configuration workflow and corresponding workflow stage. The microservices may retrieve matching configuration transaction objects and process them to affect an update to their respective processing logic. A microservice, transaction object, and/or the configuration microservice may maintain a new and prior version of their configurations. This may allow for processing under an appropriate version, and may facilitate a transition between versions as further discussed herein.

The mid-stream nature of the dynamic reconfiguration may help avoid significant interruptions and replayability problems posed by prior solutions. As illustrated, transactions 20, 30, 31, 32, and 33 may be on the SDP and already subject to processing by microservices in the current version of the workflow. When a new configuration is pushed (such as version 6.0), the transactions pending on the SDP may continue to be processed according to the prior version that they started under (e.g., version 5.0). New transactions 34, 35, 36, and 37 may be processed under the new version (6.0). As described above, this may be affected through transaction metadata tracking the workflow version associated with the transaction as well as by configuring the microservices to utilize version metadata in retrieving transactions from the SDP. For example, returning to FIG. 6, microservice 631*a* may represent a first version of a microservice that looks for transactions in a given workflow type that have a first version value at a corresponding first workflow stage. Microservice 631*b* may represent a second version of the microservice, and may look for transactions in the same workflow type but having a second version value at the same corresponding first workflow stage. In some implementations, the version value may be combined with the workflow type rather than separate (e.g., "ACHv1" and "ACHv2" as separate workflows rather than version values).

This procedure, pushing configuration transaction objects via the SDP, may provide additional advantages in that, when new components are added, the configuration interface 660 can interject that new component mid-stream so that it is enabled as a new route without updating the entire transaction exchange. This limits disruption to the local "new" component being added or changed while protecting the entire system for the change. This may be advantageous as change remains one of the single biggest drivers of break events. It also enables on-the-fly updates without taking the entire system down into maintenance.

Figure 7B:
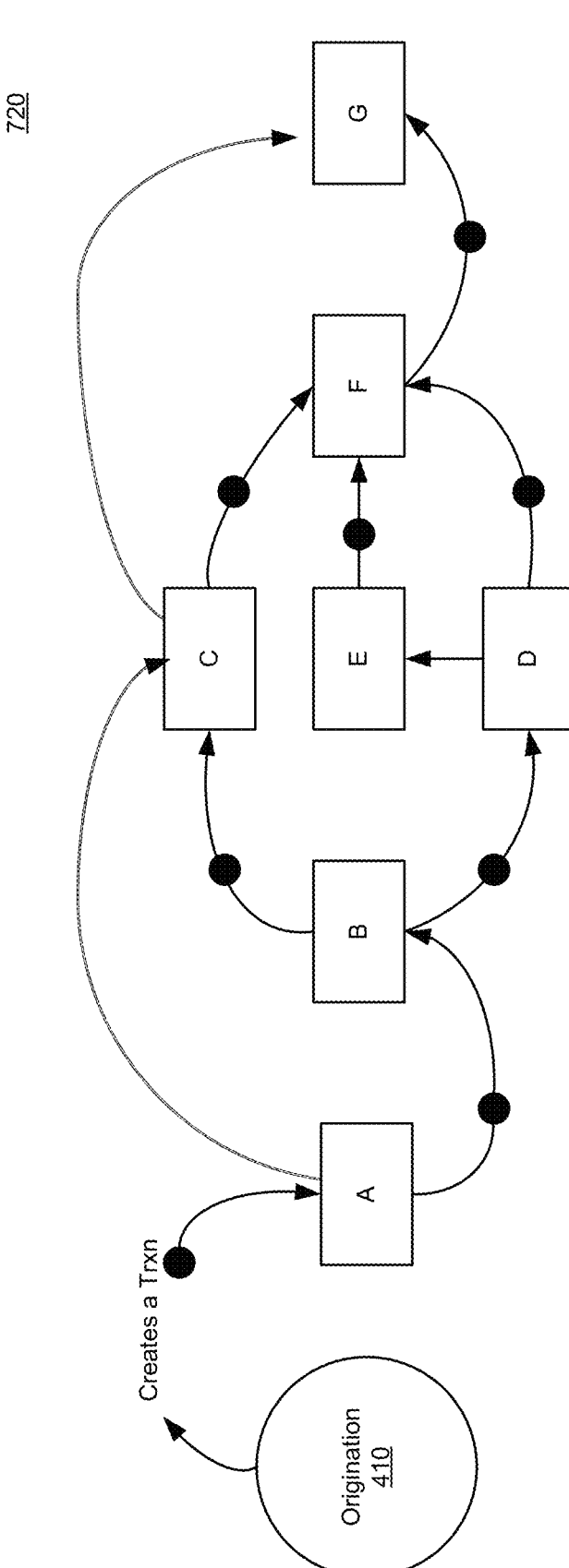

FIG. 7B illustrates a dynamic reconfiguration of a workflow process 720, such as when a component becomes unavailable due to breakage or other adverse events. The dynamic reconfiguration may reconfigure the workflow to bypass problematic services and redirect the workflow to manual review and/or other replacement processing steps. The reconfiguration may avoid bottlenecks associated with microservices earlier in the workflow breaking and preventing transactions from advancing to later microservices. Reconfiguration of workflows may be accomplished through reconfiguring the microservices involved in the workflow to look for different current workflow stages on the SDP.

For example, in reconfigured workflow process 720, which may be a modification of example wire transaction workflow 400, the dynamic reconfiguration may cause all wire transactions to be subject to the enhanced processing of step 'C' rather than the branching paths described above with respect to FIG. 4. This may be due to enhanced security concerns, problems with international wire processing, problems at other components, etc. The reconfiguration of FIG. 7B may be accomplished by configuration interface 660 pushing a configuration transaction object to the SDP that is configured to cause the microservices associated with workflow 400/720 to modify what workflows and workflow stages they look for, as well as how they update the current workflow once processing is completed. In particular, the modification shown in FIG. 7B could be affected by modifying the microservice associated with step 'D' to not pull any transactions, while the microservice affiliated with step 'C' may pull all transactions completed by step 'B'; or step 'B' could be modified to update the current workflow of all processed transactions such that they progress to the enhanced verification of step 'C', for example.

Modifications to the workflow may be done in response to determining conditions that indicate that modified workflow processing should be implemented. The modifications may also be done in response to user changes to a DAG representing the workflow. A user may modify the DAG to define a new workflow/version and the configuration interface 660 may generate a suitable configuration transaction object and push it to the SDP to effect the change. The system may provide a graphical user interface to facilitate users entering modifications to the DAG associated with the workflow processing.

Reconfiguration of the workflows and/or microservices may be handled in a versioned manner, such that transactions on the SDP may be handled according to an appropriate and auditable version of the workflow. When a new configuration version is pushed to the SDP for a given workflow, it may be added with a new version value. Transaction objects on the transaction exchange platform may include, as part of their transaction metadata, an indication of a current version value for the workflow at the time they entered the transaction exchange platform. The microservices on the transaction exchange platform may be further configured to identify transaction objects having an appropriate current workflow stage based on the version value of the transaction object. Thus, transactions added under a first workflow version may reliably be processed under the first workflow version, while transactions added after a shift to a second workflow version may be processed using the new, updated workflow version (and associated microservices and processing logic).

Thus, a first microservice in a first version 631*a* may be originally configured to watch for transactions associated with the first workflow that have a first version value, while the first microservice in a second version 631*b* may be configured to watch for transactions associated with the first workflow that have a different second version value. Transactions added to the transaction exchange platform may be added having a first version value prior to reconfiguring the first microservice. The first version of the first microservice 631*a* may retrieve transactions matching the first version value in a corresponding workflow/stage. Once a reconfiguration is pushed to the SDP, one or more later transactions added to the SDP may be added having a second version value. The second version of the first microservice 631*b* may retrieve one or more transactions matching the second version value in a corresponding workflow/stage. This may allow for reliable and replayable processing of transactions according to the appropriate version of approval workflows.

Figure 7C:
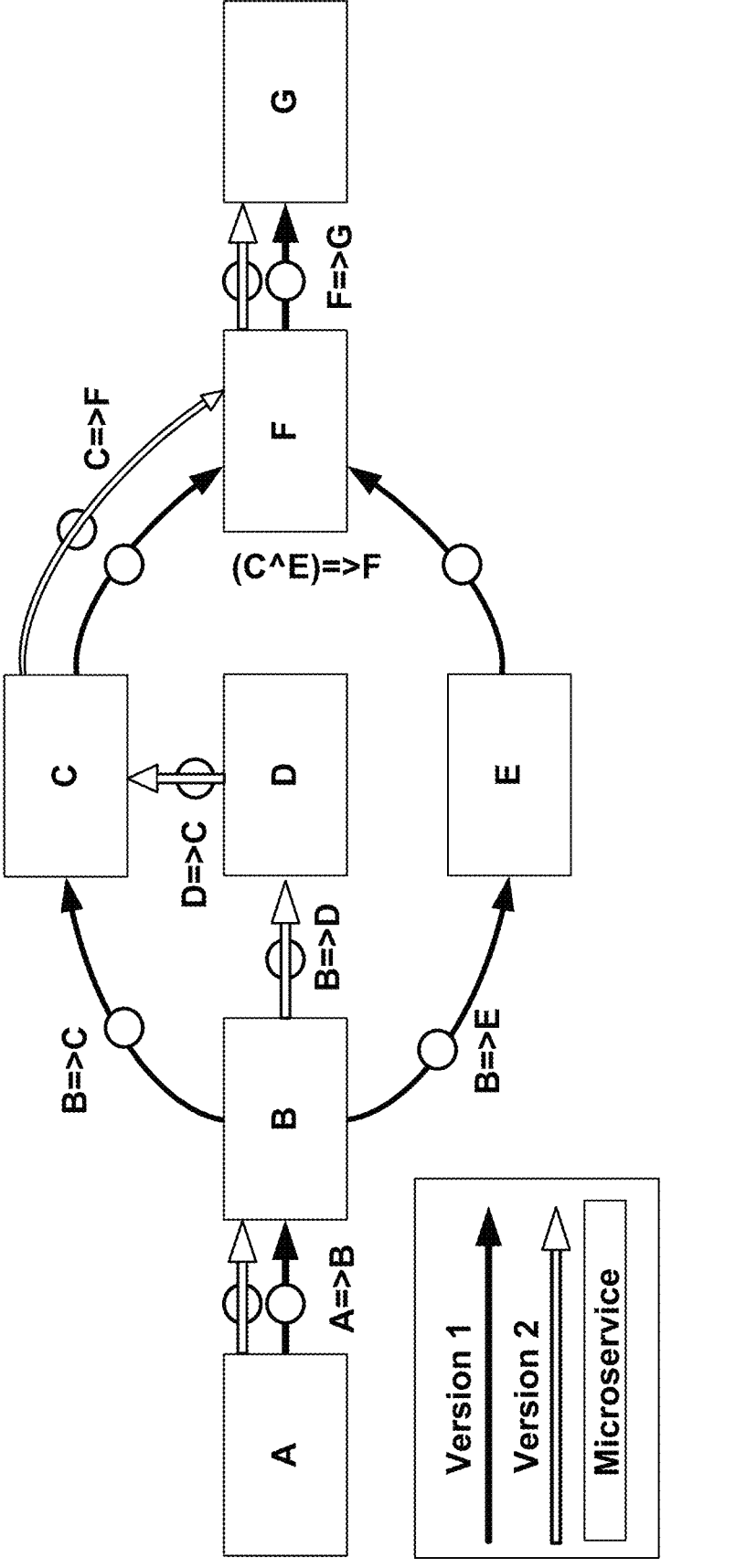

New workflow versions may be added as illustrated in FIG. 7C, through workflow 730. One flexible use of this approach is the ability to generate a workflow designed to modify an individual transaction and/or group of transactions. Version 1 of the workflow, indicated by the single arrows, may be applied to general transaction objects of a given transaction type. Version 2 of the workflow, indicated by the double arrows, may be applied to problematic transactions subject to modified processing. The transaction exchange platform may support microservices, queuing, and manual workflows as part of being highly resilient, especially around high value workflows. As such, the dynamic configuration aspects may facilitate controlling a single transaction's path through the platform enabling it to bypass steps normally required by the common workflow. A new workflow can be introduced to the ecosystem with differentiating execution tied directly to a transaction.

As an exemplary implementation, the following sample data illustrates how a workflow may change across versions of the workflow according to one or more aspects:

```
Initial Configuration Version 1
{
    "SecurityIdentifier": "<< identifier >>",
    "Configurationversion": "1",
    "WorkflowStage": [{
        "A": [{
        "WorkflowType": ["WIRE", "ACH", "RTP", "CHECK", "CONFIG"],
        "WorkflowStageCompleted": ["INIT"]
    }],
    "B": [{
        "WorkflowType": ["WIRE", "ACH", "RTP", "CHECK", "CONFIG"],
        "WorkflowStageCompleted": ["A"]
    }],
    "C": [{
        "WorkflowType": ["WIRE", "ACH", "RTP", "CHECK", "CONFIG"],
        "WorkflowStageCompleted": ["B"]
    }],
    "E": [{
        "WorkflowType": ["WIRE", "ACH", "RTP", "CHECK", "CONFIG"],
        "WorkflowStageCompleted": ["B"]
    }],
    "F": [{
        "WorkflowType": ["WIRE", "ACH", "RTP", "CHECK", "CONFIG"],
        "WorkflowStageCompleted": ["C", "E"]
    }],
    "G": [{
```

27
-continued

```
    "WorkflowType": ["WIRE", "ACH", "RTP", "CHECK", "CONFIG"],
    "WorkflowStageCompleted": ["F"]
    }]
    }]
}
Post Configuration Update Version 2
{
    "SecurityIdentifier": "<< identifier >>",
    "Configurationversion": "2",
    "WorkflowStage": [{
        "A": [{
            "WorkflowType": ["WIRE", "ACH", "RTP"", "CHECK", "CON-
FIG"]
            "WorkflowStageCompleted": ["INIT"]
        "B": [{
        "WorkflowType": ["WIRE", "ACH", "RTP", "CHECK", "CONFIG"],
        "WorkflowStageCompleted": ["A"]
        }],
        "D": [{
        "WorkflowType": ["WIRE", "ACH", "RTP", "CHECK", "CONFIG"],
        "WorkflowStageCompleted": ["B"]
        }],
        "C": [{
        "WorkflowType": ["WIRE", "ACH", "RTP", "CHECK", "CONFIG"]
        "WorkflowStageCompleted": ["D"]
        }],
        "F": [{
        "WorkflowType": ["WIRE", "ACH", "RTP", "CHECK", "CONFIG"]
        "WorkflowStageCompleted": ["C"]
        }];
        "G": [{
        "WorkflowType": ["WIRE", "ACH", "RTP", "CHECK", "CONFIG"]
        "WorkflowStageCompleted": ["F"]
        }]
    }]
}
```

Another aspect of dynamic reconfiguration may provide an event configuration library. Configurations employed to process transactions that have certain characteristics may be stored for re-use in other settings, such as when those same characteristics are encountered again. Configurations that were pushed to resolve those transactions may be used again to facilitate handling of other similar transactions. For example, if manual or other review identifies a high risk transaction, a high risk transaction configuration can be pushed to apply a high risk version of the workflow to the high risk transaction. As a particular example, consider when a transaction is associated with a merger of two companies. To facilitate the merger, transactions may be reconfigured to bypass standard workflows and feed through specialized microservices configured to meet specific reporting needs of M&A transactions.

These configurations may be utilized manually, automatically, through a hybrid approach, and others. For example, machine learning may be employed to recognize problem situations with transactions. The machine learning system may flag a transaction to be reconfigured to follow a configuration of the configuration library that was previously employed on similar transactions. The system may be designed to self-optimize its own configurations, employing approaches based on features such as shortest path, fastest time, most secure, guaranteed delivery, or any other features desirable to customers.

Figure 8:
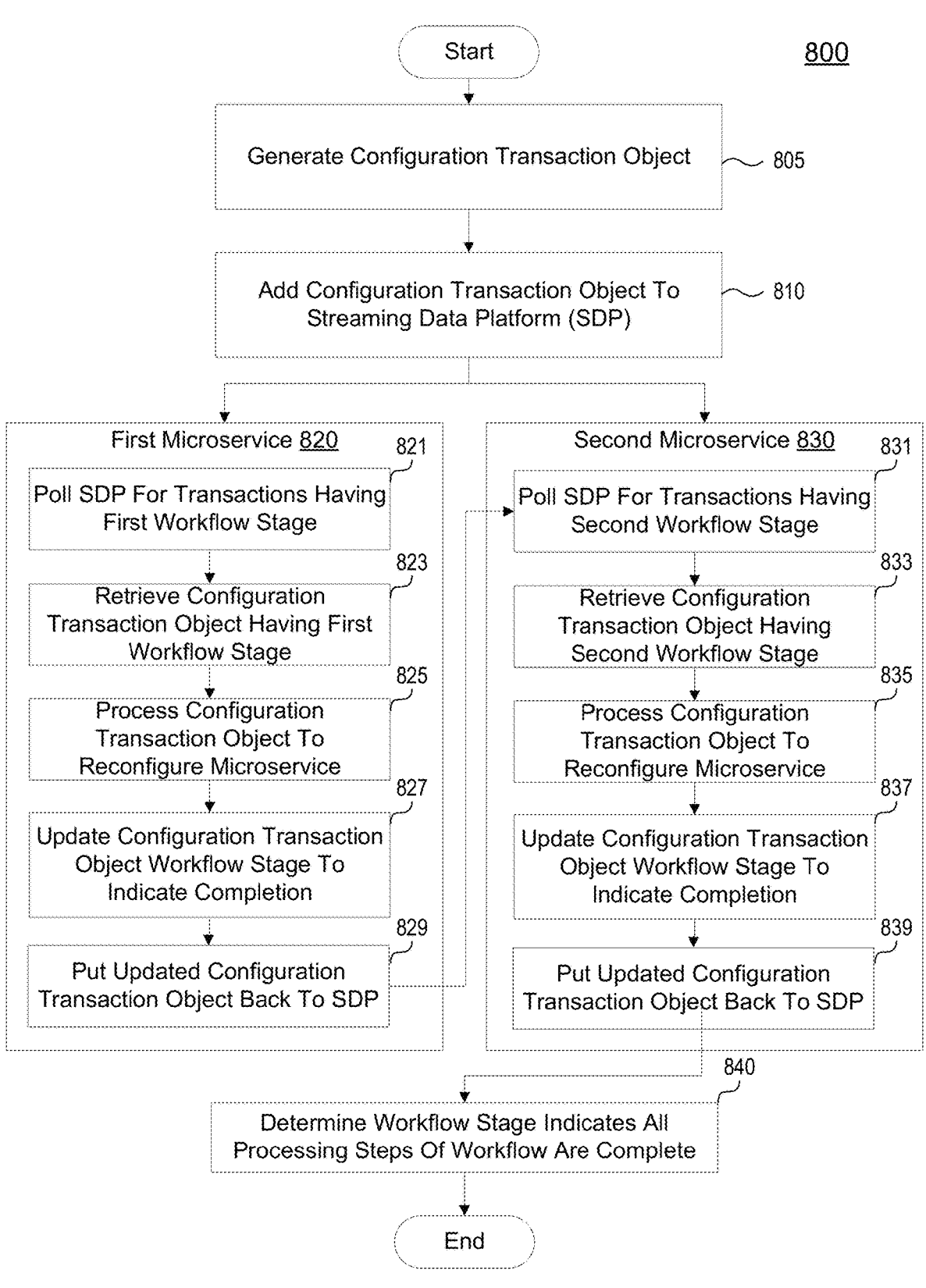
FIG. 8 depicts an illustrative method for reconfiguring microservices according to one or more aspects of the disclosure.

FIG. 8 depicts a flowchart illustrating an example method 800 to dynamically reconfigure a transaction exchange platform, such as transaction exchange platform 320. Method 800 may be performed by any suitable computing device and/or combination of computing devices, referred to as the system implementing method 800.

At step 805, the configuration interface 660 may generate a configuration transaction object. The configuration transaction object may be configured to cause a reconfiguration of the transaction exchange platform, one or more workflows, one or more microservices, and/or one or more transactions. The configuration interface 660 may receive a request to generate the configuration transaction object from a user and/or other system processes, such as a watchdog microservice (discussed further below with respect to FIG. 9). The configuration transaction object may comprise transaction details and transaction metadata. The transaction metadata may indicate that the transaction object has a configuration workflow type and a current workflow stage of the configuration transaction object. In some embodiments, the workflow type of the configuration transaction object is a workflow that is modified by the configuration transaction object, and other aspects of the configuration transaction object indicate to a processing microservice that it includes an update to the processing of the microservice. The configuration transaction object may include instructions that, when processed by the microservice, cause the microservice to be reconfigured. Reconfiguration may include modifying which workflow/version/stage the microservice looks for on the SDP, and/or may include modifying the core processing logic employed by the microservice.

At step 810, the configuration interface 660 may add the configuration transaction object to the SDP, where it may await processing by first microservice 820 and second microservice 830.

The configuration transaction object may be picked up by first microservice 820 and second microservice 830 in a similar fashion to that described above with respect to FIG. 5. At steps 821 and 831, first and second microservices 820 and 830 may poll the SDP to retrieve transactions matching their assigned workflow stages in corresponding workflow types. The configuration transaction objects may have a configuration workflow type, and the microservices may watch for a configuration workflow type object having the workflow stage corresponding to the microservice. At steps 823 and 833, the microservices may retrieve the configuration transaction object for processing.

At steps 825 and 835, the microservices may process the configuration transaction object when it is in a corresponding workflow stage. Processing the configuration transaction object may cause the microservice to be updated. For example, the configuration transaction object may cause the microservice to update what workflow/version/stage it looks for on the SDP. As another example, processing the configuration transaction object may cause the microservice to update the core processing logic that it applies to transactions.

At steps 827 and 837, the microservices may update the current workflow stage of the configuration transaction object and, at steps 829 and 839, the microservices may push the updated configuration object back to the SDP. For example, microservice 820 may update the current workflow stage of the configuration object to indicate that microservice 820 has completed processing, and microservice 830 may be configured to look for transaction objects that have a current workflow stage that indicates that microservice 820 completed its processing.

At step 840, the system may determine that the current workflow stage of the configuration transaction object indicates that the processing associated with the configuration workflow has completed, and the configuration transaction object may be removed from the SDP. Notification may be provided to an entity that prompted the reconfiguration that it has been implemented, in some embodiments.

Thus, according to some aspects, a computer-implemented method may comprise configuring a plurality of microservices on a streaming data platform to watch for transactions having a corresponding workflow stage associated with a first workflow. The first workflow may correspond to a transaction type and may comprise a plurality of processing steps required to approve a given transaction of the transaction type. The steps may further comprise generating a configuration transaction object that may be configured to cause reconfiguration of the first workflow by causing reconfiguration of at least one microservice of the plurality of microservices. The configuration transaction object may comprise transaction metadata that indicates a configuration workflow and a current workflow stage of the configuration transaction object. The steps may further comprise adding the configuration transaction object to the streaming data platform and updating the current workflow stage of the configuration transaction object to a first workflow stage. The method may comprise polling, by a first microservice of the plurality of microservices, the streaming data platform to retrieve transactions matching the first workflow stage; retrieving, by the first microservice and from the streaming data platform, the configuration transaction object based on the current workflow stage matching the first workflow stage; processing, by the first microservice, the configuration transaction object to reconfigure the first microservice; and updating the current workflow stage of the configuration transaction object to a second workflow stage based on completing processing, by the first microservice, of the configuration transaction object. The method may also comprise determining that the current workflow stage of the configuration transaction object indicates that the configuration transaction object has completed processing corresponding to the configuration workflow, and removing the configuration transaction object from the streaming data platform and outputting an indication that the configuration transaction object has completed the processing corresponding to the configuration workflow.

Reconfiguring the first microservice may comprise reconfiguring the first microservice to watch for a different second workflow stage. Reconfiguring the first microservice may cause the first microservice to process transaction objects at a different stage of the plurality of processing steps of the first workflow. Reconfiguring the first microservice may comprise reconfiguring the first microservice to modify at least one operation that the first microservice performs on transaction objects associated with the first workflow. Reconfiguring the first microservice may cause removal of at least one second microservice from the first workflow. The first microservice may be originally configured to update completed transactions with a first completed workflow stage. Reconfiguring the first microservice may comprise reconfiguring the first microservice to update completed transactions with a different completed workflow stage. Reconfiguring the first microservice may cause transaction objects to bypass at least one second microservice included in the first workflow. The first microservice may be originally configured to watch for transactions associated with the first workflow that have a first version value. The reconfigured first microservice may be configured to watch for transactions associated with the first workflow that have a different second version value.

The method may further comprise adding a first transaction object having a first version value to the streaming data platform prior to reconfiguring the first microservice; retrieving, by the first microservice and from the streaming data platform, the first transaction object based on a current workflow stage of the first transaction matching the first workflow stage; processing, by the first microservice, the first transaction object based on an original configuration of the first microservice based on the first version value; adding a second transaction object having a different second version value to the streaming data platform subsequent to reconfiguring the first microservice; retrieving, by the first microservice and from the streaming data platform, the second transaction object based on a current workflow stage of the second transaction matching the first workflow stage; and processing, by the first microservice, the second transaction object based on the reconfiguration of the first microservice based on the second version value. The steps may further comprise adding a first transaction object to the streaming data platform; determining a current version of the first workflow implemented on the streaming data platform; and updating a version value of the first transaction object based on the current version. The first microservice may process the first transaction object based on an original configuration or a modified configuration based on the version value.

The workflow corresponding to the transaction type may comprise a directed acyclic graph (DAG) indicating the plurality of processing steps required to approve a given transaction of the transaction type. The first microservice may be automatically configured to watch for transactions on the streaming data platform in the first workflow stage based on the DAG. Generating the configuration transaction object may be in response to an update to at least one of the plurality of processing steps indicated in the DAG. The steps may further comprise providing a graphical user interface to allow a user to update the at least one of the plurality of processing steps indicated in the DAG.

According to some aspects, a transaction exchange platform may comprise a streaming data platform, a plurality of microservices, at least one processor, and memory. Each microservice of the plurality of microservices may be automatically configured to watch for transactions on the streaming data platform in a corresponding workflow stage based on a plurality of workflows corresponding to a plurality of transaction types. The memory may store instructions that, when executed by the at least one processor, cause the platform to perform steps including configuring the plurality of microservices on the streaming data platform to watch for transactions having a corresponding workflow stage associated with a first workflow. The first workflow may correspond to a transaction type and comprises a plurality of processing steps required to approve a given transaction of the transaction type. The steps may further comprise processing, by a first microservice, transaction objects on the streaming data platform based on the configuration; and generating a configuration transaction object that may be configured to cause reconfiguration of the first workflow by causing reconfiguration of at least one of microservice of the plurality of microservices. The configuration transaction object may comprise transaction metadata that indicates a configuration workflow and a current workflow stage of the configuration transaction object. The steps may further comprise adding the configuration transaction object to the streaming data platform; updating the current workflow stage of the configuration transaction object to a first workflow stage; polling, by a first microservice of the plurality of microservices, the streaming data platform to retrieve transactions matching the first workflow stage; retrieving, by the first microservice and from the streaming data platform, the configuration transaction object based on the current workflow stage matching the first workflow stage; and processing, by the first microservice, the configuration transaction object to reconfigure the first microservice. Subsequent to processing the configuration transaction object, the first microservice may process transaction objects on the streaming data platform based on the reconfiguration.

According to some aspects, one or more non-transitory computer readable media may comprise instructions that, when executed by at least one processor, cause a transaction exchange platform to perform steps. Those steps may comprise configuring a first microservice on a streaming data platform to watch for transactions having a first workflow stage associated with a first workflow corresponding to a transaction type. The first workflow may comprise a plurality of processing steps required to approve a given transaction of the transaction type. The steps may further comprise configuring a second microservice on the streaming data platform to watch for transactions having a second workflow stage associated with the first workflow; and generating a configuration transaction object that may be configured to cause reconfiguration of the first workflow by causing reconfiguration of the first microservice and the second microservice. The configuration transaction object may comprise transaction metadata that indicates a configuration workflow, and a current workflow stage of the configuration transaction object. The steps may further comprise adding the configuration transaction object to the streaming data platform; updating the current workflow stage of the configuration transaction object to the first workflow stage; polling, by the first microservice, the streaming data platform to retrieve transactions matching the first workflow stage; retrieving, by the first microservice and from the streaming data platform, the configuration transaction object based on the current workflow stage matching the first workflow stage; processing, by the first microservice, the configuration transaction object to reconfigure the first microservice; updating the current workflow stage of the configuration transaction object to a second workflow stage based on completing processing, by the first microservice, of the configuration transaction object; polling, by the second microservice, the streaming data platform to retrieve transactions matching the second workflow stage; retrieving, by the second microservice and from the streaming data platform, the configuration transaction object based on the current workflow stage matching the second workflow stage; processing, by the second microservice, the configuration transaction object to reconfigure the second microservice; updating the current workflow stage of the configuration transaction object to a third workflow stage based on completing processing, by the second microservice, of the transaction object; determining that the current workflow stage of the configuration transaction object indicates that the configuration transaction object has completed processing corresponding to the configuration workflow; and removing the configuration transaction object from the streaming data platform and outputting an indication that the configuration transaction object has completed the processing corresponding to the configuration workflow.

According to some aspects, a computer-implemented method may comprise steps comprising configuring a plurality of microservices on a streaming data platform to watch for transactions having a corresponding workflow stage associated with a first workflow. The first workflow may correspond to a transaction type and comprises a plurality of processing steps required to approve a given transaction of the transaction type. The steps may further comprise generating a configuration transaction object that may be configured to cause reconfiguration of the first workflow by causing reconfiguration of at least one microservice of the plurality of microservices. The configuration transaction object may comprise transaction metadata that indicates: a configuration workflow, and a current workflow stage of the configuration transaction object. The steps may further comprise adding the configuration transaction object to the streaming data platform; retrieving, by a first microservice and from the streaming data platform, the configuration transaction object based on the current workflow stage matching a first workflow stage associated with the first microservice; processing, by the first microservice, the configuration transaction object to reconfigure the first microservice; and updating the current workflow stage of the configuration transaction object to a second workflow stage based on completing processing, by the first microservice, of the configuration transaction object.

Chronos—Snapshot Microservice and Transaction Replay

Some aspects described herein may provide a snapshot microservice on the transaction exchange platform, configured to maintain a record of the data values of each transaction object as they progress through the corresponding workflows. "Snapshot," when used to refer to the snapshot microservice, may refer to the functionality of the snapshot microservice to track a transaction object's data values and each of its changed states as an archival service. The snapshot microservice thus may also be referred to as a payment transaction object changed state archive, or Chronos. The snapshot microservice may create a snapshot record for new transaction objects and store a copy of the data of the transaction object. As the transaction object progresses through the workflow and is processed by the other microservices, the snapshot microservice can identify transaction objects that have their data changed. The snapshot microservice can retrieve the changed objects and store snapshot data tracking the change of the transaction object.

Figure 9:
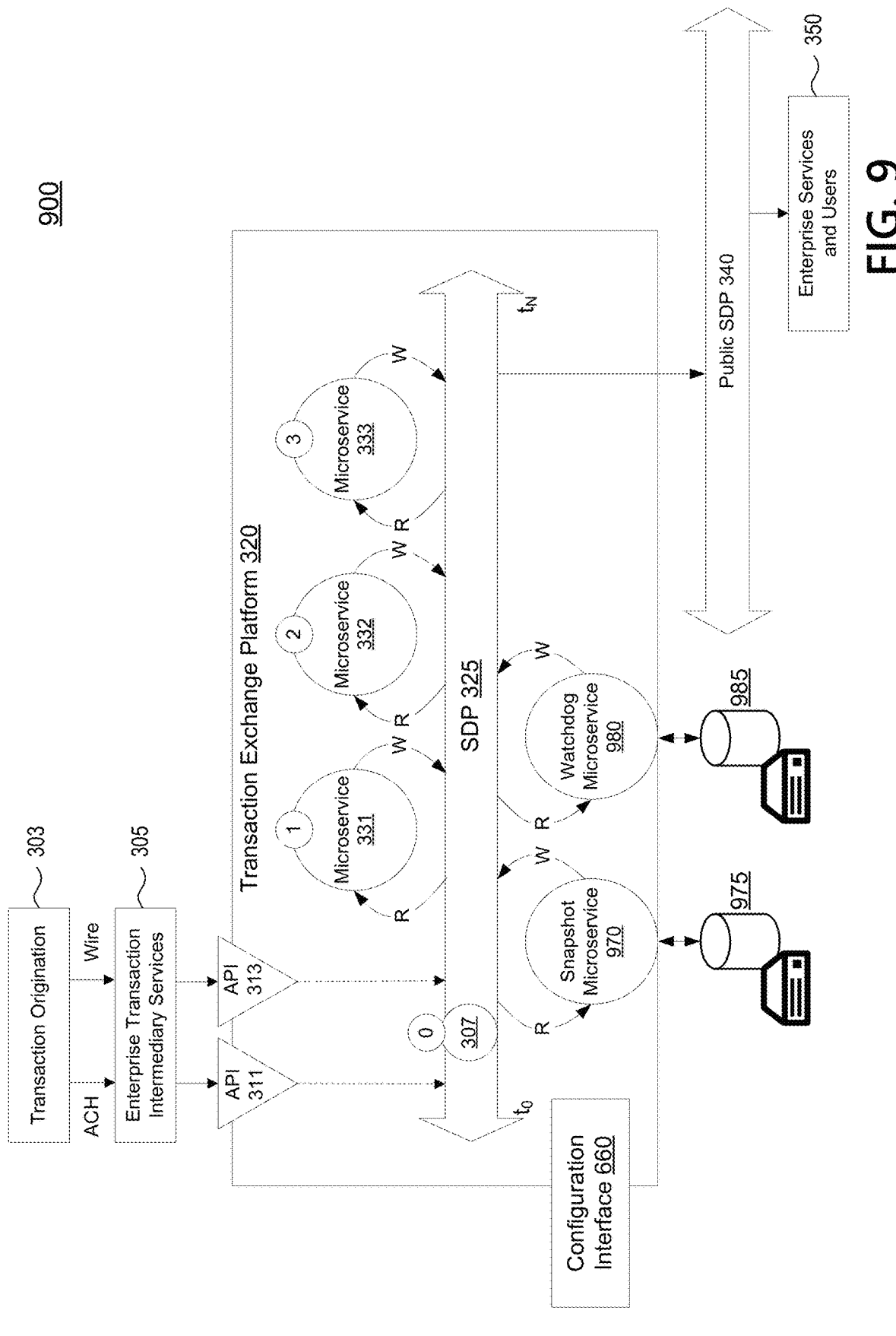
FIG. 9 depicts an example transaction exchange platform having a snapshot microservice and a watchdog microservice according to one or more aspects of the disclosure.

FIG. 9 illustrates a transaction processing system 900 that may be similar to transaction processing systems 300 and/or 600 of FIGS. 3A and 6. Transaction processing system 900 may add, relative to systems 300 and 600, snapshot microservice 970 and watchdog microservice 980. This document section focuses on snapshot microservice 970, while the next document section focuses on watchdog microservice 980.

Snapshot microservice 970 may operate on transaction exchange platform 320 to maintain a record of the data values of each transaction object on the streaming data platform, and may track how the transaction objects change during processing on the platform. Snapshot data may be stored in snapshot database 975, which may comprise on-disk storage capable of effectively storing large volumes of data. Snapshot microservice 970 and snapshot database 975 may be configured to store differential snapshots of a transaction object. Snapshot microservice 970 may store an original state of a transaction object when it is added to the SDP, and may store information indicating each subsequent change to the transaction object. Snapshot microservice may track data values associated with each of the transaction details, transaction addenda data, and/or transaction metadata. In some embodiments however, the transaction metadata may be additionally and/or alternatively tracked by watchdog microservice 980.

The snapshot microservice 970 may be configured to identify and retrieve transaction objects added to SDP 325 in an initialization stage. Transaction objects may be added to the SDP 325 in an "init" or initialization stage, indicating that none of the workflow steps have yet been completed. In some implementations, the initialization stage may be a separate stage that is marked completed prior to processing by a first microservice 331, or may be commensurate in scope with a first workflow stage associated with a first microservice 331 of the workflow. In some implementations, the initialization stage for the object may be handled as part of the processing by the APIs 311, 313 that receive transactions to be added to the SDP 325, or otherwise handled alongside workflow processing by the respective microservices 331, 332, and 333.

Snapshot microservice 970 may store an initial snapshot of a transaction object in the initialization stage, then update a current workflow stage of the transaction object to indicate that the initialization processing has completed. This may comprise updating the current workflow stage of the transaction object to match a first workflow stage associated with microservice 331, which microservice 331 performs the first step of the workflow. Alternatively, snapshot microservice 970 may treat transaction objects in the first workflow stage as being subject to initialization (as new objects), and may determine that an initial, new snapshot should be recorded in snapshot database 975.

Snapshot microservice 970 may be configured to poll the SDP to retrieve all transaction objects having changed data. In some embodiments, this may comprise retrieving all transaction objects and determining whether there have been any changes. In other embodiments, it may comprise retrieving specifically the transaction objects that have changed, whether based on determining that the data has changed or merely that a workflow stage has advanced. Snapshot microservice 970 may determine a difference in the changed transaction object and store snapshot information indicating the difference. The snapshot information may include metadata such as an associated timestamp, workflow stage, and/or any other suitable metadata to facilitate audit and potential rollback of the transaction object and workflow processing.

These snapshots of the transaction object may be used to correct processing errors in the approval workflow, as a transaction object may have its data reverted back to an earlier state and its workflow stage reverted to an earlier stage. In this way, the transaction object may be made to repeat an earlier step of the workflow and be subject to re-processing by a corresponding microservice (or, in some cases such as repeated failures, a human operator). The snapshot microservice 970 may regenerate a transaction object using the snapshot data corresponding to the transaction object from an earlier time, prior to a point in processing that is subject to the rewind. In effect, snapshot microservice 970 may roll back the values of the transaction object to an earlier point in time. Then, the regenerated transaction object may be put back on SDP 325 and will be picked up for re-processing by the earlier microservice. For example, if an error is determined to have occurred during processing of transaction object 307 by first microservice 331, the snapshot microservice 970 may revert transaction object 307 to state prior to processing by first microservice 331. The first microservice 331 would have updated the stage of the transaction object 307 to the second workflow stage when processing completed. The snapshot microservice 970 may revert the current workflow stage of the transaction object 307 to the first workflow stage, so that when the transaction object 307 is pushed back to the SDP 325 it will be picked up for processing again by the first microservice 331.

A command to replay a transaction may be received by the snapshot microservice 970. For example, watchdog microservice 980 may determine that processing by first microservice 331 completed abnormally, and may command snapshot microservice 970 to perform a replay. Other conditions may prompt a replay, such as an error state of a microservice or the transaction exchange platform 320.

The snapshot microservice may track the total number of times that a transaction object is reverted/replayed on one or more microservices, and may flag a transaction as presenting problems requiring manual or other review when the number of replays exceeds a transaction or based on other criteria. Replaying a transaction may cause an update of a transaction replay count associated with the transaction, which may be stored as part of the transaction object's transaction metadata and/or as part of the snapshot information. If a threshold number of replays takes place, for example a configurable maximum of 3 replays at a single stage of the workflow, the snapshot microservice 970 may flag the transaction as having failed and/or requiring further review. The maximum, which may be implemented as a threshold value, may be configured by a user and/or may be automatically configured by system processes based on historical data, current system state, and other performance metrics. The transaction may be held in a workflow stage corresponding to the microservice where processing failed, in some instances. In other instances, a failed transaction may be routed to additional processing, such as by a different workflow and/or other parts of the same workflow, where it may be processed by other microservices.

When a replay occurs, the snapshot information may continue to track all subsequent events as well as all events that had occurred already on the transaction, even if they are subject to rewinding. Thus, the snapshot information may support a comparison during troubleshooting to assess which parts of the system led to errors in the workflow. This information may be archived to assist in troubleshooting and audits. Snapshot information related to error processing that is fixed via replay may be deleted upon successful completion of the re-attempt.

The snapshot data may also support audit of the transactions, offering a complete picture of how the transaction object changed while on the transaction exchange platform. If desired as part of auditing results, the snapshot microservice 970 may replay an entire transaction snapshot by snapshot. This may be done in support of an audit or for troubleshooting and analysis.

Figure 10:
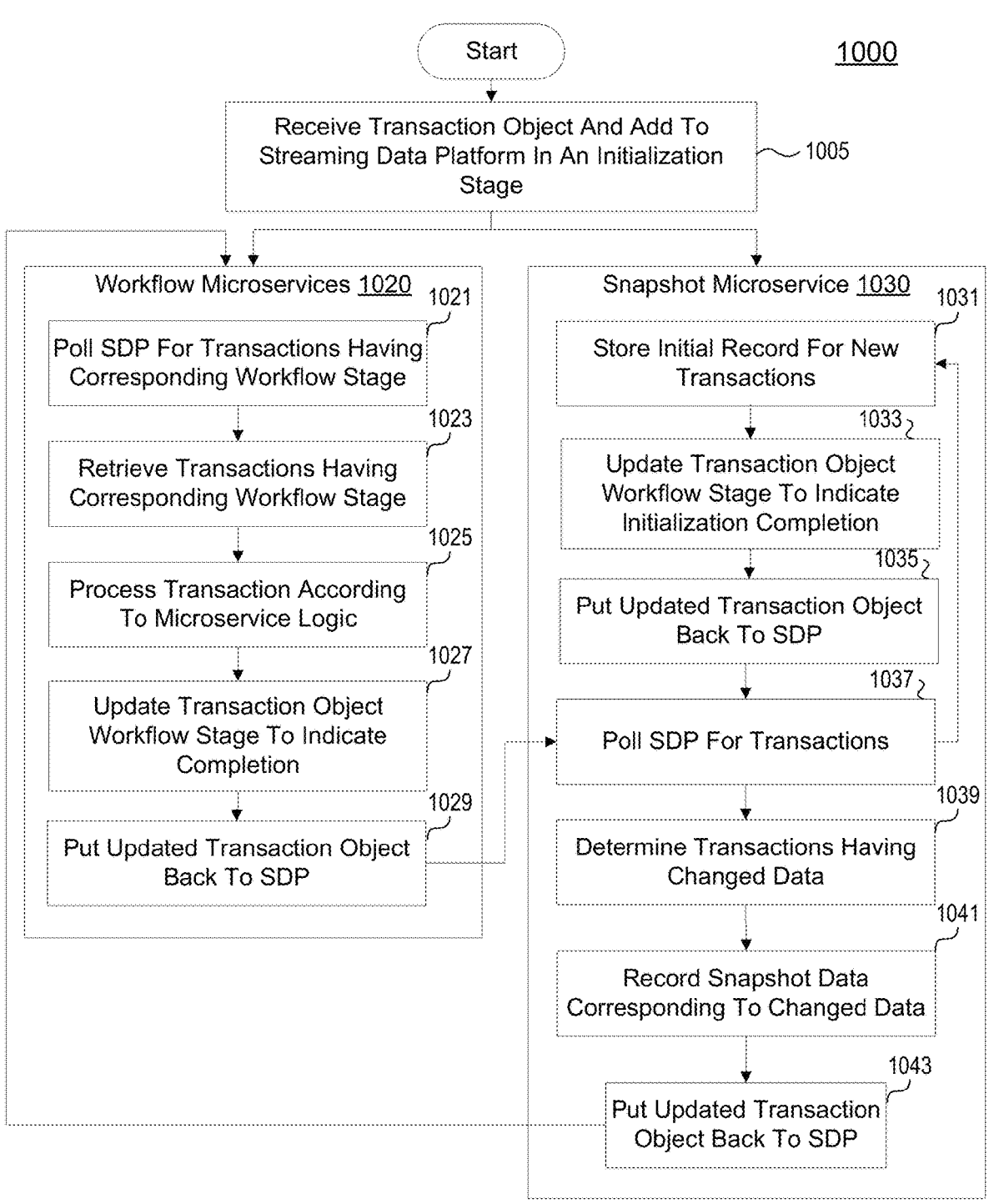
FIGS. 10-15 depict illustrative methods for operation of the snapshot microservice and the watchdog microservice according to one or more aspects of the disclosure.

FIG. 10 depicts a flowchart illustrating an example method 1000 to generate snapshot information tracking a transaction object on a transaction exchange platform, such as transaction exchange platform 320. Method 1000 may be performed by any suitable computing device and/or combination of computing devices, referred to as the system implementing method 1000.

At step 1005, the transaction exchange platform may receive a transaction object and add it to an SDP. The transaction object may be added to the SDP in an initialization stage.

At step 1031, snapshot microservice 1030 may store an initial snapshot record for new transaction objects on the SDP. For example, snapshot microservice 1030 may poll the SDP for transaction objects in the initialization stage. Alternatively and/or additionally, snapshot microservice 1030 may poll SDP for all transaction objects, and determine which are new and should be stored as initial snapshot records.

At step 1033, snapshot microservice 1030 may update the current workflow stage of the transaction object to indicate completion of initialization processing by the snapshot microservice 1030. This may comprise updating the current workflow stage of the transaction object to be a workflow stage associated with a workflow microservice 1020. At step 1035, snapshot microservice 1030 may put the transaction object back to the SDP with the updated current workflow stage.

At step 1021, workflow microservice 1020 may poll the SDP for transactions having a current workflow stage assigned to the microservice, and at step 1023 the workflow microservice may retrieve the matching transaction objects. At step 1025, workflow microservice 1020 may process the transaction objects according to its respective processing logic, which may include updating, adding, removing, and/or otherwise changing values of the transaction details, addenda data, and/or transaction metadata associated with the transaction object. At step 1027, workflow microservice 1020 may update the transaction object's current workflow stage to indicate completion of processing by microservice 1020 and, at step 1029, put the updated transaction object back to the SDP.

At step 1037, snapshot microservice 1030 may poll the SDP for transactions and, at step 1039, determine that transactions have changed data. Snapshot microservice 1030, at step 1041, may record snapshot data corresponding to the changed data as a result of processing by workflow microservices 1020. The snapshot microservice 1030 may, at step 1043, put the transaction object back to the SDP for further processing by workflow microservices 1020.

Figure 11:
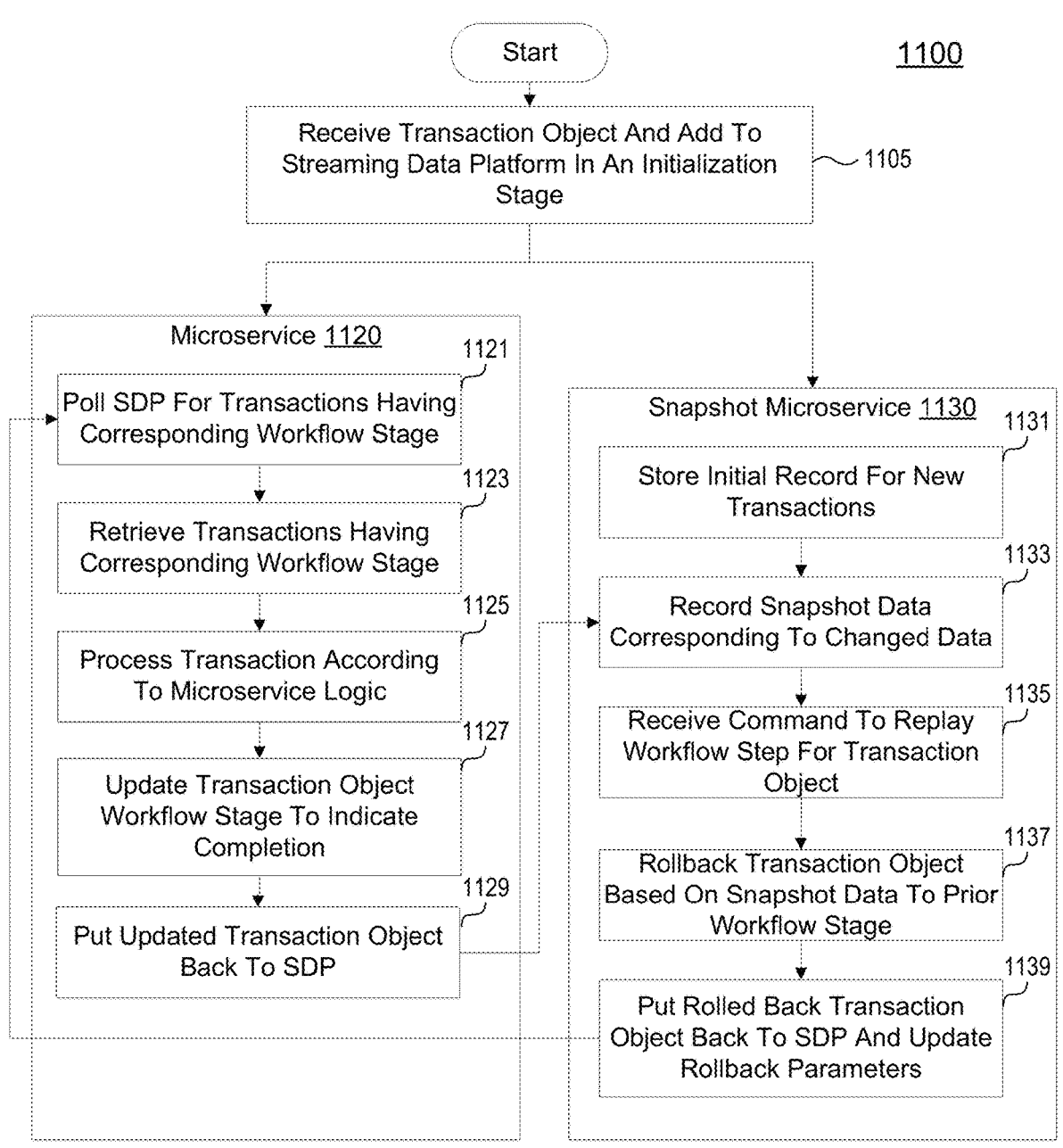

FIG. 11 depicts a flowchart illustrating an example method 1100 to replay a transaction (e.g., subject it to reprocessing) using a snapshot microservice on a transaction exchange platform, such as transaction exchange platform 320. Method 1100 may be performed by any suitable computing device and/or combination of computing devices, referred to as the system implementing method 1100.

At step 1105, the transaction exchange platform may receive a transaction object and add it to an SDP. The transaction object may be added to the SDP in an initialization stage.

The transaction object may be processed by microservice 1120 in steps 1121, 1123, 1125, 1127, and 1129 as described herein, for example in similar fashion to that described with respect to FIG. 10 in steps 1021, 1023, 1025, 1027, and 1029.

Snapshot microservice 1130 may record initial and changed snapshot information in steps 1131 and 1131, as described in greater detail above with respect to FIG. 10 in steps 1031, 1033, 1035, 1037, 1039, 1041, and 1043.

At step 1135, snapshot microservice 1130 may receive a command to replay a workflow step for a transaction object. For example, a watchdog microservice may send snapshot microservice 1130 a command to replay the transaction object in a first workflow stage.

At step 1137, snapshot microservice 1130 may use the stored snapshot information to rollback the transaction object to its state prior to the point of replay. The transaction object may be made to repeat an earlier step of the workflow and be subject to re-processing by a microservice to the workflow step indicated to be replayed. The snapshot microservice 1130 may regenerate a transaction object using the snapshot data corresponding to the transaction object from an earlier time, prior to a point in processing that is subject to the rewind.

At step 1139, snapshot microservice 1130 may put the regenerated transaction object back on the SDP. Because the regenerated transaction object has the earlier workflow stage, it will be picked up for re-processing by the earlier microservice.

Thus, according to some aspects, a computer-implemented method may comprise steps comprising receiving a transaction object comprising transaction details, addenda data, and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform. Adding the transaction object to the streaming data platform may comprise setting the current workflow stage of the transaction object to an initialization stage. The steps may further comprise polling, by a snapshot microservice, the streaming data platform to retrieve transactions matching the initialization stage. The initialization stage may be associated with the snapshot microservice. The steps may further comprise retrieving, by the snapshot microservice and from the streaming data platform, the transaction object based on the current workflow stage matching the initialization stage; storing, by the snapshot microservice, snapshot data corresponding to the transaction object; and updating the current workflow stage of the transaction object to a next workflow stage based on completing storing, by the snapshot microservice, the snapshot data corresponding to the transaction object. The method may comprise retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object to modify the addenda data. The method may comprise determining, by the snapshot microservice and via the streaming data platform, that at least one value associated with the addenda data of the transaction object has changed after the transaction object has left the initialization stage, and storing, by the snapshot microservice, snapshot data corresponding to the changed at least one value associated with the addenda data.

Determining that the at least one value associated with the addenda data of the transaction object has changed may comprise retrieving, by the snapshot microservice and from the streaming data platform, the transaction object. The steps may further comprise determining that the processing, by the first microservice, of the transaction object did not complete successfully, and causing the first microservice to repeat processing of the transaction object based on the snapshot data corresponding to the transaction object from prior to the start of the processing by the first microservice. Causing the first microservice to repeat processing of the transaction object may comprise regenerating, by the snapshot microservice, the transaction object based on the snapshot data corresponding to the transaction object from prior to the start of the processing by the first microservice, and returning the regenerated transaction object to the streaming data platform. The current workflow stage of the regenerated transaction object may be set to the first workflow stage. The steps may further comprise determining a number of times that the transaction object has undergone processing by the first microservice and, in response to determining that the number of times that the transaction object has undergone processing by the first microservice exceeds a threshold value, rejecting the transaction object as having failed processing associated with the first microservice. The steps may further comprise flagging the transaction object for further review based on rejecting the transaction and holding the transaction object in the first workflow stage pending the further review. Updating the current workflow stage of the transaction object to a second workflow stage may be based on determining that the further review is completed. Flagging the transaction object for further review may comprise flagging the transaction object for manual review by a user. Flagging the transaction object for further review may comprise causing the transaction object to be processed by a third microservice. Updating the current workflow stage of the transaction object to the second workflow stage may be based on determining that processing by the third microservice is completed. The snapshot microservice may record second snapshot data corresponding to the transaction object from prior to causing the first microservice to repeat processing of the transaction object. The second snapshot data may be maintained despite the repeat processing of the transaction object.

The steps may further comprise determining, by the snapshot microservice and via the streaming data platform, that at least one value associated with the transaction metadata has changed; retrieving, by the snapshot microservice and from the streaming data platform, the transaction object based on determining that the at least one value has changed; and storing, by the snapshot microservice, data corresponding to the changed at least one value associated with the transaction metadata. The next workflow stage may correspond to the first workflow stage associated with the first microservice. The initialization stage may correspond to the first workflow stage. The snapshot microservice may generate a transaction history for the transaction object. The snapshot microservice may generate a transaction history for each transaction object added to the streaming data platform. The snapshot microservice may store snapshot data in an on-disk database.

According to some aspects, a transaction exchange platform may comprise a streaming data platform, a plurality of microservices, at least one processor, and memory. Each microservice of the plurality of microservices may be configured to watch for transactions on the streaming data platform in a corresponding workflow stage based on a plurality of workflows corresponding to a plurality of transaction types. The memory may store instructions that, when executed by the at least one processor, cause the platform to perform steps including receiving a transaction object comprising transaction details, addenda data, and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The steps may further comprise adding the transaction object to a streaming data platform. Adding the transaction object to the streaming data platform may comprise setting the current workflow stage of the transaction object to an initialization stage. The steps may further comprise polling, by a snapshot microservice, the streaming data platform to retrieve transactions matching the initialization stage. The initialization stage may be associated with the snapshot microservice. The steps may further comprise retrieving, by the snapshot microservice and from the streaming data platform, the transaction object based on the current workflow stage matching the initialization stage; and storing, by the snapshot microservice, snapshot data corresponding to the transaction object, updating the current workflow stage of the transaction object to a next workflow stage based on completing storing, by the snapshot microservice, the snapshot data corresponding to the transaction object; and retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object to modify the addenda data; determining, by the snapshot microservice and via the streaming data platform, that at least one value associated with the addenda data of the transaction object has changed after the transaction object has left the initialization stage; and storing, by the snapshot microservice, snapshot data corresponding to the changed at least one value associated with the addenda data.

The steps may further comprise determining that the processing, by the first microservice, of the transaction object did not complete successfully; and causing the first microservice to repeat processing of the transaction object based on the snapshot data corresponding to the transaction object from prior to the start of the processing by the first microservice. Causing the first microservice to repeat processing of the transaction object may comprise causing the transaction exchange platform to regenerate, by the snapshot microservice, the transaction object based on the snapshot data corresponding to the transaction object from prior to the start of the processing by the first microservice; and return the regenerated transaction object to the streaming data platform. A current workflow stage of the regenerated transaction object may be set to the first workflow stage. The snapshot microservice may generate a transaction history for each transaction object added to the streaming data platform.

According to some aspects, one or more non-transitory computer readable media may comprise instructions that, when executed by at least one processor, cause a transaction exchange platform to perform steps. Those steps may comprise receiving a transaction object comprising transaction details, addenda data, and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform. Adding the transaction object to the streaming data platform may comprise setting the current workflow stage of the transaction object to an initialization stage. The steps may further comprise polling, by a snapshot microservice, the streaming data platform to retrieve transactions matching the initialization stage. The initialization stage may be associated with the snapshot microservice. The steps may further comprise retrieving, by the snapshot microservice and from the streaming data platform, the transaction object based on the current workflow stage matching the initialization stage; and storing, by the snapshot microservice, snapshot data corresponding to the transaction object, updating the current workflow stage of the transaction object to a next workflow stage based on completing storing, by the snapshot microservice, the snapshot data corresponding to the transaction object; and retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object to modify the addenda data; determining, by the snapshot microservice and via the streaming data platform, that at least one value associated with the addenda data of the transaction object has changed after the transaction object has left the initialization stage; storing, by the snapshot microservice, snapshot data corresponding to the changed at least one value associated with the addenda data; determining that the processing, by the first microservice, of the transaction object did not complete successfully; and causing the first microservice to repeat processing of the transaction object based on the snapshot data corresponding to the transaction object from prior to the start of the processing by the first microservice. Causing the first microservice to repeat processing of the transaction object may comprise regenerating, by the snapshot microservice, the transaction object based on the snapshot data corresponding to the transaction object from prior to the start of the processing by the first microservice; and returning the regenerated transaction object to the streaming data platform. A current workflow stage of the regenerated transaction object may be set to the first workflow stage.

Arbiter—Watchdog Microservice for Tracking, Monitoring, and Remediation

Some aspects described herein may provide a watchdog microservice on the transaction exchange platform, configured to track the progress of transaction objects through their respective workflows. "Watchdog," when referring to the watchdog microservice, may refer to the functionality of the watchdog microservice to observe and archive the progress of transaction objects on the transaction exchange platform, and enforce the associated workflows. Thus the watchdog microservice may also be referred to as an observability and archive microservice, or Arbiter. The watchdog microservice may determine that a transaction object has completed the approval workflow based on the transaction object completing each component step of the workflow, and may cause the completed transaction to be output from the transaction exchange platform. The watchdog microservice may also enforce the workflow, causing transactions to repeat and/or revisit problematic steps of the workflow.

The watchdog microservice may track metrics and/or other statistics associated with the workflows, microservices, and/or transactions. Based on the tracked workflow data, the watchdog microservice may be able to assess trends associated with a workflow, microservice, or transaction. The watchdog microservice may compare a metric and/or other statistic to threshold performance values to determine when the workflow, microservice, or transaction is subject to abnormal or undesirable performance complications. For example, the watchdog microservice could determine that a particular microservice has a current average processing time greater than a configured warning threshold, or outside a typical range. Based on detecting abnormal or undesirable performance of the workflow, microservice, or transaction, the watchdog microservice can generate and/or implement a recommended corrective action. Example corrective actions may include causing a transaction to be replayed via a snapshot microservice, and causing a workflow to be dynamically reconfigured using a configuration interface.

FIG. 9, discussed above with respect to the snapshot microservice, also depicts watchdog microservice 980 and watchdog database 985. Watchdog microservice 980 may generate workflow tracking records for each transaction object on the transaction exchange platform 320, and may store information indicating whether the transaction object completed each step of the workflow along with timestamps and other suitable metadata. The workflow tracking records may be stored in watchdog database 985, which may comprise an in-memory database configured to support quick access and retrieval of records while on SDP 325.

The watchdog microservice 980 may serve as the judge (arbiter) in determining when a transaction object has completed the workflow processing steps of its corresponding workflow. This is further described with respect to FIG. 12.

Figure 12:
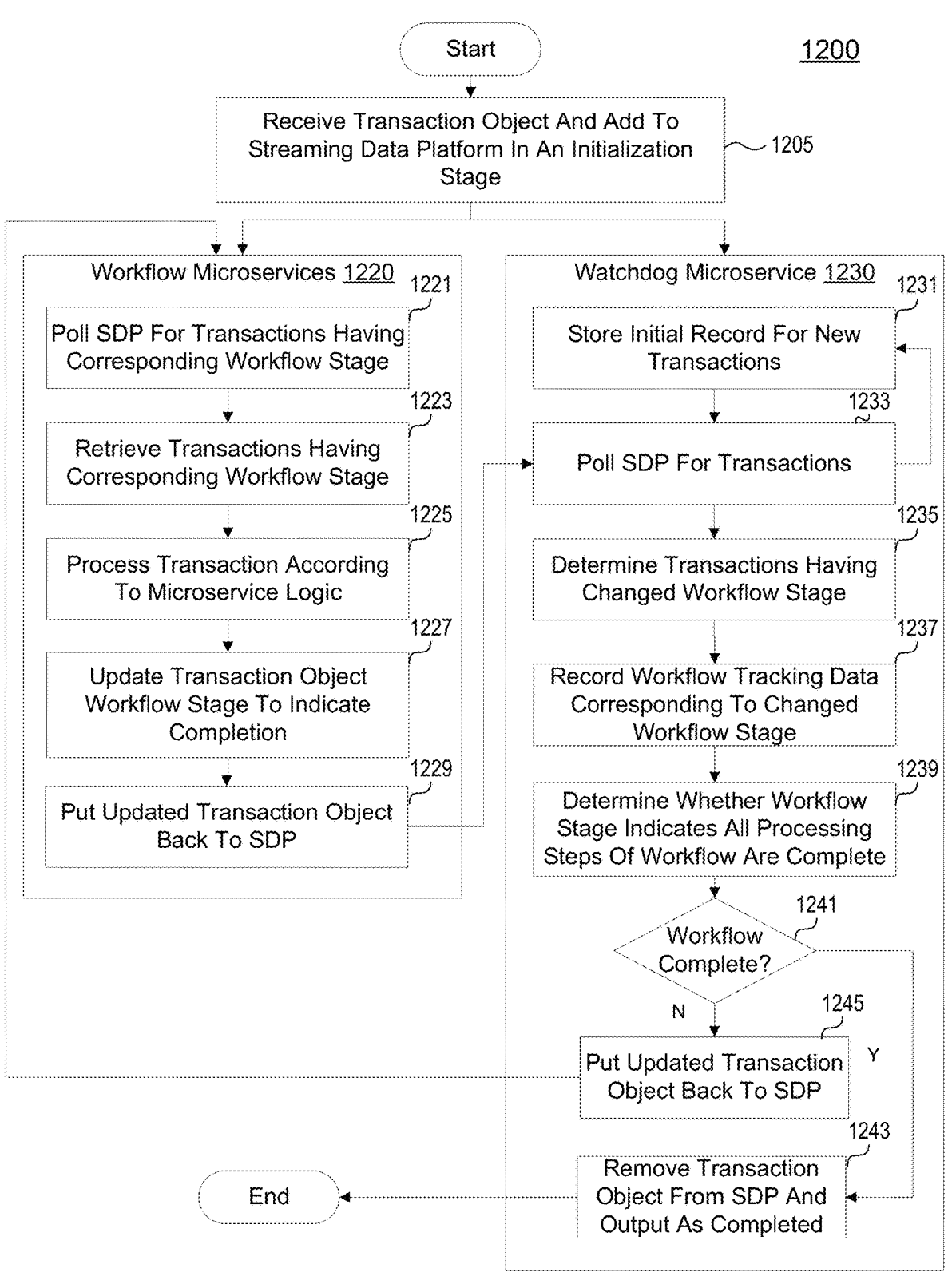

FIG. 12 depicts a flowchart illustrating an example method 1200 to track workflow progress and determine if a transaction has completed the workflow on a transaction exchange platform, such as transaction exchange platform 320. Method 1200 may be performed by any suitable computing device and/or combination of computing devices, referred to as the system implementing method 1200.

At step 1205, the transaction exchange platform may receive a transaction object and add it to an SDP. The transaction object may be added to the SDP in an initialization stage.

At step 1231, watchdog microservice 1230 may store an initial record for new transaction objects on the SDP. Watchdog microservice 1230 may identify new transactions on the SDP, potentially as a result of the initialization stage, and may generate new workflow tracking records for the new transaction objects. Watchdog microservice 1230 may poll the SDP to retrieve new transactions as they are added. Additionally and/or alternatively, watchdog microservice 1230 may poll the SDP to retrieve all new transactions and determine which are new, as shown in step 1233.

Workflow microservices 1220 may process transaction objects on the SDP in the manners described above in detail. For example, illustrated steps 1221, 1223, 1225, 1227, and 1229 may correspond to steps 1021, 1023, 1025, 1027, and 1029 of FIG. 10.

At step 1233, watchdog microservice 1230 may poll the SDP for transactions and, at step 1235, determine transaction objects having a changed workflow stage. In some embodiments, watchdog microservice 1230 may poll all transactions and determine which have changed. In other embodiments, watchdog microservice 1230 may poll the SDP to request transactions that have changed.

At step 1237, watchdog microservice 1230 may record workflow tracking data corresponding to the change in the workflow stage of the transaction object. For example, watchdog microservice 1230 may update a workflow tracking record associated with the transaction object to indicate it completed a workflow stage associated with a workflow microservice 1220. The watchdog microservice 1230 may further store other metadata regarding the updated workflow stage, including a timestamp of the recorded change.

At step 1239, the watchdog microservice 1230 may determine whether the current workflow stage of the transaction object (and/or the workflow tracking data) indicate that the transaction object has met the requisite steps of the workflow associated with the transaction type of the transaction objects. For example, the watchdog microservice 1230 may assess whether the current workflow stage information of the transaction metadata indicates completion of a series of steps that satisfy the criteria of the workflow associated with a particular transaction type of the transaction object.

At step 1241, the watchdog microservice 1230 may determine that the workflow is not complete, and method 1200 may proceed to step 1245 where the transaction object is put back to the SDP after recording the workflow tracking information.

If, at step 1241, the watchdog microservice 1230 determines that the workflow is complete, method 1200 may proceed to step 1243 where the transaction object is removed from the SDP of the transaction exchange platform and output as completed. For example, the transaction object may be updated with an indication that it completed the workflow and is approved, and may be put to a public SDP 340 accessible to enterprise systems and users 350.

Additionally and/or alternatively to the workflow completion determinations described above, the watchdog microservice 980/1230 may enforce the individual steps of the workflow. The watchdog microservice may assess whether a current workflow stage indicates a valid workflow stage under the restrictions of the workflow structure. If the current workflow stage of the transaction object is not valid, the watchdog microservice may cause the transaction object to be processed by one or more appropriate microservices associated with the workflow, thereby enforcing the workflow. Working in conjunction with the snapshot microservice, the watchdog microservice may cause a transaction to repeat a step of the workflow by reverting the transaction object to an earlier state in response to detecting problems.

According to some aspects, the watchdog microservice may track metrics and/or other statistics associated with the workflows, microservices, and/or transactions. Based on the tracked workflow data, the watchdog microservice may be able to assess trends associated with a workflow, microservice, or transaction. The watchdog microservice may compare a metric and/or other statistic to threshold performance values to determine when the workflow, microservice, or transaction is subject to abnormal or undesirable performance complications. This is described further below with respect to FIG. 13.

Figure 13:
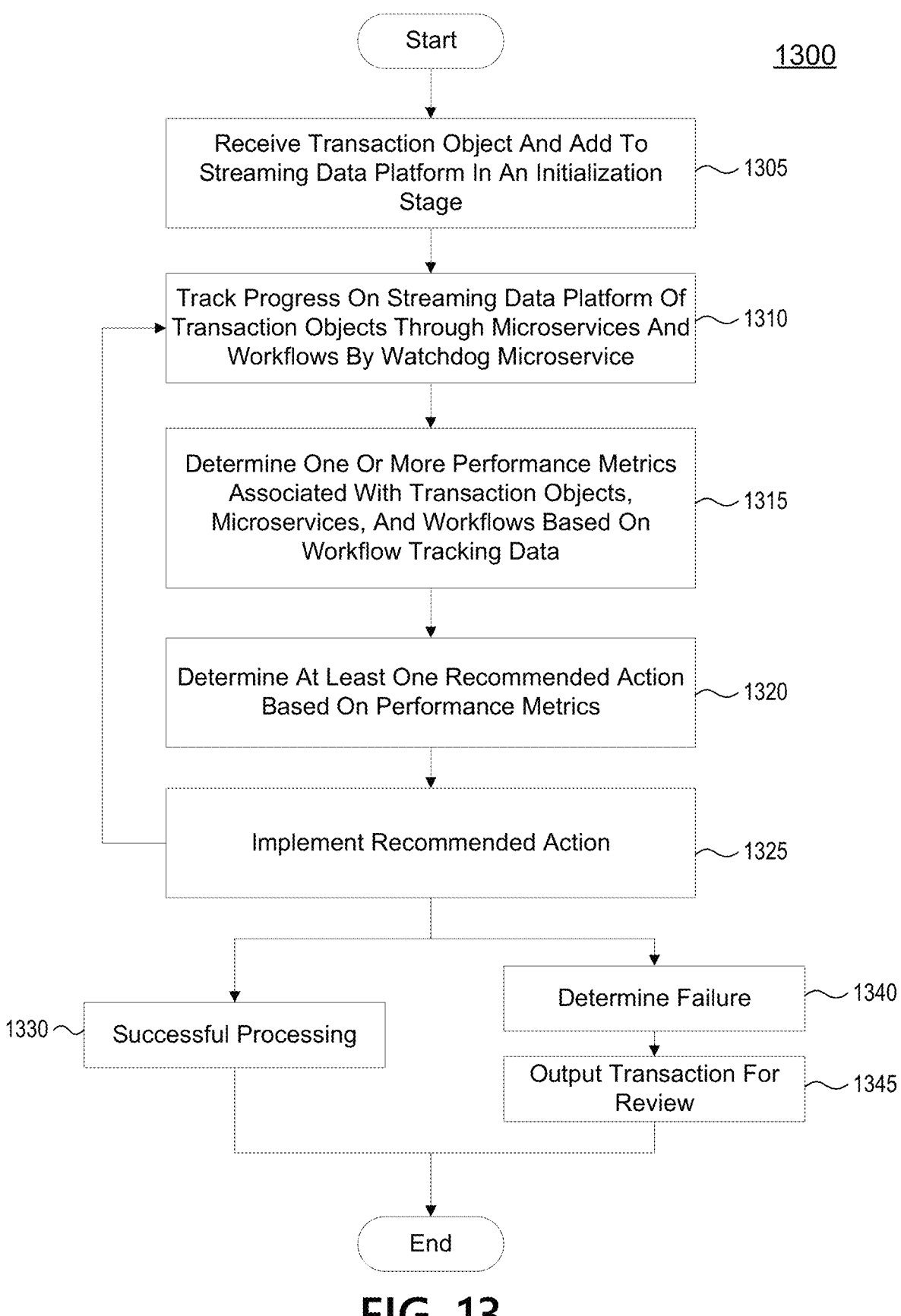

FIG. 13 depicts a flowchart illustrating an example method 1300 to track workflow progress and recommend corrective action based on performance metrics on a transaction exchange platform, such as transaction exchange platform 320. Examples of performance metrics include, for example, how long it takes a transaction to complete an associated workflow from start to finish. As will be discussed, performance metrics may be measured at any suitable level, for example per transaction, per group of transaction, within a time frame, within a sample, and the like. Method 1300 may be performed by any suitable computing device and/or combination of computing devices, referred to as the system implementing method 1300.

At step 1305, the transaction exchange platform may receive a transaction object and add it to an SDP. The transaction object may be added to the SDP in an initialization stage.

At step 1310, the watchdog microservice may track progress of transaction objects on the SDP through the microservices and workflows associated with a transaction type of the transaction object, as described above with respect to FIG. 12.

At step 1315, the watchdog microservice may determine one or more performance metrics associated with the transaction exchange platform, one or more workflows, one or more microservices, types of transactions, groups of transactions, individual transactions, and/or any suitable granularity. The watchdog microservice may record how long it takes a transaction to move through its corresponding workflow, from microservice to microservice. This time may be recorded against upper and/or lower control limits with a rolling time period. The time period may be taken into account and normalized against business cycles (for example: weekends are different than workdays and certain hours of the work day look very different). Other metrics may be considered besides processing time, such as throughput (volume), error rates, approve/deny rates, paths taken in branching workflows, and/or any other suitable metric.

Metrics may be tracked at any desired level of granularity. For example, the watchdog microservice may track how long transactions take to progress through the ACH workflow, and may assess whether this is within historical performance ranges. Similarly, the watchdog microservice may track how long a particular microservice takes to process transactions over the last five minutes and determine when this rises above a warning level, which may indicate a problem with the microservice. The watchdog microservice may determine baseline performance metrics for the transaction exchange platform, workflows, microservices, and the like. Current metrics may be compared to these baseline metrics to determine and address abnormal performance.

At step 1320, the watchdog microservice may determine at least one recommended action based on the performance metrics. Many corrective actions may be recommended by the watchdog microservice, which may flexibly adapt and learn suitable processes for responding to abnormal system conditions. A common recommended corrective action may be to command replay of an earlier workflow stage for a transaction or group of transactions. Working with the snapshot microservice, the watchdog microservice can cause a transaction object to revert to an earlier state, where the reversion to the current workflow stage of the transaction object would cause it to be processed again by an appropriate microservice. Where a particular microservice is showing performance abnormalities across a range of transactions, the watchdog microservice may determine that the particular microservice is having problems and recommend a suitable corrective action. As an example, the watchdog microservice may determine that a dynamic reconfiguration to implement alternate processing workflows, addressing the issues presented by the particular microservice, represents a suitable corrective action. The watchdog microservice may coordinate with the configuration interface to affect a reconfiguration of the workflow and the corresponding microservices, potentially temporarily. In some implementations, dynamic reconfiguration of a workflow, microservice, or transaction may be recommended and implemented once successive replays through the snapshot microservice have failed. Such reconfiguration may address patterns of failure that become apparent from repeat errors from the microservices/workflows.

The watchdog microservice may implement other corrective actions as well. For example, the watchdog microservice may utilize machine learning techniques to self-optimize the workflows based on any suitable feature, such as enhancing actions (rather than corrective action), security lockdown against intrusions, speed throughput, prioritized routing, restart, and most any other incident, administrative, or management handling. The watchdog microservice provides a useful interface and allows machine learning collector agents to be deployed on the transaction exchange platform to gather system state information for use in optimizing and managing the transaction exchange platform. Other metrics in addition to performance, security, resiliency, responsiveness, robustness, visibility, etc. may be considered by the watchdog microservice, and the flexibility and comprehensive scope of the watchdog microservices may enable powerful management of the transaction exchange platform.

At step 1325, the watchdog microservice may cause the recommended action to be implemented. For example, the watchdog microservice may command the snapshot microservice to replay a workflow stage for the transaction object. As another example, the watchdog microservice may command the configuration interface to dynamically reconfigure one or more workflows and/or microservices based on the performance metric.

Subsequent to implementing the corrective action, the watchdog microservice may determine that successful processing is completed in step 1330. Or the watchdog microservice may determine that processing has failed in step 1340, and may output the transaction for further review (manually and/or automatically), and may generate another recommended action, at step 1345.

According to some aspects, and as discussed above, the watchdog microservice may recommend a corrective action replay of an earlier workflow stage for a transaction or group of transactions. Working with the snapshot microservice, the watchdog microservice can cause a transaction object to revert to an earlier state, where the reversion to the current workflow stage of the transaction object would cause it to be processed again by an appropriate microservice. This is described further below with respect to FIG. 14.

Figure 14:
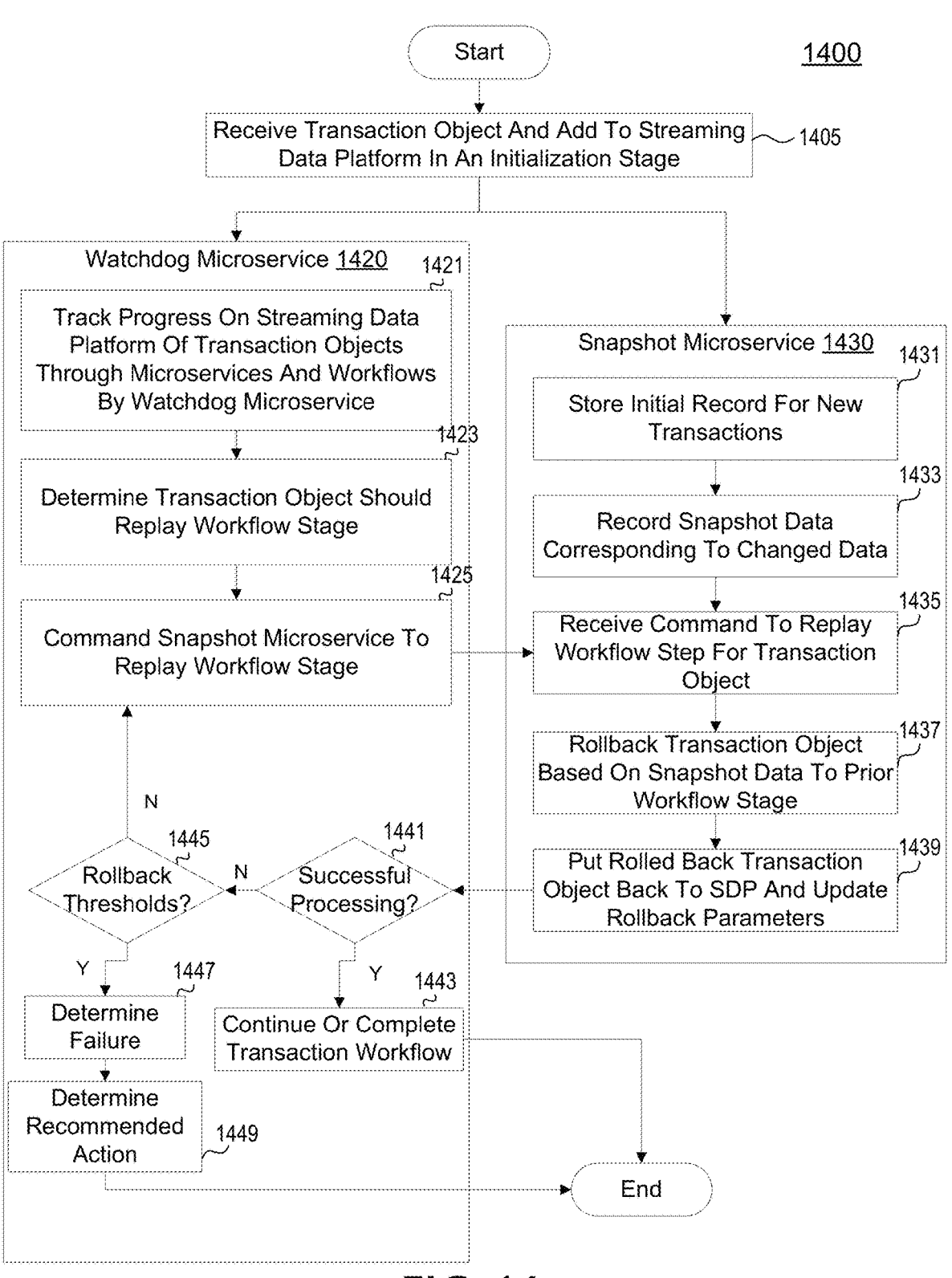

FIG. 14 depicts a flowchart illustrating an example method 1400 to track performance metrics and determine to replay a transaction on a transaction exchange platform, such as transaction exchange platform 320. Method 1400 may be performed by any suitable computing device and/or combination of computing devices, referred to as the system implementing method 1400. FIG. 14 may combine aspects of FIGS. 11 and 13, as explained further below.

At step 1405, the transaction exchange platform may receive a transaction object and add it to an SDP. The transaction object may be added to the SDP in an initialization stage. At step 1421, watchdog microservice 1420 may track programs on the SDP of transaction objects through microservice and workflows, as described with respect to FIG. 12 above.

At step 1423, watchdog microservice 1420 may determine that a transaction object should replay a workflow stage. For example, as discussed above with respect to FIG. 13, the watchdog microservice may determine that a transaction object did not correctly complete the workflow step and/or that the microservice associated with the step is experiencing abnormal performance issues. At step 1425, the watchdog microservice 1420 may command snapshot microservice 1430 to replay the transaction object at the earlier workflow stage.

Snapshot microservice 1430 may store snapshot data records for transaction objects on the SDP in steps 1431 and 1433, as discussed above in FIGS. 10 and 11. At step 1435, snapshot microservice 1430 may receive the command to replay the workflow step for the transaction object from the watchdog microservice 1420. Snapshot microservice may rollback the transaction object and reinject it to the SDP at steps 1437 and 1439, in the manner described above with respect to FIG. 11.

At step 1441, watchdog microservice 1420 may determine if the replayed workflow stage was processed successfully. If it was processed successful, method 1400 may proceed to step 1443 where the transaction workflow continues.

If, at step 1441, watchdog microservice 1420 determines that processing did not complete successfully, watchdog microservice 1420 may determine whether a maximum number of rollbacks have been attempted at step 1445. The snapshot microservice 1430 and/or watchdog microservice 1420 may maintain a counter of the number of rollback/ replay attempts. The number of rollback/replay attempts is less than a configurable threshold, then processing may return to step 1425 where watchdog microservice 1420 again commands snapshot microservice 1430 to replay the transaction.

If, at step 1445, watchdog microservice 1420 determines that a maximum number of replay attempts have already occurred, then watchdog microservice may determine a failure of the transaction to progress through the workflow stage at step 1447. At step 1449 the watchdog microservice 1420 may determine a further recommended action, such as triggering a dynamic reconfiguration of the workflow. This is shown further in FIG. 15.

Figure 15:
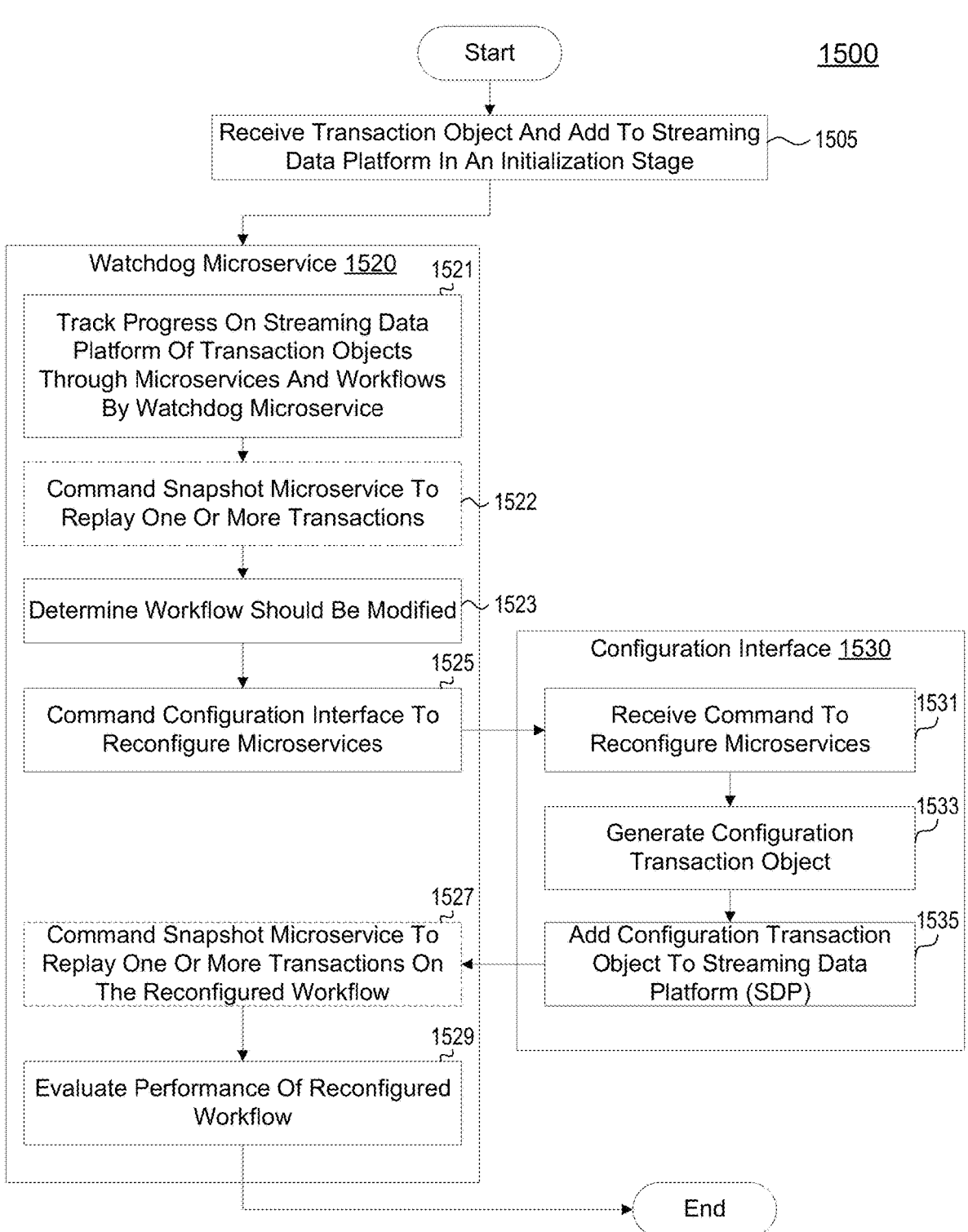

FIG. 15 depicts a flowchart illustrating an example method 1500 to track performance metrics and determine to replay a transaction on a transaction exchange platform, such as transaction exchange platform 320. Method 1500 may be performed by any suitable computing device and/or combination of computing devices, referred to as the system implementing method 1500. FIG. 15 may combine aspects of FIGS. 11-14, as explained further below.

At step 1505, the transaction exchange platform may receive a transaction object and add it to an SDP. The transaction object may be added to the SDP in an initialization stage. At step 1521, watchdog microservice 1520 may track programs on the SDP of transaction objects through microservice and workflows, as described with respect to FIG. 12 above.

At step 1522, the watchdog microservice may determine that a transaction object should have a particular workflow stage replayed, and may order the snapshot microservice to replay the transaction as described in FIG. 14. Step 1522 may be optional, as watchdog microservice 1520 may determine to command dynamic reconfiguration even in the absence of a replayed transaction.

At step 1523, the watchdog microservice may determine that the transaction exchange platform, one or more workflows, one or more microservices, or any other component should be modified. As discussed further above with respect to FIG. 13, the watchdog microservice may make this determination based on tracking one or more performance metrics associated with the transaction exchange platform and/or any of its components.

At step 1525, the watchdog microservice 1520 may command the configuration interface 1530 to reconfigure one or more microservices (and/or workflows, and/or any other component of the transaction exchange platform).

At step 1531, configuration interface 1530 may receive the command to reconfigure the microservices of the workflow, and method 1500 may proceed through steps 1533 and 1535 to generate a configuration transaction object that is pushed to the SDP to affect the desired reconfiguration, as described above with respect to FIG. 8.

At step 1527, the watchdog microservice 1520 may command the snapshot microservice to replay the transaction object using the reconfigured workflow, if a particular transaction and/or group of transactions were subject to erroneous and/or failed processing on the original configuration.

At step 1529, the watchdog microservice 1520 may evaluate performance of the reconfigured workflow and continue to evaluate performance metrics associated with aspects of the transaction exchange platform.

Thus, according to some aspects, a computer-implemented method may comprise receiving a transaction object comprising transaction details and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform and retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object and updating the current workflow stage of the transaction object to a second workflow stage based on completing processing, by the first microservice, of the transaction object. In response to determining, by a watchdog microservice and via the streaming data platform, that the current workflow stage of the transaction object has changed, the method may comprise: retrieving, by the watchdog microservice and from the streaming data platform, the transaction object based on determining that the current workflow stage has changed and storing, by the watchdog microservice, workflow tracking data corresponding to the transaction object and the changed current workflow stage.

The steps may further comprise determining, by the watchdog microservice, that the stored workflow tracking data corresponding to the transaction object indicates that the transaction object completed each stage of the workflow corresponding to the transaction type and, in response to determining that the stored workflow tracking data indicates that the transaction object completed each stage of the workflow corresponding to the transaction type, removing the transaction object from the streaming data platform and outputting the transaction object and an indication that the transaction object has completed the processing corresponding to the workflow. The current workflow stage of the transaction object may comprise a data structure indicating completion status of each respective step of a plurality of processing steps associated with the workflow. The steps may further comprise, in response to the determining that the current workflow stage of the transaction object has changed, determining, by the watchdog microservice, whether the current workflow stage of the transaction object is valid based on the workflow associated with the transaction type and, in response to determining that the current workflow stage of the transaction object is not valid, causing, by the watchdog microservice, the transaction object to be processed by one or more microservices associated with the workflow. The watchdog microservice may store workflow tracking data in an in-memory database. The workflow tracking data may comprise a timestamp and an indication of the change to the current workflow stage of the transaction object. The steps may further comprise determining, by the watchdog microservice and based on the workflow tracking data, at least one performance metric associated with the first microservice. The at least one performance metric may correspond to a single transaction object. The at least one performance metric may correspond to a group of transaction objects over a period of time. The steps may further comprise determining, by the watchdog microservice, that the at least one performance metric associated with the first microservice fails to satisfy at least one threshold performance value; and performing at least one action based on determining that the at least one performance metric fails to satisfy the at least one threshold performance value. The steps may further comprise determining, by the watchdog microservice and based on the workflow tracking data, at least one performance metric associated with the workflow.

The steps may further comprise determining, by the watchdog microservice, that the at least one performance metric associated with the workflow fails to satisfy at least one threshold performance value; and performing at least one action based on determining that the at least one performance metric fails to satisfy the at least one threshold performance value. The steps may further comprise determining, by the watchdog microservice and based on the workflow tracking data, at least one baseline metric associated with the first microservice. The baseline metric may correspond to processing performance by the first microservice on a set of transaction objects over a period of time. The steps may further comprise determining, by the watchdog microservice and based on the workflow tracking data, at least one performance metric associated with a first transaction object processed by the first microservice; determining that the at least one performance metric associated with the first transaction object fails to satisfy a threshold relationship to the at least one baseline metric; and generating a recommended action to be taken on the first transaction object. The recommended action may comprise causing the first transaction object to be re-processed by the first microservice. The recommended action may comprise re-routing the first transaction object to be processed by another microservice. The recommended action may comprise changing the transaction type of the first transaction object.

According to some aspects, a transaction exchange platform may comprise a streaming data platform, a plurality of microservices, at least one processor, and memory. Each microservice of the plurality of microservices may be configured to watch for transactions on the streaming data platform in a corresponding workflow stage based on a plurality of workflows corresponding to a plurality of transaction types. The memory may store instructions that, when executed by the at least one processor, cause the platform to perform steps including receiving a transaction object comprising transaction details and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform; and retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object; updating the current workflow stage of the transaction object to a second workflow stage based on completing processing, by the first microservice, of the transaction object; in response to determining, by a watchdog microservice and via the streaming data platform, that the current workflow stage of the transaction object has changed: retrieving, by the watchdog microservice and from the streaming data platform, the transaction object based on determining that the current workflow stage has changed; and storing, by the watchdog microservice, workflow tracking data corresponding to the transaction object and the changed current workflow stage; determining, by the watchdog microservice, that the stored workflow tracking data corresponding to the transaction object indicates that the transaction object completed each stage of the workflow corresponding to the transaction type; and in response to determining that the stored workflow tracking data indicates that the transaction object completed each stage of the workflow corresponding to the transaction type, removing the transaction object from the streaming data platform and output the transaction object and an indication that the transaction object has completed the processing corresponding to the workflow. The steps may further comprise determining, by the watchdog microservice and based on the workflow tracking data, at least one performance metric associated with the first microservice. The steps may further comprise determining, by the watchdog microservice, that the at least one performance metric associated with the first microservice fails to satisfy at least one threshold performance value; and generating a recommended action based on determining that the at least one performance metric fails to satisfy the at least one threshold performance value.

According to some aspects, one or more non-transitory computer readable media may comprise instructions that, when executed by at least one processor, cause a transaction exchange platform to perform steps. Those steps may comprise receiving a transaction object comprising transaction details and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform; and retrieving, by a first microservice and from the streaming data platform, the transaction object based on the current workflow stage matching a first workflow stage. The first workflow stage may be associated with the first microservice based on the workflow corresponding to the transaction type. The steps may further comprise processing, by the first microservice, the transaction object; updating the current workflow stage of the transaction object to a second workflow stage based on completing processing, by the first microservice, of the transaction object; in response to determining, by a watchdog microservice and via the streaming data platform, that the current workflow stage of the transaction object has changed: retrieving, by the watchdog microservice and from the streaming data platform, the transaction object based on determining that the current workflow stage has changed; and storing, by the watchdog microservice, workflow tracking data corresponding to the transaction object and the changed current workflow stage; determining, by the watchdog microservice and based on the workflow tracking data, at least one performance metric associated with the first microservice; and generating a graphic user interface display corresponding to the first microservice and comprising the at least one performance metric.

And according to some aspects, a computer-implemented method may comprise receiving a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The steps may further comprise adding the transaction object to a streaming data platform; and processing, by a first microservice, the transaction object on the streaming data platform based on the current workflow stage matching a first workflow stage. The first workflow stage may be associated with the first microservice based on the workflow corresponding to the transaction type. The steps may further comprise updating the current workflow stage of the transaction object to a second workflow stage based on completing processing, by the first microservice, of the transaction object; and in response to determining, by a watchdog microservice and via the streaming data platform, that the current workflow stage of the transaction object has changed, storing workflow tracking data corresponding to the transaction object and the changed current workflow stage; determining, by the watchdog microservice, that the processing, by the first microservice, of the transaction object did not complete successfully; and causing the first microservice to repeat processing of the transaction object based on snapshot data corresponding to the transaction object captured by a snapshot microservice.

The steps may further comprise polling, by the snapshot microservice, the streaming data platform to retrieve transactions matching an initialization stage. Transactions may be added to the streaming data platform in the initialization stage. The initialization stage may be associated with the snapshot microservice. The steps may further comprise retrieving, by the snapshot microservice and from the streaming data platform, the transaction object based on the current workflow stage matching the initialization stage; storing, by the snapshot microservice, snapshot data corresponding to the transaction object; determining, by the snapshot microservice and via the streaming data platform, that at least one value associated with addenda data of the transaction object has changed after the transaction object has left the initialization stage; and storing, by the snapshot microservice, snapshot data corresponding to the changed at least one value associated with the addenda data. The snapshot microservice may cause the first microservice to repeat processing of the transaction object based on the snapshot data corresponding to the transaction object from prior to the start of the processing by the first microservice. Causing the first microservice to repeat processing of the transaction object may comprise regenerating, by the snapshot microservice, the transaction object based on snapshot data corresponding to the transaction object from prior to the start of the processing by the first microservice; and returning the regenerated transaction object to the streaming data platform. The current workflow stage of the regenerated transaction object may be set to the first workflow stage. The steps may further comprise determining, by the watchdog microservice and based on the workflow tracking data, at least one performance metric associated with the first microservice. Determining that the processing, by the first microservice, of the transaction object did not complete successfully may be based on determining that the at least one performance metric associated with the first microservice fails to satisfy at least one performance threshold value. The at least one performance metric may correspond to a single transaction object. The at least one performance metric may correspond to a group of transaction objects over a period of time. The steps may further comprise determining, by the watchdog microservice and based on the workflow tracking data, at least one baseline metric associated with the first microservice. The baseline metric may correspond to processing performance by the first microservice on a set of transaction objects over a period of time. The steps may further comprise determining, by the watchdog microservice and based on the workflow tracking data, at least one performance metric associated with a first transaction object processed by the first microservice. Determining that the processing, by the first microservice, of the transaction object did not complete successfully may be based on determining that the at least one performance metric associated with the first transaction object fails to satisfy a threshold relationship to the at least one baseline metric. The steps may further comprise determining a number of times that the transaction object has undergone processing by the first microservice; in response to determining that the number of times that the transaction object has undergone processing by the first microservice exceeds a threshold value, rejecting the transaction object as having failed processing associated with the first microservice; and determining a corrective action for the transaction object based on rejecting the transaction object. The corrective action may comprise re-routing the first transaction object to be processed by another microservice. The corrective action may comprise changing the transaction type of the transaction object. The corrective action may comprise changing the indication of the workflow corresponding to the transaction type of the transaction object.

According to some aspects, a transaction exchange platform may comprise a streaming data platform, a plurality of microservices, at least one processor, and memory. Each microservice of the plurality of microservices may be configured to watch for transactions on the streaming data platform in a corresponding workflow stage based on a plurality of workflows corresponding to a plurality of transaction types. The memory may store instructions that, when executed by the at least one processor, cause the platform to perform steps including receiving a transaction object comprising transaction details, addenda data, and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The steps may further comprise adding the transaction object to a streaming data platform; and polling, by a snapshot microservice, the streaming data platform to retrieve transactions matching an initialization stage. Transactions may be added to the streaming data platform in an initialization stage. The initialization stage may be associated with the snapshot microservice. The steps may further comprise retrieving, by the snapshot microservice and from the streaming data platform, the transaction object based on the current workflow stage matching the initialization stage; storing, by the snapshot microservice, snapshot data corresponding to the transaction object; and processing, by a first microservice, the transaction object on the streaming data platform based on the current workflow stage matching a first workflow stage. The first workflow stage may be associated with the first microservice based on the workflow corresponding to the transaction type. The steps may further comprise determining, by the snapshot microservice and via the streaming data platform, that at least one value associated with the addenda data of the transaction object has changed after the transaction object has left the initialization stage; and storing, by the snapshot microservice, snapshot data corresponding to the changed at least one value associated with the addenda data; updating the current workflow stage of the transaction object to a second workflow stage based on completing processing, by the first microservice, of the transaction object; and, in response to determining, by a watchdog microservice and via the streaming data platform, that the current workflow stage of the transaction object has changed, storing workflow tracking data corresponding to the transaction object and the changed current workflow stage; determining, by the watchdog microservice, that the processing, by the first microservice, of the transaction object did not complete successfully; and causing the first microservice to repeat processing of the transaction object based on the snapshot data corresponding to the transaction object captured by a snapshot microservice.

According to some aspects, one or more non-transitory computer readable media may comprise instructions that, when executed by at least one processor, cause a transaction exchange platform to perform steps. Those steps may comprise receiving a transaction object comprising transaction details, addenda data, and transaction metadata. The transaction metadata may comprise an indication of a workflow corresponding to a transaction type of the transaction object, and a current workflow stage of the transaction object. The workflow corresponding to the transaction type may comprise a plurality of processing steps required to approve a given transaction of the transaction type. The steps may further comprise adding the transaction object to a streaming data platform. The transaction object may be added to the streaming data platform in an initialization stage. The steps may further comprise polling, by the snapshot microservice, the streaming data platform to retrieve transactions matching the initialization stage. The initialization stage may be associated with the snapshot microservice. The steps may further comprise retrieving, by the snapshot microservice and from the streaming data platform, the transaction object based on the current workflow stage matching the initialization stage; storing, by the snapshot microservice, snapshot data corresponding to the transaction object; and processing, by the first microservice, the transaction object on the streaming data platform based on the current workflow stage matching a first workflow stage. The first workflow stage may be associated with the first microservice based on the workflow corresponding to the transaction type. The steps may further comprise determining, by the snapshot microservice and via the streaming data platform, that at least one value associated with addenda data of the transaction object has changed after the transaction object has left the initialization stage; storing, by the snapshot microservice, snapshot data corresponding to the changed at least one value associated with the addenda data; updating the current workflow stage of the transaction object to a second workflow stage based on completing processing, by the first microservice, of the transaction object; and in response to determining, by a watchdog microservice and via the streaming data platform, that the current workflow stage of the transaction object has changed, storing workflow tracking data corresponding to the transaction object and the changed current workflow stage; determining, by the watchdog microservice, that the processing, by the first microservice, of the transaction object did not complete successfully; and causing the first microservice to repeat processing of the transaction object based on snapshot data corresponding to the transaction object captured by a snapshot microservice by: regenerating, by the snapshot microservice, the transaction object based on snapshot data corresponding to the transaction object from prior to the start of the processing by the first microservice; and returning the regenerated transaction object to the streaming data platform. The current workflow stage of the regenerated transaction object may be set to the first workflow stage. The steps may further comprise determining, by the watchdog microservice and based on the workflow tracking data, at least one baseline metric associated with the first microservice. The baseline metric may correspond to processing performance by the first microservice on a set of transaction objects over a period of time. The steps may further comprise determining, by the watchdog microservice and based on the workflow tracking data, at least one performance metric associated with the first transaction object processed by the first microservice. Determining that the processing, by the first microservice, of the transaction object did not complete successfully may be based on determining that the at least one performance metric associated with the single transaction object fails to satisfy a threshold relationship to the at least one baseline metric.

According to some aspects, a computer-implemented method may comprise steps comprising receiving a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The steps may further comprise adding the transaction object to a streaming data platform; and processing, by a first microservice, the transaction object on the streaming data platform based on the current workflow stage matching a first workflow stage. The first workflow stage may be associated with the first microservice based on the workflow corresponding to the transaction type. The steps may further comprise updating the current workflow stage of the transaction object to a second workflow stage based on completing processing, by the first microservice, of the transaction object; and, in response to determining, by a watchdog microservice and via the streaming data platform, that the current workflow stage of the transaction object has changed, storing workflow tracking data corresponding to the transaction object and the changed current workflow stage; determining, by the watchdog microservice, that the processing, by the first microservice, of the transaction object did not complete successfully; and reconfiguring the first microservice or a related second microservice based on determining that the processing, by the first microservice, of the transaction object did not complete successfully. The steps may further comprise causing the first microservice to repeat processing of the transaction object based on snapshot data corresponding to the transaction object captured by a snapshot microservice; and determining that the repeat processing of the transaction object also did not complete successfully. Reconfiguring the first microservice or the related second microservice may be based on determining that the repeat processing of the transaction object failed. Reconfiguring the first microservice or a related second microservice may comprise generating a configuration transaction object that may be configured to cause reconfiguration of the first workflow by causing reconfiguration of the first microservice. The configuration transaction object may comprise transaction metadata that indicates a configuration workflow and a current workflow stage of the configuration transaction object. The steps may further comprise adding the configuration transaction object to the streaming data platform; updating the current workflow stage of the configuration transaction object to the first workflow stage; retrieving, by the first microservice and from the streaming data platform, the configuration transaction object based on the current workflow stage matching the first workflow stage; and processing, by the first microservice, the configuration transaction object to reconfigure the first microservice. Reconfiguring the first microservice or the related second microservice may cause transaction objects associated with the workflow to be dynamically re-routed. Reconfiguring the first microservice or the related second microservice may comprise reconfiguring the first microservice to modify at least one operation that the first microservice performs on transaction objects associated with the workflow. Reconfiguring the first microservice or the related second microservice may comprise reconfiguring the related second microservice to cause removal of the first microservice from the workflow. The second related microservice may be a predecessor microservice that proceeds the first microservice in the workflow. The steps may further comprise determining, by the watchdog microservice, at least one performance metric associated with the first micro service. Determining that the processing, by the first microservice, of the transaction object did not complete successfully may be based on determining that the at least one performance metric associated with the first microservice fails to satisfy at least one threshold performance value. The steps may further comprise determining, by the watchdog microservice and based on the workflow tracking data, at least one performance metric associated with the workflow. Determining that the processing, by the first microservice, of the transaction object did not complete successfully may be based on determining that the at least one performance metric associated with the workflow fails to satisfy at least one threshold performance value.

According to some aspects, a transaction exchange platform may comprise a streaming data platform, a plurality of microservices, at least one processor, and memory. Each microservice of the plurality of microservices may be configured to watch for transactions on the streaming data platform in a corresponding workflow stage based on a plurality of workflows corresponding to a plurality of transaction types. The memory may store instructions that, when executed by the at least one processor, cause the platform to perform steps including receiving a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The steps may further comprise adding the transaction object to a streaming data platform; and processing, by the first microservice, the transaction object on the streaming data platform based on the current workflow stage matching a first workflow stage. The first workflow stage may be associated with the first microservice based on the workflow corresponding to the transaction type. The steps may further comprise updating the current workflow stage of the transaction object to a second workflow stage based on completing processing, by the first microservice, of the transaction object; and in response to determining, by a watchdog microservice and via the streaming data platform, that the current workflow stage of the transaction object has changed, storing workflow tracking data corresponding to the transaction object and the changed current workflow stage; determining, by the watchdog microservice, that the processing, by the first microservice, of the transaction object did not complete successfully; and reconfigure the first microservice based on determining that the processing, by the first microservice, of the transaction object did not complete successfully by generating a configuration transaction object that may be configured to cause reconfiguration of the first microservice and add the configuration transaction object to the streaming data platform. The steps may further comprise causing the first microservice to repeat processing of the transaction object based on snapshot data corresponding to the transaction object captured by a snapshot microservice; and determining that the repeat processing of the transaction object also did not complete successfully. Reconfiguring the first microservice may be based on determining that the repeat processing of the transaction object failed. Reconfiguring the first microservice may cause transaction objects associated with the workflow to be dynamically re-routed. Reconfiguring the first microservice may comprise reconfiguring the first microservice to modify at least one operation that the first microservice performs on transaction objects associated with the workflow. Reconfiguring the first microservice may comprise reconfiguring a related second microservice to cause the removal of the first microservice from the workflow. The second related microservice may be a predecessor microservice that proceeds the first microservice in the workflow. The steps may further comprise determining, by the watchdog microservice, at least one performance metric associated with the first micro service. Determining that the processing, by the first microservice, of the transaction object did not complete successfully may be based on determining that the at least one performance metric associated with the first microservice fails to satisfy at least one threshold performance value. The steps may further comprise determining, by the watchdog microservice and based on the workflow tracking data, at least one performance metric associated with the workflow. Determining that the processing, by the first microservice, of the transaction object did not complete successfully may be based on determining that the at least one performance metric associated with the workflow fails to satisfy at least one threshold performance value.

According to some aspects, one or more non-transitory computer readable media may comprise instructions that, when executed by at least one processor, cause a transaction exchange platform to perform steps. Those steps may comprise receiving a transaction object comprising transaction details and transaction metadata. The transaction metadata may comprise an indication of a workflow corresponding to a transaction type of the transaction object and a current workflow stage of the transaction object. The workflow corresponding to the transaction type may comprise a plurality of processing steps required to approve a given transaction of the transaction type. The steps may further comprise adding the transaction object to a streaming data platform; and processing, by a first microservice, the transaction object on the streaming data platform based on the current workflow stage matching a first workflow stage. The first workflow stage may be associated with the first microservice based on the workflow corresponding to the transaction type. The steps may further comprise updating the current workflow stage of the transaction object to a second workflow stage based on completing processing, by the first microservice, of the transaction object; and, in response to determining, by a watchdog microservice and via the streaming data platform, that the current workflow stage of the transaction object has changed, storing workflow tracking data corresponding to the transaction object and the changed current workflow stage; determining, by the watchdog microservice, that the processing, by the first microservice, of the transaction object did not complete successfully; causing the first microservice to repeat processing of the transaction object based on snapshot data corresponding to the transaction object captured by a snapshot microservice; and determining that the repeat processing of the transaction object also did not complete successfully; and reconfiguring the first microservice or a related second microservice, based on determining that the repeat processing of the transaction object also did not complete successfully. Reconfiguring the first microservice may comprise generating a configuration transaction object that may be configured to cause reconfiguration of the first workflow by causing reconfiguration of the first microservice. The configuration transaction object may comprise transaction metadata that indicates a configuration workflow, and a current workflow stage of the configuration transaction object. Reconfiguring the first microservice may further comprise adding the configuration transaction object to the streaming data platform; updating the current workflow stage of the configuration transaction object to the first workflow stage; retrieving, by the first microservice and from the streaming data platform, the configuration transaction object based on the current workflow stage matching the first workflow stage; and processing, by the first microservice, the configuration transaction object to reconfigure the first microservice. Reconfiguring the first microservice or the related second microservice may cause transaction objects associated with the workflow to be dynamically re-routed.

Monitoring for Duplicate and Problematic Transaction Objects

As noted above, financial institutions are facing an industry-wide challenge in detecting and/or remediating duplicate transactions during transaction processing. These duplicate transactions may be caused by errors in the processing of the transactions and the transaction files (e.g., NACHA file) in which they are contained. In an attempt to alleviate these issues, financial institutions have attempted to detect duplicate transactions using spreadsheet row checking and/or database integrity checking. However, spreadsheet row checking, which requires a user to manually correct identified errors, is time-intensive and prone to user-errors. Similarly, database integrity checking is unreliable in catching duplicate transactions, resulting in a transaction being processed twice. These types of error result in corrective actions that result in additional processing overhead and increased costs.

To overcome the problems with spreadsheet row checking and database integrity checking, the present disclosure describes different techniques for detecting and/or preventing duplicate transactions in transaction files. Additionally, the present disclosure describes techniques for detecting errors with transactions. Moreover, the present disclosure discusses remedial measures when errors or duplicate transactions are detected. By detecting errors and duplicate transactions and taking remedial measures to cure any detected defects, the present disclosure ensures that transactions are processed in a timely manner by downstream processors, such as the FedACH system.

The transaction exchange platform, described herein, may receive a plurality of transaction objects, with each of the plurality of transaction objects being associated with a transaction. As the transaction objects are received, the streaming data platform may determine whether each of the plurality of transaction objects are associated with a prior transaction object. As will be described in greater detail below, the streaming data platform may perform a field-by-field check by comparing the fields of a received transaction object with data stored in a database. If a predetermined number of fields match an entry in the database, the received transaction object may be identified as a duplicate. When the received transaction object is not a duplicate and when the format of the received transaction object is verified, the streaming data platform may analyze the received transaction object for any potential errors that may cause processing of the received transaction object to stall and/or fail. If any potential errors are identified, the streaming data platform may take remedial measures to cure the identified defect. In some instances, the streaming data platform may generate an alert (e.g., a notification) that allows to one or more parties to take action to cure the identified defect.

Once any defects with the received transaction object are cured, or if no defects are detected, the streaming data platform may generate a unique identifier for the received transaction object. After being assigned a unique identifier, the received transaction object may be processed by one or more microservices in accordance with a workflow associated with the received transaction object. As part of the processing, a microservice may validate the received transaction object by accessing a registry to determine whether the transaction associated with the received transaction object is permitted. If the transaction is not permitted, the received transaction object may be removed from the streaming data platform or other remedial actions may be taken. When the transaction is permitted, a client identifier may be attached to the unique identifier. The combination of the client identifier and the unique identifier may create a 1:1 link with the 15-digit tracking identifier used in the transaction file that is routed to the downstream processor. Any subsequent attempts to inject the same transaction, or a duplicate of the transaction, may spawn one or more errors.

After the transaction is validated, one or more microservices may process the received transaction object in accordance with a workflow (e.g., a saga) associated with the transaction type. As noted above, the microservices may process the received transaction object asynchronously. Once the workflow has completed processing of the received transaction object, the received transaction object may be removed from the transaction exchange platform and passed to a sub-layer, referred to an intermediary integrator. The sub-layer may perform another validation check on the received transaction object to ensure that the format of the received transaction object complies with the format of the downstream processor. After passing the validation check, the sub-layer may assign a batch identifier to the received transaction object. As discussed above, the batch identifier may perform like a bucket at both the ACH transaction and NACHA file level. At the ACH transaction level, the batch identifier may be a backstop to the initial field-by-field validation performed when the transaction object is received. At the NACHA file level, the FedACH system may perform its own transaction and file-level duplication checking. Because of this, every transaction and file must be unique, and the 2-layer approach described herein ensures that each transaction and file is uniquely identified.

Despite the precautions described above, transactions may be rejected by the downstream processor. To address transactions that are rejected by downstream processors, the present disclosure describes automatically remediating rejected transactions, for example, based on a return code provided by the downstream processor. In this regard, an adjudicator microservice may cure, remediate, and/or rectify rejected transactions, for example, using a codex and/or based on the return code. By automating the remediation of rejected transactions, the present disclosure is able to re-process rejected transactions more quickly and efficiently than previous techniques, while using fewer resources to do so.

One or more aspects described herein may provide for detecting duplicate transactions, as well as other flaws or errors associated with transactions. The techniques described herein may provide one or more techniques for remediating duplicate transactions, or other errors, that may cause processing of the transactions to fail. Additionally, the techniques described herein provide for the generation of a unique transaction identifier. The unique transaction identifier may be generated by concatenating a version number and an identification token associated with the transaction identifier. The unique transaction identifier may be used by both the transaction exchange platform and downstream processors, such as clearinghouses (e.g., ACH clearinghouses), to ensure that the transaction is not rejected for being a duplicate of another transaction. Finally, the present disclosure provides for an adjudication microservice, which may be used to remediate transactions that were rejected and/or returned by downstream processors.

Figure 16A:
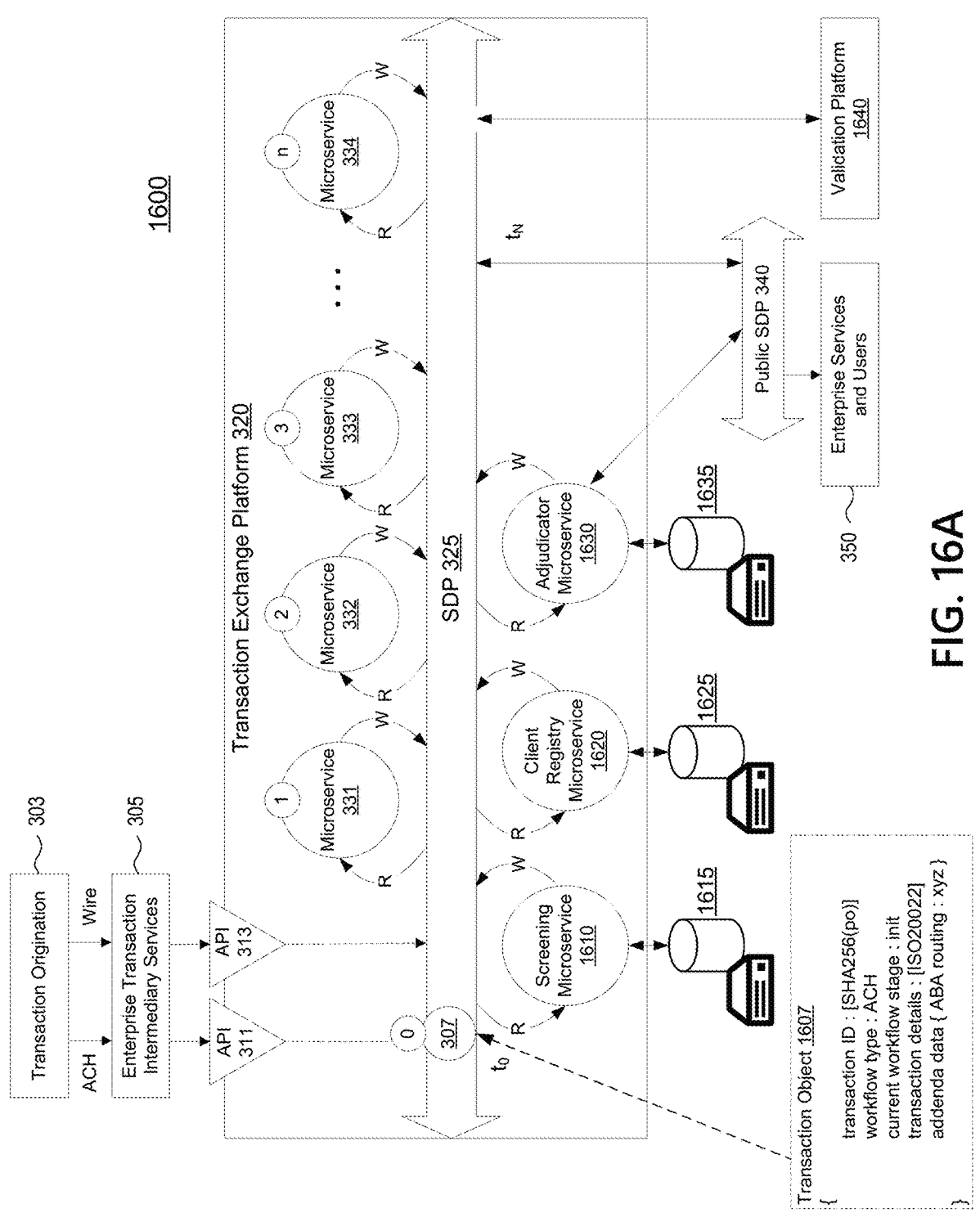
FIGS. 16A and 16B depict examples of a transaction exchange platform according to one or more aspects of the disclosure.
Figure 16B:
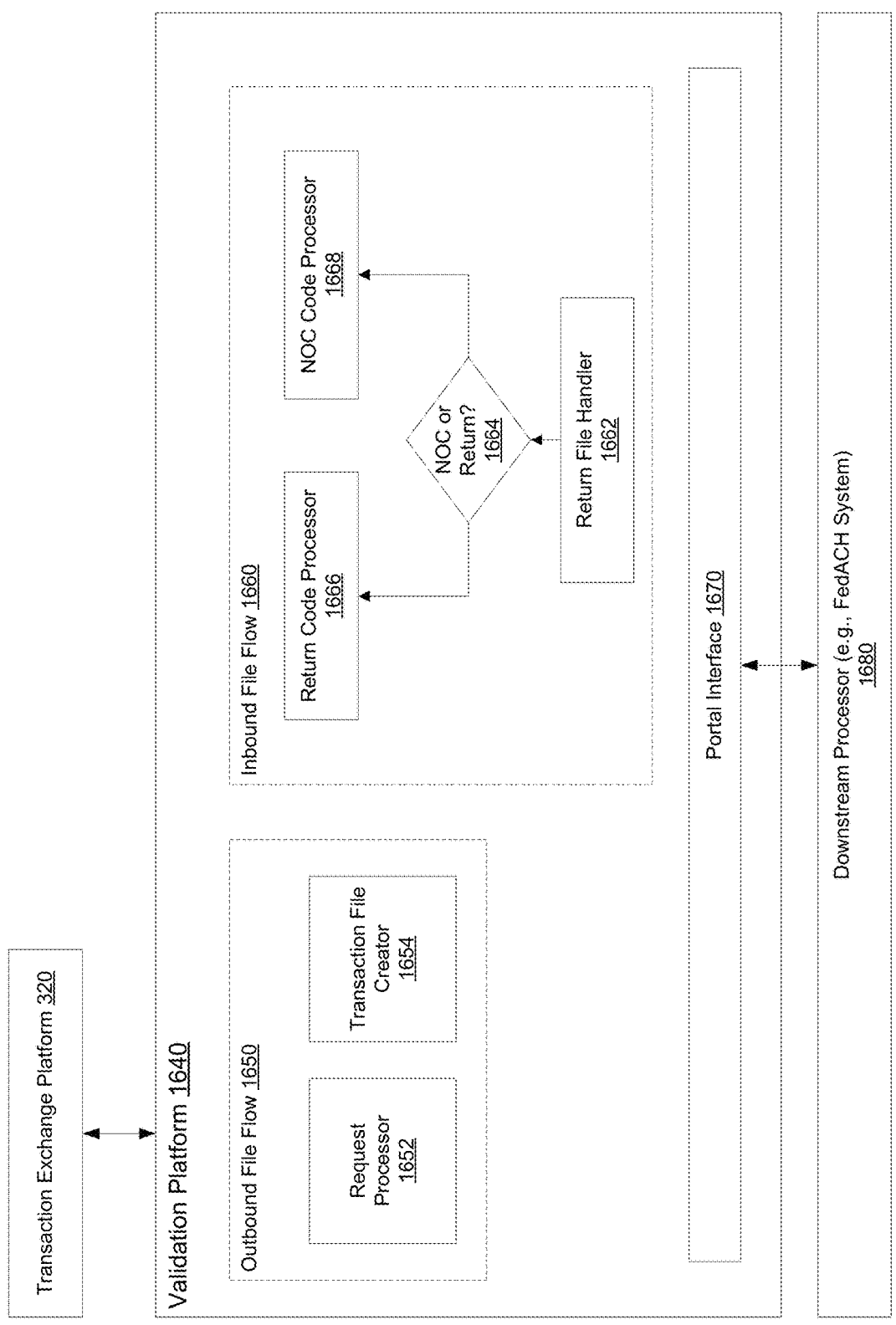

FIGS. 16A and 16B illustrate a transaction processing system 1600 that may be similar to transaction processing systems 300, 600, and/or 900 of FIGS. 3A, 6, and 9, respectively. Relative to systems 300, 600, and/or 900, transaction processing system 1600 may add screening microservice 1610, client registry microservice 1620, and/or adjudicator microservice 1630. FIGS. 16A and 16B may also add a validation platform 1640, which may validate transactions and/or generate transaction files that are sent to downstream processors (e.g., an ACH clearinghouse).

Screening microservice 1610 may operate on transaction exchange platform 320 to detect duplicate transactions. Additionally or alternatively, screening microservice 1610 may operate on transaction exchange platform 320 to determine a likelihood of success for a transaction. That is, the screen microservice 1610 may review a transaction to determine whether the transaction comprises one or more errors that would cause processing of the transaction to fail. Screening microservice 1610 may comprise database 1615, which may comprise on-disk storage capable of effectively storing large volumes of data. The large volumes of data stored in database 1615 may comprise a predetermined number of recently received transactions. In some embodiments, database 1615 may comprise a hash table associated with the predetermined number of recently received transactions. That is, database 1615 may hash one or more fields of a transaction as the transactions are received and store the hash values in a hash table of database 1615.

To determine whether a transaction is a duplicate transaction, screening microservice 1610 may review transactions as the transactions are received by transaction exchange platform 320. For example, transaction exchange platform 320 may receive transaction object 1607 corresponding to a payment transaction. Transaction object 1607 may comprise a plurality of details associated with the payment transaction, such as identification of an account holder, identification of a payor, identification of a payee, payor account information, payee account information, a payment amount, a payment date, etc. Upon receiving transaction object 1607, screening microservice 1610 may determine whether the payment transaction is a duplicate of a previously received transaction. For example, screening microservice 1601 may determine whether the payment transaction is a duplicate of a previously received transaction by comparing the transaction details to transaction details associated with previously received transactions that have been stored in memory, such as database 1615. In some instances, screening microservice 1610 may determine whether a first quantity (e.g., number) of transaction details match (e.g., overlap with) the transaction details of a transaction stored in memory (e.g., database 1615). If the first quantity is greater than or equal to a threshold amount, screening microservice 1615 may determine that the transaction is a duplicate of an earlier transaction. If the first quantity is below the threshold amount, screening microservice 1615 may determine that the transaction is not a duplicate.

In another example, screening microservice 1610 may determine whether the payment transaction is a duplicate of a previously received transaction by hashing one or more transaction details of the transaction object. The hash of the one or more transaction details may be compared to hash values stored in the hash table. If the hash matches hash values in the hash table, screening microservice 1610 may determine that transaction object 1607 is a duplicate of a previously received transaction. If the hash does not match, screening microservice 1610 may determine that transaction object 1607 is not a duplicate of another transaction.

In yet another example, screening microservice 1610 may determine whether the payment transaction is a duplicate of a previously received transaction using one or more machine learning models. In this regard, the one or more machine learning models may be trained to identify duplicate transactions. The one or more machine learning models may comprise a neural network, such as a convolutional neural network (CNN), a recurrent neural network, a recursive neural network, a long short-term memory (LSTM), a gated recurrent unit (GRU), an unsupervised pre-trained network, a space invariant artificial neural network, a generative adversarial network (GAN), or a consistent adversarial network (CAN), such as a cyclic generative adversarial network (C-GAN), a deep convolutional GAN (DC-GAN), GAN interpolation (GAN-INT), GAN-CLS, a cyclic-CAN (e.g., C-CAN), or any equivalent thereof. Additionally or alternatively, the one or more machine learning models may comprise one or more decision trees. The one or more machine learning models may be trained using supervised learning, unsupervised learning, back propagation, transfer learning, stochastic gradient descent, learning rate decay, dropout, max pooling, batch normalization, long short-term memory, skip-gram, or any equivalent deep learning technique. Once the one or more machine learning models are trained, the one or more machine learning models may be exported and/or deployed in screening microservice 1610, which may use the one or more machine learning models to identify duplicate transactions.

Transaction objects associated with duplicate transactions may be removed from transaction exchange platform 320, while transaction objects associated with non-duplicate transactions may be processed according to an associated workflow. In some instances, screening microservice 1610 may communicate with one or more users to confirm whether transaction object 1607 is a duplicate, for example, prior to removing transaction object 1607 from transaction exchange platform 320.

To determine a likelihood of success for a transaction object, screening microservice 1610 may analyze (e.g., review) one or more transaction details to determine whether transaction object 1607 comprises any errors that would cause processing of transaction object 1607 to fail. In this regard, screening microservice 1610 may use one or more predictive models to identify payment transactions that have a likelihood of failing due to one or more errors. The one or more predictive models may be one or more of the machine learning models identified above. Additionally or alternatively, the one or more predictive models may comprise at least one of: k-means algorithm, affinity propagation algorithm, mean-shift algorithm, spectral clustering algorithm, Ward hierarchical clustering algorithm, agglomerative clustering algorithm, density-based spatial clustering of applications with noise (DBSCAN) algorithm, Gaussian mixtures algorithm, Birch algorithm, or shared nearest neighbor algorithm. Additionally, the one or more predictive models may be trained using any of the techniques described above. The training data for the one or more predictive models may comprise transaction details associated with a plurality of payment transactions that were not processed by transaction exchange platform 320 because the plurality of payment transaction objects and/or the transaction details contained one or more errors. The transaction details associated with a plurality of payment transactions that failed may comprise one or more of an identification of a payor, an identification of a payee, a dollar amount of a transaction, a time of the transaction, an identification of a type of platform on which the transaction occurs, a type of product transaction code, or core attributes of the transaction. Additionally, the training data may comprise a reason why each of the plurality of transactions failed. The reason may be indicated by a return code. The one or more predictive models, once trained, may be deployed in screening microservice 1610 to review transaction objects (e.g., transaction object 1607) as the transaction objects are received by transaction exchange platform 320. Screening microservice 1610 may then use the one or more predictive models to determine whether the transaction details associated with transaction object 1607 comprise one or more indications that processing of transaction object 1607 is likely to fail. In some instances, the determination of whether the transaction details indicate that processing of transaction object 1607 is likely to fail comprises determining that a likelihood of failure is higher than a threshold. If transaction object 1607 does not contain any errors, screening microservice 1610 may update the workflow status of transaction object 1607 and allow transaction object 1607 to be processed according to a workflow. However, if transaction object 1607 contains errors, screening microservice 1610 may determine one or more remedial actions to cure the errors. In some instances, screening microservice 1610 may send a request to correct the deficiencies (e.g., errors, flaws), and, in response to receiving approval, perform the remedial action. The remediated transaction object may then be processed according to a workflow of the transaction object.

After screening microservice 1610 has determined that transaction object 1607 is not a duplicate and processing is likely to succeed, the transaction object's workflow status may be updated and set to a pre-initialization stage. Transaction object 1607, with the updated workflow status may be placed back on SDP 325. Client registry microservice 1620 may retrieve a plurality of transaction objects from SDP 325 and determine whether any of the transaction objects have a workflow status set to the pre-initialization stage. Client registry microservice 1620 may comprise database 1625, which may comprise on-disk storage capable of effectively storing large volumes of data. Upon determining that one or more transaction objects have a workflow status set to the pre-initialization stage, client registry microservice 1620 may determine the payment transactions associated with the one or more transaction objects are permitted, for example, based on one or more rules, such as state or federal regulatory rules. If the one or more transaction objects are not permitted, client registry microservice 1620 may generate an alert to notify at least one of an administrator, a payor, and/or a payee. The alert may allow remedial action to be taken.

Additionally or alternatively, client registry microservice 1620 may drop transaction objects that are not permitted due to one or more rules (e.g., state or federal regulatory rules). If the transaction is authorized, client registry microservice 1620 may generate a transaction identifier by prepending a client identifier and/or a version number to an identification token associated with the transaction. The version number may indicate the number of times that the transaction object has been processed. The version number may start at zero (0) and be incremented, for example, each time a transaction object has been rejected by the validation platform 1640 and/or downstream processors 1680. After generating the transaction identifier, client registry microservice 1620 may update the workflow stage of transaction object 1607 to an initialization state and add transaction object 1607 to SDP 325. The transaction object (e.g., transaction object 1607) may then be processed according to a workflow.

After transaction objects have finished processing, transaction exchange platform 320 may send (e.g., transmit) the completed transaction objects to validation platform 1640. In this regard, the watchdog microservice (described above, but not shown in FIG. 16A) may determine that the workflow status of transaction object 1607 indicates that processing of transaction object 1607 has completed processing. The watchdog microservice may output transaction object 1607 from transaction exchange platform 320 to validation platform 1640. In some instances, validation platform 1640 may monitor SDP 325 for transactions and remove transaction objects (e.g., transaction object 1607) with a workflow status that indicates that the transaction object (e.g., transaction 1607) has completed processing. Validation platform 1640 may then analyze transaction object 1607 to determine whether a format of the payment transaction is valid. If validation platform 1640 determines that the format is invalid, transaction object 1607 may be returned to transaction exchange platform 320. A microservice, such as adjudicator microservice 1630 having database 1635, may remediate (e.g., correct) the formatting issues with transaction object 1607. However, if validation platform 1640 determines that the format of the payment transaction is valid, validation platform 1640 may append a batch identifier to the transaction identifier and add the payment transaction to a transaction file (e.g., NACHA file). Validation platform 1640 may upload the transaction file to a portal associated with a clearinghouse. By uploading the file to the portal, validation platform 1640 may initiate the clearing of the plurality of transactions contained in the transaction file. If a transaction or the transaction file is returned by downstream processor 1680, validation platform 1640 may generate a new batch identifier and append the new batch identifier to the transaction identifier. The transaction may be added to a new transaction file, which would be uploaded to downstream processor 1680 for clearinghouse purposes.

FIG. 16B shows an example of validation platform 1640 and its interactions with downstream processor 1680. Validation platform 1640 may be an electronic data exchange (EDE) system that interfaces with the downstream processor (s) 1680 (e.g., FedACH system). Validation platform 1640 may comprise an outbound file flow 1650, an inbound file flow, and/or a portal interface 1670, which interfaces with the downstream processor 1680. As discussed above, downstream processor 1680 may comprise a clearinghouse, such as a FedACH system.

Outbound file flow 1650 may comprise request processor 1652 and/or transaction file creator 1654. Request processor 1652 may process and/or insert a batch header and an entry record. Transaction file creator 1654 may generate the transaction file uploaded to the downstream processor 1680. As noted above, the transaction file may be a National Automated Clearing House Association (NACHA) file; accordingly, the transaction file may comprise a plurality of ACH transactions. Alternatively, the transaction file may be an equivalent of a NACHA file and the plurality of transactions contained within the file may all be of the same type. To create these files, transaction file creator 1654 may verify that each transaction contained in the transaction file has a unique identifier associated therewith.

Inbound file flow 1660 may comprise return file handler 1662. Return file handler 1662 may determine whether the returned transaction comprises a return or a notification of change (NOC) in block 1664. If the transaction is being returned for remediation, the transaction may be sent (e.g., transmitted, passed) to return code processor 1666. Return code processor 1666 may review (e.g., analyze) the return code and route the transaction to the appropriate processor and/or microservice so that the transaction may be corrected based on the return code (i.e., the reason the transaction was returned to the payment processor). If the transaction is returned due to a notification of change, the transaction may be passed to NOC code processor 1668. NOC code processor 1668 may update information associated with the transaction. For example, NOC code processor 1668 may determine that transaction details associated with the transaction have changed. NOC code processor 1668 may notify an administrator, a payor, and/or a payee. Additionally or alternatively, NOC code processor 1668 may update the transaction detail based on the change information.

As noted above, the processing of transactions may be rejected by a downstream processor (e.g., clearinghouse). The rejected transactions, and the transaction objects associated therewith, may be returned to transaction exchange platform 320. Transaction exchange platform 320 (e.g., adjudicator microservice 1630) may remediate, or otherwise cure, the defects with the returned transactions and/or transaction objects. Adjudicator microservice 1630 may receive an indication that processing of the payment transaction failed. The indication may comprise the transaction identifier and/or a code identifying a reason that processing of the transaction object failed. The code may comprise an indication that the first account is closed, an indication that the first account is unable to be located or does not exist, an indication that the first account has an invalid account number, or any other suitable ACH return code. Adjudicator microservice 1630 may retrieve customer information, for example, based on a client identifier associated with the transaction identifier. The customer information may comprise one or more of a customer name, an account number associated with a checking account, a routing number associated with the checking account, a balance of the checking account, an account number associated with a savings account, a routing number associated with the savings account, or a balance of the savings account. Based on the return code and/or the customer information, adjudicator microservice 1630 may determine a solution for reprocessing the transaction. The determination for the solution may be made using one or more machine learning models trained to resolve issues with failed transactions. The one or more machine learning models may be the same as the machine learning models and/or predictive models discussed above.

In one example, adjudicator microservice 1630 may determine that the code indicates that the transaction failed due to insufficient funds in the payor's account. Accordingly, adjudicator microservice 1630 may transfer funds from one account to another account before resubmitting the transaction for processing by the automated clearinghouse. Alternatively, adjudicator microservice 1630 may update the transaction details associated with the transaction to indicate payment from a different account that contains sufficient funds to cover processing of the transaction. In yet another example, adjudicator microservice 1630 may credit a user's account with sufficient funds to cover processing of the transaction.

In another example, adjudicator microservice 1630 may determine that the code indicates an issue with an account associated with the payment transaction. The issue may indicate an incorrect account number, an incorrect routing number, etc. Adjudicator microservice 1630 may update the transaction details associated with the payment transaction. Updating the transaction details may comprise correcting the account number or the routing number. Additionally or alternatively, adjudicator microservice 1630 may update the transaction details to a new, different account number.

In some instances, adjudicator microservice 1630 may obtain approval before remediating (e.g., correcting) the transaction. Adjudicator microservice 1630 may send a request to remediate the issues to a user device. The request may indicate the corrective action, such as processing the payment using a different account. Adjudicator microservice 1630 may receive, from the user device, a response indicating approval to process the first payment transaction using the corrective action. Once the corrective action is taken, adjudicator microservice 1630 may pass the corrected transaction to validation platform 1640 to process the corrected transaction according to the techniques described above.

Figure 17A:
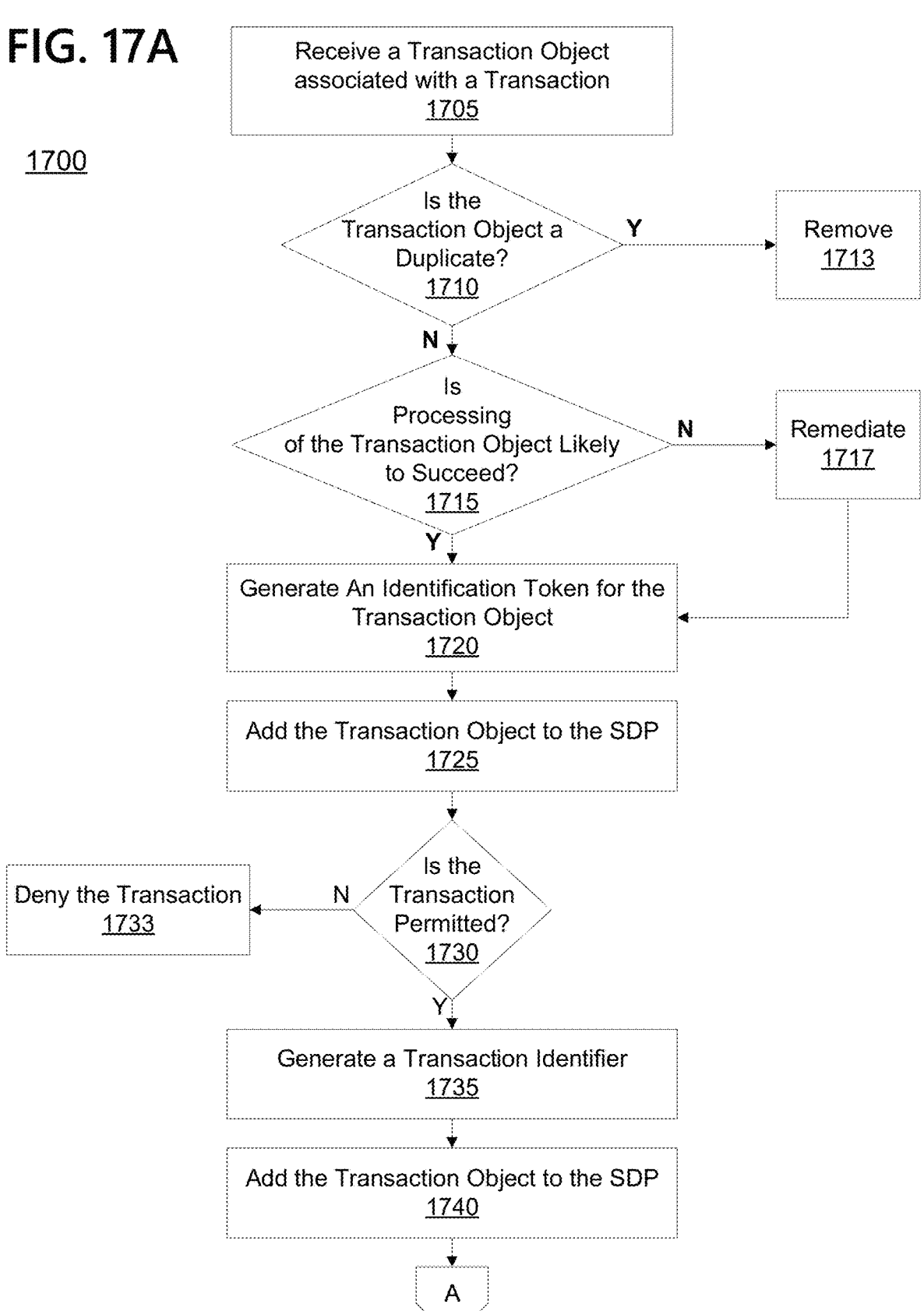
FIGS. 17A and 17B depict an illustrative method for generating a unique identifier for a payment transaction according to one or more aspects of the disclosure.
Figure 17B:
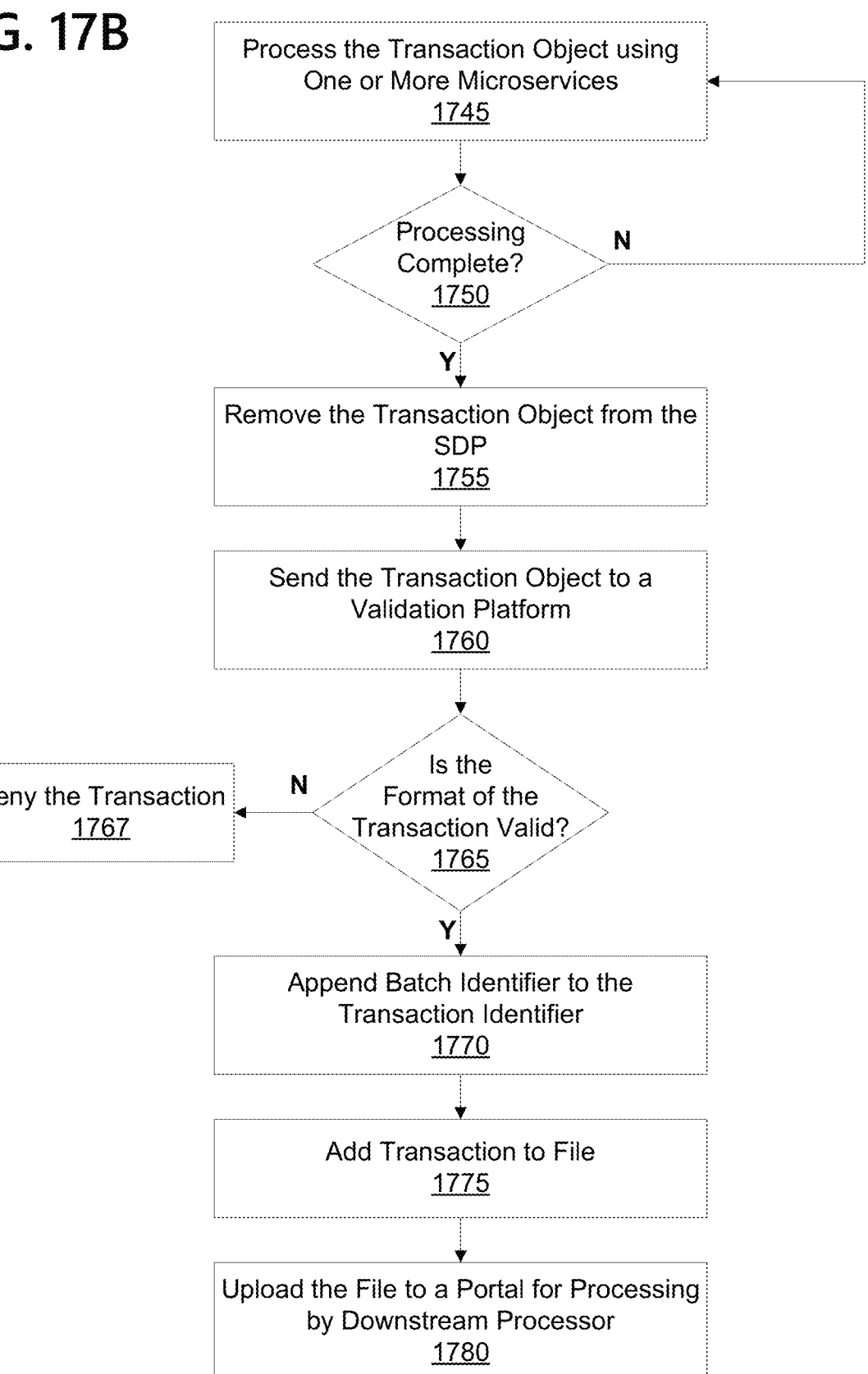

FIGS. 17A and 17B depict an illustrative method for generating a unique identifier for a payment transaction according to one or more aspects of the disclosure. Method 1700 may be performed by any suitable computing device and/or combination of computing devices, referred to as the system implementing method 1700.

In step 1705, a transaction exchange platform may receive a first transaction object corresponding to a first payment transaction. The first transaction object may comprise first transaction details. In some examples, the first payment transaction is an Automated Clearing House (ACH) transaction. The first transaction object may comprise one or more transaction details, including, for example, identification of an account holder, identification of a payor, identification of a payee, a payment amount, a payment date, etc.

In step 1710, the transaction exchange platform (e.g., a screening microservice executing on the transaction exchange platform) may determine whether the first transaction object is a duplicate of a prior payment transaction. As noted above, the determination of whether the first transaction object is a duplicate may be performed by comparing the transaction details to a data structure comprising transaction details of a plurality of payment transactions. Additionally or alternatively, the determination of whether the first transaction object is a duplicate may include hashing one or more transaction details and comparing the resultant hash values to hash values stored in a hash table. The determination of whether the first transaction object is a duplicate of another transaction will be discussed in greater detail below with respect to FIG. 19. If the first transaction object is a duplicate, the screening microservice may remove the first transaction object from the transaction exchange platform, in step 1713. Removing the first transaction object from the transaction platform may comprise updating the workflow stage of the first transaction object to indicate that processing of the first transaction object should be terminated (e.g., cancelled). In some examples, the screening microservice may update the workflow stage of the first transaction object by appending a suffix (e.g., ".SNAG") to the first transaction object. Transaction exchange platform 320 may monitor for transaction objects with the cancelled workflow status and remove those transaction objects from the platform.

If the screening microservice determines that the first transaction object is not a duplicate, processing of the first transaction object may proceed to step 1715, where the screening microservice may determine whether the first transaction details indicate a likelihood that processing of the first transaction object is going to occur without any errors. As noted above, the determination may be made using one or more predictive models. Additional details about how the screening microservice determines whether processing of the first transaction is likely to occur without errors or failure are discussed in greater detail below with respect to FIG. 20. If the screening microservice determines that processing of the first transaction object is going to generate one or more errors, the one or more errors may be remediated, for example, in step 1717. After the one or more errors have been remediated, processing of the first transaction object may continue.

When the screening microservice determines that processing of the first transaction object is likely to succeed without any errors or after the errors have been remediated, the transaction exchange platform may generate an identification token for the first transaction object. Generating the identification token may comprise applying a hash function (e.g., SHA256) to the first transaction object. In some examples, the hash function may be applied to one or more transaction details of the first transaction object. In further examples, the identification token may be based on a predetermined number of bits of a result of the hash function. The predetermined number of bits may be the most significant bits of the result. Alternatively, the least significant bits of the result may be used for the identification token.

In step 1725, the screening microservice may add the first transaction object to a streaming data platform of the transaction exchange platform. In this regard, the screening microservice may set a workflow stage of the first transaction object to a pre-initialization stage. Based on the pre-initialization workflow stage, a client registry microservice may retrieve a plurality of microservices from the streaming data platform. The client registry microservice may analyze the plurality of transaction objects to determine those transaction objects with the workflow stage set to the pre-initialization stage. The client registry microservice may review the transaction objects with the workflow stage set to the pre-initialization stage to determine whether each of the plurality of transaction objects is permitted. In step 1730, a determination of whether each of the plurality of transaction objects is permitted may be made based on one or more rules, such as regulatory-based rules. If the transaction object is not permitted, the transaction object may be denied in step 1733. Denial of the transaction object may comprise removing the transaction object from the transaction exchange platform, for example, using the techniques described above.

When the transaction is permitted, the client registry microservice may generate a transaction identifier for the first transaction object, in step 1735. The transaction identifier may be generated by prepending a client identifier and/or a version number to the identification token. After generating the transaction identifier, the client registry microservice may add the first transaction object to the streaming data platform, in step 1740.

In step 1745, the transaction exchange platform may process the transaction object using one or more microservices. According to an example embodiment, a microservice, of a plurality of microservices executing on the transaction exchange platform, may retrieve a plurality of transaction objects, including the transaction object added to the SDP in step 1740. The microservice may then determine whether the current workflow stage of the transaction object matches a workflow stage associated with the microservice. Based on a determination that the current workflow stage matches the workflow stage associated with the microservice, the microservice may process the transaction object. When processing of the transaction object is complete, the microservice may update the current workflow stage of the transaction object and place the transaction object, with the updated workflow stage, on the SDP for processing of the transaction object according to the workflow. In step 1750, the transaction exchange platform (e.g., a watchdog microservice) may determine whether processing of the transaction object is completed. If the transaction exchange platform determines that processing of the transaction object is not yet completed, the process 1700 may return to step 1745, where another microservice may retrieve the transaction object with the updated workflow stage and process the transaction object. This process may be repeated until the final microservice of a workflow updates the current workflow stage to indicate that processing of the transaction object is complete.

Once processing is complete, the transaction object may be removed from the transaction exchange platform in step 1755. That is, the first transaction object may be removed from the streaming data platform, for example, by the watchdog microservice described above. The determination to remove the transaction object from the transaction exchange platform may be based on the workflow stage of the transaction object indicating that the transaction object has completed processing. In step 1760, the transaction exchange platform may send the transaction object to a validation platform, such as validation platform 1640. As shown in FIG. 16B, the validation platform (e.g., validation platform 1640) may be the final stage of transaction processing before transactions are sent to a clearinghouse. The validation platform may analyze the transaction to determine whether the transaction complies with the requirements set forth by the clearinghouse. Part of this analysis may include the validation platform determining whether the format of the transaction is valid, in step 1765. If the format of the transaction is invalid, the validation platform may deny the transaction in step 1767. As part of the denial, the validation platform may send the transaction to the transaction exchange platform to remediate the issues (e.g., problems) identified by the validation platform. Additionally or alternatively, the validation platform may generate an alert. In this regard, the validation platform may send the alert to an administrator and/or a party to the transaction (e.g., payor, payee, financial institution of the payor, financial institution of the payee, etc.). The alert may identify the issue (e.g., problem) and/or one or more actions for remediating the issue. In some instances, the transaction exchange platform and/or the validation platform may receive a response. The response may include approval to remediate the identified issue. Additionally or alternatively, the response may indicate that the transaction should be cancelled.

When the validation platform determines that the format of the payment transaction is valid, the validation platform may append a batch identifier to the transaction identifier in step 1770. In some instances, the transaction identifier may be prepended to the transaction identifier. The batch identifier is an important duplication prevention method that functions like a bucket at both the ACH Transaction and NACHA file level. At the ACH transaction level, the batch identifier may act as a second backstop to the initial field-level uniqueness validation done by the transaction exchange platform. The batch identifier may indicate that the transaction is unique and is allowed in this file (e.g., batch). Additionally, the assignment of the batch identifier may allow the transaction to be included in a file (e.g., NACHA file) scheduled for the next time window with the correlated batch identifier. In this way, the batch identifier creates a 1:1 relationship with the NACHA batch identifier. When ACH goes real-time, the batch identifier may be used as a Fed RealTime ACH pre-staging function, where quasi-real-time ACH transactions will be screened for regulatory compliance. At the NACHA file level, the FedACH system may perform its own transaction and file level duplication checking. Accordingly, the batch identifier and transaction identifier provide a two-layer approach that ensures every transaction and file is unique. Additionally, the batch identifier may be used when ACH transactions need to be rerun. For example, if the NACHA file failed, and all the transactions contained therein need to be rerun, the transaction will be added to a new NACHA file. Accordingly, the transaction may be assigned a new, different batch identifier. In order to do this, the batch identifier correlation has to be broken and a new NACHA batch identifier may be assigned to the transaction. This maintains the integrity and uniqueness of the transactions in each file.

After the batch identifier is appended to the transaction identifier, the validation platform may add the transaction to a file (e.g., NACHA file), in step 1775. As noted above, the file may be a National Automated Clearing House Association (NACHA) file, or an equivalent thereof. In some embodiments, the validation platform may perform a duplication check. The duplication check may verify that none of the transaction identifiers included in the file are duplicated. After the transactions and format of the file are verified, the validation platform may upload the file to a portal associated with a clearinghouse, in step 1780. By uploading the file to the portal, the validation platform may initiate the clearing of the plurality of transactions contained in the file.

Figure 18:
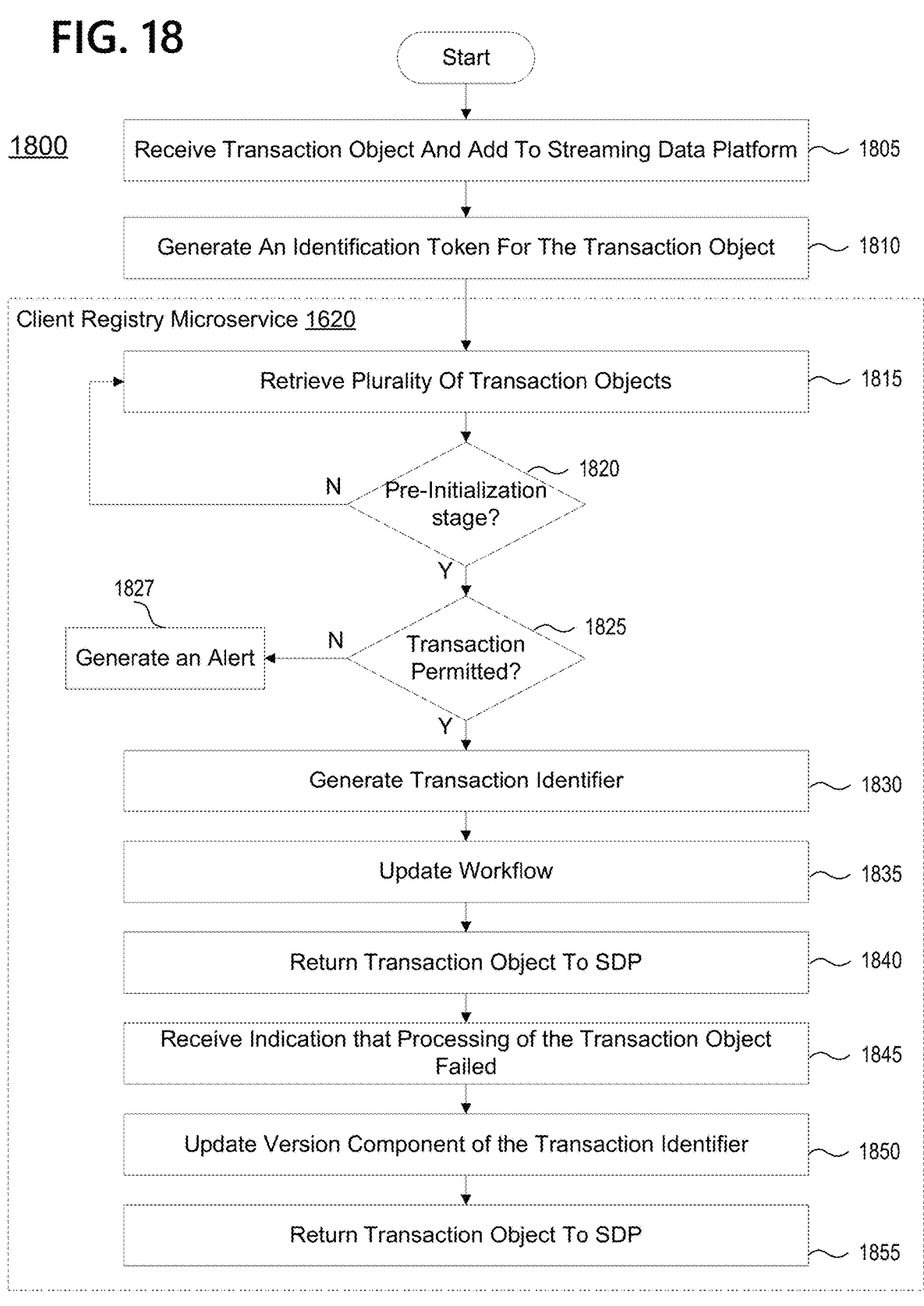
FIG. 18 depicts an illustrative method for processing a payment transaction according to one or more aspects of the disclosure.

As noted above, transactions may be rejected by a clearinghouse. FIG. 18 depicts an illustrative method for processing a transaction after its been rejected in accordance with one or more aspects of the disclosure. Method 1800 may be performed by any suitable computing device and/or combination of computing devices, referred to as the system implementing method 1800.

In step 1805, a transaction exchange platform may receive a first transaction object corresponding to a first payment transaction. As noted above, the first transaction object may comprise first transaction details. Additionally, the first payment transaction may be an Automated Clearing House (ACH) transaction, a SWIFT transaction, a wire transfer, a check, an electronic transfer, cashier checks, real-time payments (RTP), credit cards, and/or many other types of payment transactions. In step 1810, the transaction exchange platform may generate an identification token for the first transaction object. The generation of the identification token may be based on a determination that the first transaction object is not a duplicate of an earlier transaction. Additionally or alternatively, the generation of the identification token may be based on a determination that the first transaction details indicate that processing of the first transaction object is likely to succeed. The identification token may be generated using a hash function (e.g., SHA256). In some instances, the identification token may comprise a predetermined number of most (or least) significant bits of a result of the hash function.

In step 1815, the transaction exchange platform (e.g., client registry microservice 1620) may retrieve a plurality of transaction objects from a streaming data platform. The client registry microservice 1620 may determine whether the transaction objects' current workflow stage is set to the pre-initialization stage in step 1820. Additionally or alternatively, client registry microservice 1620 may monitor the streaming data platform for transaction objects that have a workflow stage set to the pre-initialization stage. If none of the retrieved transaction objects are set to the pre-initialization stage, client registry microservice 1620 may retrieve more transaction objects or, alternatively, continue to monitor the streaming data platform for transaction objects set to the pre-initialization stage.

When the transaction object is set to the pre-initialization stage, client registry microservice 1620 may determine whether the transaction associated with the transaction object is permitted, in step 1825. The determination of whether the transaction associated with the transaction object is permitted may be based on one or more rules, such as state or federal laws and/or regulatory rules. If the transaction is not permitted, client registry microservice 1620 may generate an alert in step 1827. The alert may comprise an electronic communication, such as a text message, a push notification, a notification in one or more applications, an e-mail, or any equivalent thereof. The alert may notify an administrator and/or a regulator that the transaction is not permitted. Additionally or alternatively, the alert may notify the parties to the transaction and/or the financial institution that the transaction is not permitted.

When client registry microservice 1620 determines that the first payment transaction is permitted, client registry microservice 1620 may generate a first transaction identifier, in step 1830. As noted above, the first transaction identifier may be generated by prepending a client identifier and/or a version number to the identification token. In step 1835, client registry microservice 1620 may update the workflow stage of the first transaction object to an initialization state (e.g., INIT, described above). Client registry microservice 1620 may then add the first transaction object to the streaming data platform, in step 1840. The first transaction object may then be processed by one or more microservices associated with a workflow.

In step 1845, client registry microservice 1620 may receive an indication that processing of the first transaction object failed. The indication may be received from a clearinghouse, for example, in response to uploading the file to the clearinghouse via the validation platform's portal. Additionally or alternatively, the indication may be received from another microservice, such as the watchdog microservice. Based on the indication that processing of the first transaction object has failed, client registry microservice 1620 may update the version number of the transaction identifier, in step 1850. As noted above, this may involve incrementing the version field of an existing transaction identifier. Once the transaction identifier has been updated, in step 1855, client registry microservice 1620 may return the first transaction object to the SDP for further processing, in accordance with the techniques discussed herein.

Thus, according to some embodiments, a computer-implemented method may receive, by a transaction exchange platform, a first transaction object corresponding to a first payment transaction. As noted above, the first transaction object may comprise first transaction details. The computer-implemented method may employ a screening microservice to determine whether the first transaction object is a duplicate payment transaction by comparing the first transaction details to a data structure comprising transaction details of a plurality of payment transactions. A determination that the first transaction object is not a duplicate of the plurality of payment transactions may be based on a number of the first transaction details not matching a number of transaction details associated with any of the plurality of payment transactions. Additionally, the screening microservice may determine, using a predictive model, whether the first transaction details indicate a likelihood that processing of the first transaction object is going to occur without any errors. The determination that the first transaction details indicate a likelihood that processing of the first transaction object is going to occur without any errors may be performed using one or more machine learning models. Based on a determination that the first transaction object is not a duplicate of the plurality of payment transactions and based on a determination that the first transaction details indicate a likelihood that processing of the first transaction object is going to succeed, the computer-implemented method may generate an identification token for the first transaction object and add the first transaction object to a streaming data platform. The identification token may be generated using a hash function. Additionally or alternatively, the identification token may comprise a predetermined number of most significant bits of a resultant of the hash function. Adding the first transaction object to the streaming data platform may comprise setting a workflow stage of the first transaction object to a pre-initialization stage. The computer-implemented method may retrieve, by a client registry microservice of a plurality of microservices and based on the workflow stage of the first transaction object being set to the pre-initialization stage, a plurality of transaction objects. The plurality of transaction objects may comprise the first transaction object. The computer-implemented method may determine, by the client registry microservice, whether the first payment transaction is permitted based on one or more rules. Based on a determination that the first payment transaction is permitted, the computer-implemented method may prepend a client identifier to the identification token to generate a first transaction identifier and update the workflow stage of the first transaction object to an initialization state. The computer-implemented method may then add the first transaction object to the streaming data platform. Based on a determination that the workflow stage of the first transaction object indicates that the transaction object has completed processing, the computer-implemented method may remove the first transaction object from the streaming data platform and output the first transaction object to a validation platform. The computer-implemented method may use the validation platform to determine whether a format of the first payment transaction is valid. Based on determination that the format of the first payment transaction is valid, the computer-implemented method may append a batch identifier to the first transaction identifier and add the first transaction to a file, and upload the file to a portal to initiate the first payment transaction and a plurality of transactions contained in the file. In some instances, the payment transaction is an Automated Clearing House (ACH) transaction and the file is a National Automated Clearing House Association (NACHA) file.

The computer-implemented method may receive an indication that processing of the file has failed. Based on the indication that processing of the file has failed, the computer-implemented method may generate a second batch identifier that is different from the batch identifier described above. The computer-implemented method may append the second batch identifier to the first transaction identifier and add the first payment transaction to a second file, which may be uploaded to the portal to re-initiate the first payment transaction.

According to some aspects, a transaction exchange platform may comprise a streaming data platform, a plurality of microservices, at least one processor, and memory. The plurality of microservices may comprise at least a first microservice, a screening microservice, a client registry microservice, and/or a validation platform. The memory may store instructions that, when executed by the at least one processor, cause the transaction exchange platform to receive a first transaction object corresponding to a first payment transaction. The first payment transaction may be an Automated Clearing House (ACH) transaction. The memory may store instructions that, when executed by the at least one processor, cause the transaction exchange platform to determine whether the first transaction object is a duplicate payment transaction by comparing the first transaction details to a data structure comprising transaction details of a plurality of payment transactions. A determination that the first transaction object is not a duplicate of the plurality of payment transactions may be based on a number of the first transaction details not matching a number of transaction details associated with any of the plurality of payment transactions. Additionally, the screening microservice may determine, using a predictive model, whether the first transaction details indicate a likelihood that processing of the first transaction object is going to occur without any errors. The determination that the first transaction details indicate a likelihood that processing of the first transaction object is going to occur without any errors may be performed using one or more machine learning models. Based on a determination that the first transaction object is not a duplicate of the plurality of payment transactions and based on a determination that the first transaction details indicate a likelihood that processing of the first transaction object is going to succeed, the memory may store instructions that, when executed by the at least one processor, cause the transaction exchange platform to generate an identification token for the first transaction object and add the first transaction object to a streaming data platform. The identification token may be generated using a hash function. Additionally or alternatively, the identification token may comprise a predetermined number of most significant bits of a resultant of the hash function. Adding the first transaction object to the streaming data platform may comprise setting a workflow stage of the first transaction object to a pre-initialization stage. The memory may store instructions that, when executed by the at least one processor, cause the transaction exchange platform to retrieve, by a client registry microservice of a plurality of microservices and based on the workflow stage of the first transaction object being set to the pre-initialization stage, a plurality of transaction objects. The plurality of transaction objects may comprise the first transaction object. The memory may store instructions that, when executed by the at least one processor, cause the transaction exchange platform to determine, by the client registry microservice, whether the first payment transaction is permitted based on one or more rules. Based on a determination that the first payment transaction is permitted, the memory may store instructions that, when executed by the at least one processor, cause the transaction exchange platform to prepend a client identifier to the identification token to generate a first transaction identifier and update the workflow stage of the first transaction object to an initialization state. The memory may store instructions that, when executed by the at least one processor, cause the transaction exchange platform to add the first transaction object to the streaming data platform. Based on a determination that the workflow stage of the first transaction object indicates that the transaction object has completed processing, the memory may store instructions that, when executed by the at least one processor, cause the transaction exchange platform to remove the first transaction object from the streaming data platform and output the first transaction object to a validation platform. The memory may store instructions that, when executed by the at least one processor, cause the transaction exchange platform to use the validation platform to determine whether a format of the first payment transaction is valid. Based on determination that the format of the first payment transaction is valid, the memory may store instructions that, when executed by the at least one processor, cause the transaction exchange platform to append a batch identifier to the first transaction identifier and add the first transaction to a file, and upload the file to a portal to initiate the first payment transaction and a plurality of transactions contained in the file. In some instances, the file may be a National Automated Clearing House Association (NACHA) file.

The memory may store instructions that, when executed by the at least one processor, cause the transaction exchange platform to receive an indication that processing of the file has failed. Based on the indication that processing of the file has failed, the memory may store instructions that, when executed by the at least one processor, cause the transaction exchange platform to generate a second batch identifier that is different from the batch identifier described above. The memory may store instructions that, when executed by the at least one processor, cause the transaction exchange platform to append the second batch identifier to the first transaction identifier and add the first payment transaction to a second file, which may be uploaded to the portal to re-initiate the first payment transaction.

According to some aspects, one or more non-transitory computer readable media may comprise instructions that, when executed by at least one processor, cause a transaction exchange platform to perform steps. Those steps may comprise receiving a first transaction object corresponding to a first payment transaction, wherein the first transaction object comprises first transaction details; determining, by a screening microservice, whether the first transaction object is a duplicate payment transaction by comparing the first transaction details to a data structure comprising transaction details of a plurality of payment transactions; determining, by a screening microservice and using a predictive model, whether the first transaction details indicate a likelihood that processing of the first transaction object is going to occur without any errors; generating an identification token for the first transaction object based on a determination that the first transaction object is not a duplicate of the plurality of payment transactions and based on a determination that the first transaction details indicate a likelihood that processing of the first transaction object is going to succeed; adding the first transaction object to a streaming data platform, wherein adding the first transaction object to the streaming data platform comprises setting a workflow stage of the first transaction object to a pre-initialization stage; retrieving, by a client registry microservice of a plurality of microservices and based on the workflow stage of the first transaction object being set to the pre-initialization stage, a plurality of transaction objects, wherein the plurality of transaction objects comprises the first transaction object; determining, by the client registry microservice, whether the first payment transaction is permitted based on one or more rules; prepending, by the client registry microservice and based on a determination that the first payment transaction is permitted, a client identifier to the identification token to generate a first transaction identifier; updating, by the client registry microservice, the workflow stage of the first transaction object to an initialization state; adding, by the client registry microservice, the first transaction object to the streaming data platform; removing the first transaction object from the streaming data platform and outputting the first transaction object to a validation platform based on a determination that the workflow stage of the first transaction object indicates that the transaction object has completed processing; determining, by the validation platform, whether a format of the first payment transaction is valid; appending a batch identifier to the first transaction identifier and add the first payment transaction to a file based on determination that the format of the first payment transaction is valid; and uploading the file to a portal to initiate the first payment transaction and a plurality of transactions contained in the file.

Figure 19:
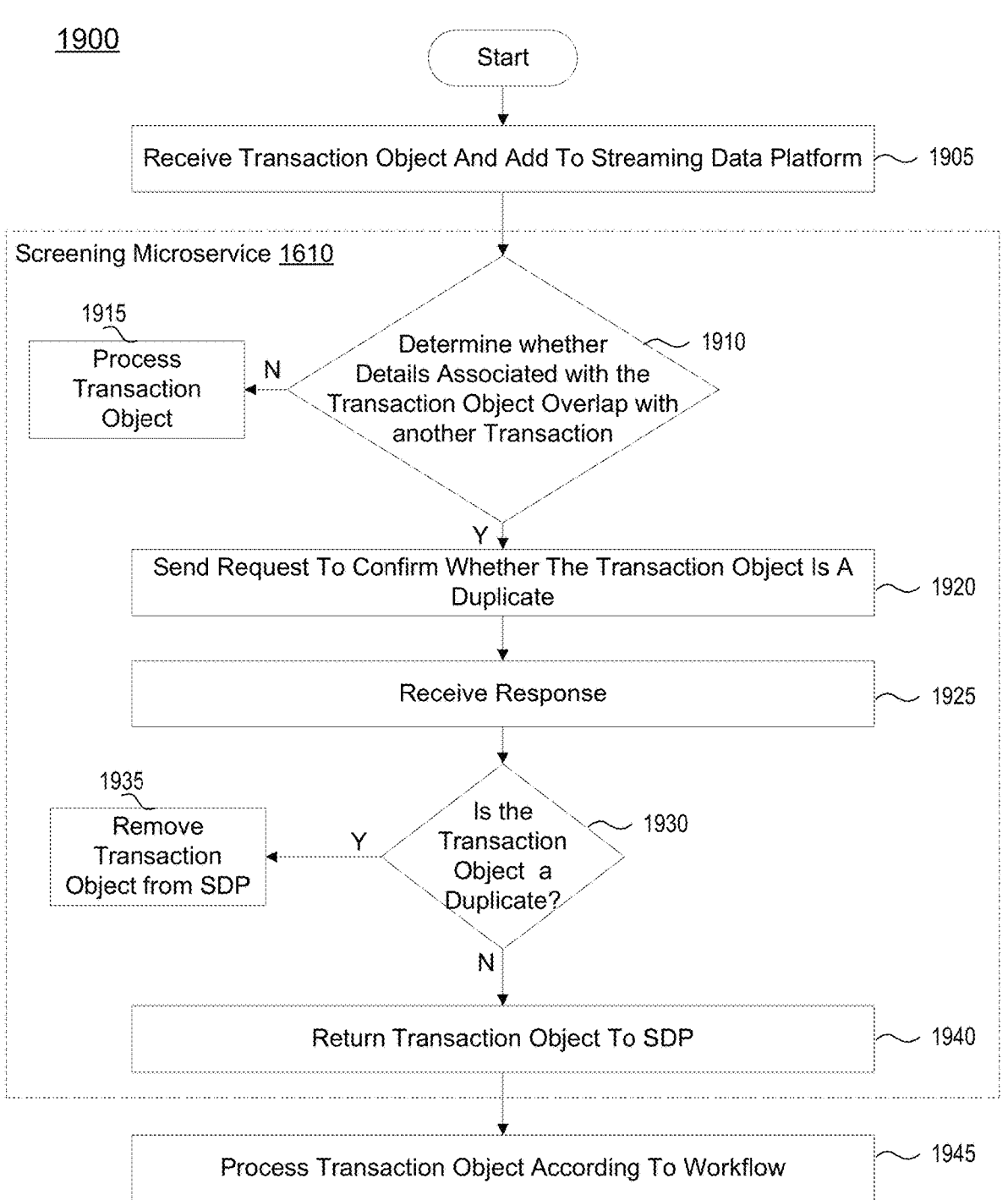
FIG. 19 depicts an illustrative method for determining whether a payment transaction is a duplicate of a prior transaction according to one or more aspects of the disclosure.

As noted above, the transaction exchange platform may analyze transactions when the transactions are received to determine whether the transactions are duplicates of previously received transactions. FIG. 19 depicts an illustrative method 1900 for determining whether a payment transaction is a duplicate of a prior transaction according to one or more aspects of the disclosure. Method 1900 may be performed by any suitable computing device and/or combination of computing devices, referred to as the system implementing method 1900.

In step 1905, a transaction exchange platform may receive a first transaction object corresponding to a first transaction. The first transaction object may comprise first transaction details, including at least one of identification of an account holder, identification of a payor, identification of a payee, a payment amount, a payment date, etc. In step 1910, the transaction exchange platform (e.g., screening microservice 1610 executing on transaction exchange platform) may determine whether the first transaction object is a duplicate transaction.

As noted above, the determination of whether a first transaction object is a duplicate of another transaction may be done by performing a field-by-field check. That is, screening microservice 1610 may compare the fields of a received transaction object with data stored in a database. If a predetermined number of fields match an entry in the database or if all the fields match an entry, the received transaction object may be rejected (e.g., failed) as being a duplicate of another transaction object. Additionally or alternatively, the determination of whether a first transaction object is a duplicate of another transaction may be determined by comparing the first transaction details to a data structure comprising transaction details of a plurality of payment transactions. For example, screening microservice 1610 may query the data structure to determine the transaction details of the plurality of payment transactions. The query may be submitted via an application programming interface (API). Additionally or alternatively, screening microservice 1610 may use one or more machine learning models to determine whether the first transaction object is a duplicate of another transaction. The determination may be based on the first transaction details overlapping with second transaction details. In some instances, a predetermined number (e.g., threshold) of the first transaction details may match a predetermined number of the second transaction details. This process may be repeated for each new, incoming transaction object received by the transaction exchange platform. If the first transaction object is not a duplicate, then the first transaction object may be processed according to the workflow, in step 1915.

When the first transaction details overlap with second transaction details, screening microservice 1610 may send a request to a first user device, in step 1920. The request may inquire whether the first transaction is a duplicate of the second transaction. That is, a user may be asked to confirm (or deny) whether the first transaction is a duplicate of a second transaction. In step 1925, screening microservice 1610 may receive a response from the first user device. In step 1930, screening microservice may determine whether the response indicates that the first transaction object is a duplicate of an earlier (second) transaction. If the first transaction is a duplicate of an earlier transaction, the first transaction object may be removed from the SDP in step 1935. However, if the first transaction object is not a duplicate of an earlier transaction, screening microservice 1610 may return the first transaction object to the SDP, in step 1940. When returning the first transaction object to the SDP, screening microservice 1610 may generate an identification token for the first transaction object and then add the first transaction object to the SDP. As noted above, screening microservice 1610 may set a current workflow stage of the first transaction object to a pre-initialization stage when adding the first transaction object to the SDP. This would allow the client registry microservice to retrieve the first transaction object and process the first transaction object in accordance with the techniques described herein. After clearing the client registry microservice, the current workflow status of the first transaction object may be set to an initialization stage and added to the SDP. In step 1945, the first transaction object may be processed according to a workflow and the techniques described herein.

In some instances, the transaction exchange platform and/or screening microservice 1610 may generate one or more rules to automate payment for a transaction. In this regard, the transaction exchange platform and/or screening microservice 1610 may identify one or more transactions that are frequently flagged as being duplicates. To address this issue, the transaction exchange platform and/or screening microservice 1610 may generate one or more rules to automate payment. Automating payment may require a user's approval. Accordingly, the transaction exchange platform and/or screening microservice 1610 may send a request to a user device to generate an automatic payment for a transaction. If the user denies the request, the transaction exchange platform and/or screening microservice 1610 would not create a rule. However, if the user approves the request, the transaction exchange platform and/or screening microservice 1610 may receive an indication of the approval and generate one or more rules for automating the payment transaction.

Thus, according to some embodiments, a computer-implemented method may receive, by a transaction exchange platform, a first transaction object corresponding to a first payment transaction. The first transaction object comprises first transaction details, such as identification of an account holder, identification of a payor, identification of a payee, a payment amount, a payment date, etc. The computer-implemented method may determine, by a screening microservice, whether the first transaction object is a duplicate payment transaction by comparing the first transaction details to a data structure comprising transaction details of a plurality of payment transactions. The computer-implemented method may query, by the screening microservice and via an application programming interface, a data structure to determine the transaction details of the plurality of payment transactions. Additionally or alternatively, a determination as to whether the first transaction object is a duplicate payment transaction may use one or more machine learning models. In some instances, the determination that the first transaction details overlap with the second transaction details may include determining that a number of the first transaction details match a number of the second transaction details, wherein the number is greater than or equal to a threshold amount.

Based on a determination that the first transaction details overlap with second transaction details of a second payment transaction, the computer-implemented method may send, by the screening microservice to a first user device, a request inquiring whether the first payment transaction is a duplicate of the second payment transaction. The computer-implemented method may receive, by the screening microservice from the first user device, a response indicating that the first payment transaction is not a duplicate of the second payment transaction. In response to receiving the response, the computer-implemented method may generate an identification token for the first transaction object, and add the first transaction object to a streaming data platform. Adding the first transaction object to the streaming data platform may comprise setting a current workflow stage of the first transaction object to a pre-initialization stage. The computer-implemented method may retrieve, by a client registry microservice and based on a current workflow stage indicating the pre-initialization stage, a plurality of transaction objects that include the first transaction object. The computer-implemented method may prepend, by the client registry microservice and based on a determination that the first payment transaction is permitted, a client identifier to the identification token to generate a first transaction identifier. The computer-implemented method may update, by the client registry microservice, the current workflow stage of the first transaction object to an initialization state, and add the updated first transaction object to the streaming data platform. Based on a determination that the current workflow stage of the updated first transaction object indicates that the updated first transaction object has completed processing, the computer-implemented method may remove the updated first transaction object from the streaming data platform and output the updated first transaction object to a validation platform. The computer-implemented method may determine, by the validation platform, whether a format of the first transaction is valid. Based on determination that the format of the first transaction is valid, the computer-implemented method may append a batch identifier to the first transaction identifier and add the first transaction to a file and upload the file to a portal to initiate the first transaction and a plurality of transactions contained in the file.

The computer-implemented method may receive a third transaction object, corresponding to a third payment transaction, that comprises third transaction details. The computer-implemented method may determine, by the screening microservice, whether the third transaction object is a duplicate payment transaction by comparing the third transaction details to the data structure. Based on a determination that the third transaction details overlap with fourth transaction details of a fourth payment transaction, the computer-implemented method may send a request inquiring whether the third payment transaction is a duplicate of the fourth payment transaction. The computer-implemented method may receive, by the screening microservice from the first user device, a response indicating that the third payment transaction is a duplicate of the fourth payment transaction. In response to receiving the response, the computer-implemented method may delete the third transaction object. In some instances, the computer-implemented method may generate one or more rules to automate payment for the third payment transaction, for example, based on a determination that the third payment transaction is frequently duplicated.

The computer-implemented method may receive a third transaction object, corresponding to a third payment transaction, that includes third transaction details. The computer-implemented method may determine, by the screening microservice, whether the third transaction object is a duplicate payment transaction by comparing the third transaction details to the data structure. Based on a determination that the third transaction details do not overlap with the transaction details of the plurality of payment transactions, the computer-implemented method may add the third transaction object to the streaming data platform. In some instances, the computer-implemented method may determine, by the client registry microservice and prior to prepending the client identifier to the identification token, whether the first payment transaction is permitted based on one or more rules, such as regulatory-based rules.

According to some aspects, a transaction exchange platform may comprise a streaming data platform, a plurality of microservices, at least one processor, and memory. The plurality of microservices may comprise at least a first microservice, a screening microservice, and/or a client registry microservice. The memory may store instructions that, when executed by the at least one processor, cause the transaction exchange platform to receive, by a transaction exchange platform, a first transaction object corresponding to a first payment transaction. The first transaction object comprises first transaction details, such as identification of an account holder, identification of a payor, identification of a payee, a payment amount, a payment date, etc. The memory may store instructions that, when executed by the at least one processor, cause the transaction exchange platform to determine, by a screening microservice, whether the first transaction object is a duplicate payment transaction by comparing the first transaction details to a data structure comprising transaction details of a plurality of payment transactions. The memory may store instructions that, when executed by the at least one processor, cause the transaction exchange platform to query, by the screening microservice and via an application programming interface, a data structure to determine the transaction details of the plurality of payment transactions. Additionally or alternatively, a determination as to whether the first transaction object is a duplicate payment transaction may use one or more machine learning models. In some instances, the determination that the first transaction details overlap with the second transaction details may include determining that a number of the first transaction details match a number of the second transaction details, wherein the number is greater than or equal to a threshold amount.

Based on a determination that the first transaction details overlap with second transaction details of a second payment transaction, the memory may store instructions that, when executed by the at least one processor, cause the transaction exchange platform to send, by the screening microservice to a first user device, a request inquiring whether the first payment transaction is a duplicate of the second payment transaction. The memory may store instructions that, when executed by the at least one processor, cause the transaction exchange platform to receive, by the screening microservice from the first user device, a response indicating that the first payment transaction is not a duplicate of the second payment transaction. In response to receiving the response, the memory may store instructions that, when executed by the at least one processor, cause the transaction exchange platform to generate an identification token for the first transaction object, and add the first transaction object to a streaming data platform. Adding the first transaction object to the streaming data platform may comprise setting a current workflow stage of the first transaction object to a pre-initialization stage. The memory may store instructions that, when executed by the at least one processor, cause the transaction exchange platform to retrieve, by a client registry microservice and based on a current workflow stage indicating the pre-initialization stage, a plurality of transaction objects that include the first transaction object. The memory may store instructions that, when executed by the at least one processor, cause the transaction exchange platform to prepend, by the client registry microservice and based on a determination that the first payment transaction is permitted, a client identifier to the identification token to generate a first transaction identifier. The memory may store instructions that, when executed by the at least one processor, cause the transaction exchange platform to update, by the client registry microservice, the current workflow stage of the first transaction object to an initialization state, and add the updated first transaction object to the streaming data platform. Based on a determination that the current workflow stage of the updated first transaction object indicates that the updated first transaction object has completed processing, the memory may store instructions that, when executed by the at least one processor, cause the transaction exchange platform to remove the updated first transaction object from the streaming data platform and output the updated first transaction object to a validation platform. The memory may store instructions that, when executed by the at least one processor, cause the transaction exchange platform to determine, by the validation platform, whether a format of the first transaction is valid. Based on determination that the format of the first transaction is valid, the memory may store instructions that, when executed by the at least one processor, cause the transaction exchange platform to append a batch identifier to the first transaction identifier and add the first transaction to a file and upload the file to a portal to initiate the first transaction and a plurality of transactions contained in the file.

The memory may store instructions that, when executed by the at least one processor, cause the transaction exchange platform to receive a third transaction object, corresponding to a third payment transaction, that comprises third transaction details. The memory may store instructions that, when executed by the at least one processor, cause the transaction exchange platform to determine, by the screening microservice, whether the third transaction object is a duplicate payment transaction by comparing the third transaction details to the data structure. Based on a determination that the third transaction details overlap with fourth transaction details of a fourth payment transaction, the memory may store instructions that, when executed by the at least one processor, cause the transaction exchange platform to send a request inquiring whether the third payment transaction is a duplicate of the fourth payment transaction. The memory may store instructions that, when executed by the at least one processor, cause the transaction exchange platform to receive, by the screening microservice from the first user device, a response indicating that the third payment transaction is a duplicate of the fourth payment transaction. In response to receiving the response, memory may store instructions that, when executed by the at least one processor, cause the transaction exchange platform to delete the third transaction object. In some instances, the memory may store instructions that, when executed by the at least one processor, cause the transaction exchange platform to generate one or more rules to automate payment for the third payment transaction, for example, based on a determination that the third payment transaction is frequently duplicated.

The memory may store instructions that, when executed by the at least one processor, cause the transaction exchange platform to receive a third transaction object, corresponding to a third payment transaction, that includes third transaction details. The memory may store instructions that, when executed by the at least one processor, cause the transaction exchange platform to determine, by the screening microservice, whether the third transaction object is a duplicate payment transaction by comparing the third transaction details to the data structure. Based on a determination that the third transaction details do not overlap with the transaction details of the plurality of payment transactions, the memory may store instructions that, when executed by the at least one processor, cause the transaction exchange platform to add the third transaction object to the streaming data platform. In some instances, the memory may store instructions that, when executed by the at least one processor, cause the transaction exchange platform to determine, by the client registry microservice and prior to prepending the client identifier to the identification token, whether the first payment transaction is permitted based on one or more rules, such as regulatory-based rules.

According to some aspects, one or more non-transitory computer readable media may comprise instructions that, when executed by at least one processor, cause a transaction exchange platform to perform steps. Those steps may comprise receiving a first transaction object corresponding to a first payment transaction, wherein the first transaction object comprises first transaction details; determining, by a screening microservice, whether the first transaction object is a duplicate payment transaction by comparing the first transaction details to a data structure comprising transaction details of a plurality of payment transactions; sending, by the screening microservice to a first user device, a request inquiring whether the first payment transaction is a duplicate of the second payment transaction based on a determination that the first transaction details overlap with second transaction details of a second payment transaction; receiving, by the screening microservice from the first user device, a response indicating that the first payment transaction is not a duplicate of the second payment transaction; generating an identification token for the first transaction object in response to receiving the response; adding the first transaction object to a streaming data platform, wherein adding the first transaction object to the streaming data platform comprises setting a current workflow stage of the first transaction object to a pre-initialization stage; retrieving, by a client registry microservice and based on a current workflow stage indicating the pre-initialization stage, a plurality of transaction objects, wherein the plurality of transaction objects comprises the first transaction object; prepending, by the client registry microservice and based on a determination that the first payment transaction is permitted, a client identifier to the identification token to generate a first transaction identifier; updating, by the client registry microservice, the current workflow stage of the first transaction object to an initialization state; adding, by the client registry microservice, the updated first transaction object to the streaming data platform; removing the updated first transaction object from the streaming data platform and outputting the updated first transaction object to a validation platform based on a determination that the current workflow stage of the updated first transaction object indicates that the updated first transaction object has completed processing; and determining, by the validation platform, whether a format of the first transaction is valid; appending a batch identifier to the first transaction identifier and add the first transaction to a file based on determination that the format of the first transaction is valid; and uploading the file to a portal to initiate the first transaction and a plurality of transactions contained in the file.

Figure 20:
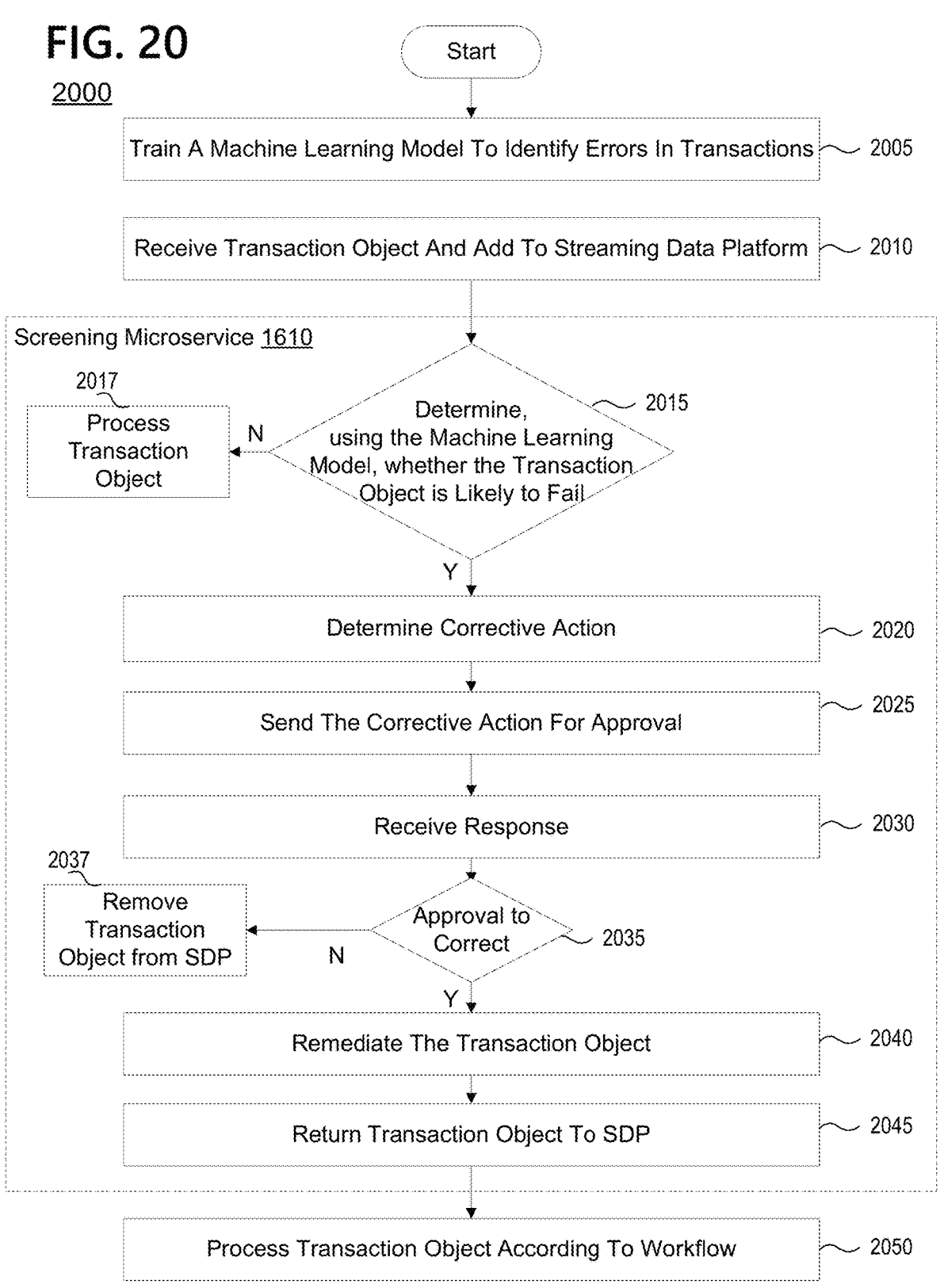
FIG. 20 depicts an illustrative method for determining whether a payment transaction is likely to be processed successfully according to one or more aspects of the disclosure.

FIG. 20 depicts an illustrative method 2000 for determining whether a payment transaction is likely to be processed successfully according to one or more aspects of the disclosure. Method 2000 may be performed by any suitable computing device and/or combination of computing devices, referred to as the system implementing method 2000.

In step 2005, a computing device may train one or more predictive models to identify transactions that have a likelihood of failing due to one or more errors. The one or more predictive models may comprise at least one of: k-means algorithm, affinity propagation algorithm, mean-shift algorithm, spectral clustering algorithm, Ward hierarchical clustering algorithm, agglomerative clustering algorithm, density-based spatial clustering of applications with noise (DBSCAN) algorithm, Gaussian mixtures algorithm, Birch algorithm, shared nearest neighbor algorithm, or an equivalent thereof. The training data (e.g., training dataset) may comprise transaction details associated with a plurality of payment transactions that failed and a reason why each of the plurality of transactions failed. The transaction details associated with the plurality of payment transactions that failed may include an identification of a payor, an identification of a payee, a dollar amount of a transaction, a time of the transaction, an identification of a type of platform on which the transaction occurs, a type of product transaction code, core attributes of the transaction, and/or a return code or equivalent code indicating the reason the transaction failed. Based on this training data, the one or more predictive models may be trained using supervised learning, unsupervised learning, back propagation, transfer learning, stochastic gradient descent, learning rate decay, dropout, max pooling, batch normalization, long short-term memory, skip-gram, or any equivalent deep learning technique. Once the one or more predictive models are trained, the one or more predictive models may be exported and/or deployed in the transaction exchange platform. In particular, the one or more predictive models may be deployed in screening microservice 1610 to identify transactions that have a likelihood of failing due to one or more errors. The likelihood of failure may be indicated by a probability or a percentage.

After the one or more predictive models have been trained and deployed, processing of transaction objects may occur according to the techniques described above. For example, the transaction exchange platform may receive a first transaction object, in step 2010. In step 2015, the transaction exchange platform (e.g., screening microservice 1610 executing on the transaction exchange platform) may determine whether first transaction details associated with the first transaction object indicate that processing of the first transaction object is likely to fail. Determining whether a first transaction object is going to fail may include identifying one or more issues with the first transaction details.

For example, screening microservice 1610 may determine that a first account associated with a payor does not comprise sufficient funds to cover a first transaction associated with the first transaction object. In another example, screening microservice 1610 may determine that the first transaction details do not identify an account associated with a payor and/or a payee. In yet another example, screening microservice 1610 may determine that the first transaction details do not comport with a first workflow for processing the first transaction object. If screening microservice 1610 determines that the first transaction object is not likely to fail or generate errors, screening microservice 1610 may update the current workflow stage of the first transaction object according to the techniques described above and add the first transaction object to the SDP, where it can be processed according to its workflow in step 2017.

However, when screening microservice 1610 determines that the first transaction object is likely to fail or generate errors, screening microservice 1610 may determine a corrective action for the first transaction object, in step 2020. To continue the examples above, the corrective action may comprise transferring funds from a second account to the first account, changing the account information to identify an account that has sufficient funds, and/or crediting the first account for the shortfall. Another corrective action may include updating information associated with the account to correctly identify an account associated with the payor and/or the payee. Yet another corrective action may include changing a workflow type of the first transaction object to a second workflow that comports with the first transaction details included in the first transaction object.

In step 2025, screening microservice 1610 may send an indication that processing of the first transaction object is likely to fail to a first user device. The indication may also indicate the reason for why the transaction is likely going to fail. In some embodiments, the indication may also include a corrective action to remediate the reason for the failure or error. In step 2030, screening microservice 1610 may receive a response from the first user device. In step 2035, the screening microservice 1610 may determine whether the response includes an approval for the corrective action. When the response does not include an approval for the corrective action, screening microservice 1610 may remove the first transaction object from the SDP in step 2037. However, when the response comprises an approval for the corrective action, screening microservice 1610 may remediate the first transaction action, in step 2040. Remediating the first transaction object may include adding, or updating, addenda data associated with the first transaction object. After the first transaction object has been remediated, screening microservice 1610 may set a current workflow stage of the first transaction object to an initialization stage and add the first transaction object to the SDP, in step 2045. In step 2050, the first transaction object may be processed by the transaction exchange platform in accordance with a workflow.

Thus, according to some embodiments, a computer-implemented method may train a predictive model to identify payment transactions that have a likelihood of failing due to one or more errors. The predictive model may comprise at least one of: k-means algorithm, affinity propagation algorithm, mean-shift algorithm, spectral clustering algorithm, Ward hierarchical clustering algorithm, agglomerative clustering algorithm, density-based spatial clustering of applications with noise (DBSCAN) algorithm, Gaussian mixtures algorithm, Birch algorithm, or shared nearest neighbors algorithm. A dataset for training the predictive model may comprise transaction details associated with a plurality of payment transactions that failed and a reason each of the plurality of transactions failed. The transaction details associated with the plurality of payment transactions that failed may comprise at least one of: an identification of a payor, an identification of a payee, a dollar amount of a transaction, a time of the transaction, an identification of a type of platform on which the transaction occurs, a type of product transaction code, or core attributes of the transaction. The reason the transaction failed may comprise a return code.

The computer-implemented method may receive, by a transaction exchange platform, a first transaction object corresponding to a first payment transaction, wherein the first transaction object comprises first transaction details. The computer-implemented method may determine, by a screening microservice and using the predictive model, whether the first transaction details indicate that processing of the first transaction object is likely to fail. Determining whether the transaction details indicate that processing of the first transaction object is likely to fail may comprise determining that a likelihood is higher than a threshold. The determination that the first transaction details indicate a likelihood that processing of the first transaction object is going to fail may comprise determining, by the screening microservice, that a first account associated with a payor does not comprise sufficient funds to cover a first transaction associated with the first transaction object. Additionally or alternatively, the determination that the first transaction details indicate a likelihood that processing of the first transaction object is going to fail may comprise determining, by the screening microservice, that the first transaction details do not identify an account associated with a payor. The determination that the first transaction details indicate a likelihood that processing of the first transaction object is going to fail may comprise determining, by the screening microservice, that the first transaction details do not identify an account associated with a payee. The determination that the first transaction details indicate a likelihood that processing of the first transaction object is going to fail may comprise determining, by the screening microservice, that the first transaction details do not comport with a first workflow for processing the first transaction object.

When a determination is made that the first transaction details indicate a likelihood that processing of the first transaction object is going to fail, the computer-implemented method may determine a corrective action to reduce the likelihood that processing of the first transaction object is going to fail. The corrective action may comprise transferring funds from a second account to a first account, updating information associated with the account to correctly identify an account associated with the payor, updating information associated with the account to correctly identify an account associated with the payee, changing a workflow type of the first transaction object to a second workflow, etc. The computer-implemented method may send, by the screening microservice to a first user device, an indication that processing of the first transaction object is likely to fail and the corrective action. The computer-implemented method may receive, by the screening microservice from the first user device, a response indicating acceptance of the corrective action. The computer-implemented method may update, by the screening microservice and based on the response indicating acceptance of the corrective action, addenda data associated with the first transaction object, and add, by the screening microservice, the first transaction object with updated addenda data to a streaming data platform, wherein adding the first transaction object to the streaming data platform comprises setting a current workflow stage of the first transaction object to an initialization stage.

According to some aspects, a transaction exchange platform may comprise a streaming data platform, a plurality of microservices, at least one processor, and memory. The plurality of microservices may comprise at least a first microservice, and a screening microservice. The memory may store instructions that, when executed by the at least one processor, cause the transaction exchange platform to train a predictive model to identify payment transactions that have a likelihood of failing due to one or more errors. The predictive model may comprise at least one of: k-means algorithm, affinity propagation algorithm, mean-shift algorithm, spectral clustering algorithm, Ward hierarchical clustering algorithm, agglomerative clustering algorithm, density-based spatial clustering of applications with noise (DBSCAN) algorithm, Gaussian mixtures algorithm, Birch algorithm, or shared nearest neighbors algorithm. A dataset for training the predictive model may comprise transaction details associated with a plurality of payment transactions that failed and a reason each of the plurality of transactions failed. The transaction details associated with the plurality of payment transactions that failed may comprise at least one of: an identification of a payor, an identification of a payee, a dollar amount of a transaction, a time of the transaction, an identification of a type of platform on which the transaction occurs, a type of product transaction code, or core attributes of the transaction. The reason the transaction failed may comprise a return code.

The memory may store instructions that, when executed by the at least one processor, cause the transaction exchange platform to receive a first transaction object corresponding to a first payment transaction, wherein the first transaction object comprises first transaction details. The memory may store instructions that, when executed by the at least one processor, cause the transaction exchange platform to determine, by a screening microservice and using the predictive model, whether the first transaction details indicate that processing of the first transaction object is likely to fail. Determining whether the transaction details indicate that processing of the first transaction object is likely to fail may comprise determining that a likelihood is higher than a threshold. The determination that the first transaction details indicate a likelihood that processing of the first transaction object is going to fail may comprise determining, by the screening microservice, that a first account associated with a payor does not comprise sufficient funds to cover a first transaction associated with the first transaction object. Additionally or alternatively, the determination that the first transaction details indicate a likelihood that processing of the first transaction object is going to fail may comprise determining, by the screening microservice, that the first transaction details do not identify an account associated with a payor. The determination that the first transaction details indicate a likelihood that processing of the first transaction object is going to fail may comprise determining, by the screening microservice, that the first transaction details do not identify an account associated with a payee. The determination that the first transaction details indicate a likelihood that processing of the first transaction object is going to fail may comprise determining, by the screening microservice, that the first transaction details do not comport with a first workflow for processing the first transaction object.

When a determination is made that the first transaction details indicate a likelihood that processing of the first transaction object is going to fail, the memory may store instructions that, when executed by the at least one processor, cause the transaction exchange platform to determine a corrective action to reduce the likelihood that processing of the first transaction object is going to fail. The corrective action may comprise transferring funds from a second account to a first account, updating information associated with the account to correctly identify an account associated with the payor, updating information associated with the account to correctly identify an account associated with the payee, changing a workflow type of the first transaction object to a second workflow, etc. The memory may store instructions that, when executed by the at least one processor, cause the transaction exchange platform to send, by the screening microservice to a first user device, an indication that processing of the first transaction object is likely to fail and the corrective action. The memory may store instructions that, when executed by the at least one processor, cause the transaction exchange platform to receive, by the screening microservice from the first user device, a response indicating acceptance of the corrective action. The memory may store instructions that, when executed by the at least one processor, cause the transaction exchange platform to update, by the screening microservice and based on the response indicating acceptance of the corrective action, addenda data associated with the first transaction object, and add, by the screening microservice, the first transaction object with updated addenda data to a streaming data platform, wherein adding the first transaction object to the streaming data platform comprises setting a current workflow stage of the first transaction object to an initialization stage.

According to some aspects, one or more non-transitory computer readable media may comprise instructions that, when executed by at least one processor, cause a transaction exchange platform to perform steps. Those steps may comprise training a predictive model to identify payment transactions that have a likelihood of failing due to one or more errors, wherein a dataset for training the predictive model comprises: transaction details associated with a plurality of payment transactions that failed and a reason each of the plurality of transactions failed; receiving a first transaction object corresponding to a first payment transaction, wherein the first transaction object comprises first transaction details; determining, by a screening microservice and using the predictive model, whether the first transaction details indicate that processing of the first transaction object is likely to fail, wherein determining whether the transaction details indicate that processing of the first transaction object is likely to fail comprises determining that a likelihood is higher than a threshold; determining a corrective action to reduce the likelihood that processing of the first transaction object is going to fail based on a determination that the first transaction details indicate a likelihood that processing of the first transaction object is going to fail; sending, by the screening microservice to a first user device, an indication that processing of the first transaction object is likely to fail and the corrective action; receiving, by the screening microservice from the first user device, a response indicating acceptance of the corrective action; updating, by the screening microservice and based on the response indicating acceptance of the corrective action, addenda data associated with the first transaction object; and adding, by the screening microservice, the first transaction object with updated addenda data to a streaming data platform, wherein adding the first transaction object to the streaming data platform comprises setting a current workflow stage of the first transaction object to an initialization stage.

Figure 21:
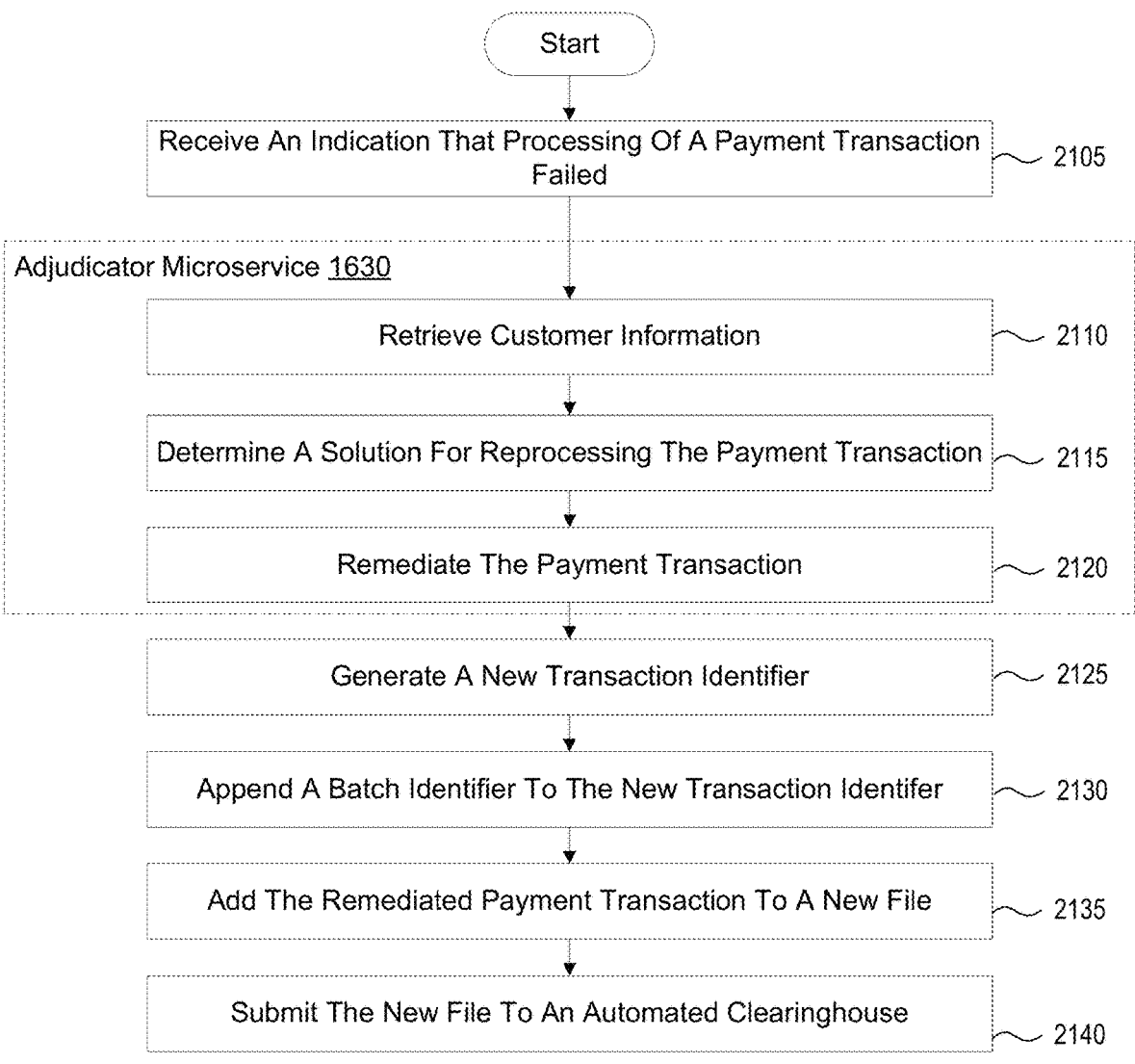
FIG. 21 depicts an illustrative method for reprocessing a payment transaction after the payment transaction has been rejected by a clearinghouse in accordance with one or more aspects of the disclosure.

As discussed above, occasionally the validation platform and/or the clearinghouse may indicate that processing of a transaction has failed. FIG. 21 depicts an illustrative method for reprocessing a payment transaction after the payment transaction has been rejected by a clearinghouse in accordance with one or more aspects of the disclosure. Method 2100 may be performed by any suitable computing device and/or combination of computing devices, referred to as the system implementing method 2100.

In step 2105, a transaction exchange platform may receive an indication that processing of the first payment transaction has failed. The indication may comprise a first transaction identifier and a code identifying a reason that processing of the first transaction object failed. In step 2110, and in response to receiving the indication that processing has failed, the transaction exchange platform (e.g., adjudicator microservice 1630 executing on the transaction exchange platform) may retrieve customer information associated with the first payment transaction. The client identifier included in the first transaction identifier may be used to retrieve the customer information. Additionally, the customer information may include at least one of a customer name, an account number associated with a checking account, a routing number associated with the checking account, a balance of the checking account, an account number associated with a savings account, a routing number associated with the savings account, or a balance of the savings account. Based on the code identifying the reason that processing of the first payment transaction failed and based on the customer information, the transaction exchange platform may determine a solution for reprocessing the transaction, in step 2115. The solution may be determined using one or more machine learning models trained to resolve issues with failed transactions. According to one example, the solution for reprocessing the payment transaction may comprise determining the return code. For example, if the return code indicates that the first payment transaction failed due to insufficient funds in the payor's account, adjudicator microservice 1630 may determine whether sufficient funds to cover the first payment transaction exist in a different account of the payor. If adjudicator microservice 1630 determines that sufficient funds exist in the different account, adjudicator microservice 1630 may transfer funds between the accounts before submitting the transaction for further processing by the clearinghouse. In another example, adjudicator microservice 1630 may determine to change the account from which payment is remitted. Accordingly, adjudicator microservice 1630 may send, to a first user device, a request to process the payment transaction using the different account. Adjudicator microservice 1630 may receive, from the user device, a response indicating approval to process the payment transaction using the different account. In response to the approval, adjudicator microservice 1603 may update the transaction details to indicate payment from the different account. Additionally or alternatively, adjudicator microservice 1630 may determine whether the account has overdraft protection, for example, in response to determining that the account has insufficient funds for the payment transaction. In this example, adjudicator microservice 1630 may cause the account to be credited funds in response to a determination that the account has overdraft protection.

In some cases, adjudicator microservice may determine that the return code indicates an issue with the account associated with the payment transaction. The code indicating the issue with the account may include an indication that the account is closed, the account is unable to be located or does not exist, or the account has an invalid account number. Adjudicator microservice 1630 may correct the account number, if the account number is invalid. Additionally or alternatively, adjudicator microservice 1630 may determine whether the customer has a different account to remit payment from. If so, adjudicator microservice 1630 may update the first transaction details to indicate payment from the different account prior to resubmitting the transaction for additional processing. As noted above, adjudicator microservice 1630 may seek user approval before changing the account from which the payment is made. In step 2120, adjudicator microservice 1630 may remediate the transaction. As noted above with respect to step 2040, remediating the transaction may include adding, or updating, addenda data associated with the transaction object. Remediation of the transaction may be based on the solutions determined above in step 2115.

In step 2125, the transaction exchange platform may generate a new transaction identifier for the transaction. The new transaction identifier may be based on the client identifier, a second version number, and/or the identification token. The transaction exchange platform may submit the transaction to the validation platform for further processing. The validation platform may perform any of the validity checks described above. In response to passing the validity checks, the validation platform may generate a new batch identifier that is different from the prior batch identifier. In step 2130, the new batch identifier may be appended to the second transaction identifier. In step 2135, the remediated payment transaction may be added to a new file. The new file may be submitted to the clearinghouse for processing, in step 2140. As noted above, submitting the new file to the automated clearinghouse may comprise uploading the second file to the portal to re-initiate the processing of the transaction.

Thus, according to some embodiments, a computer-implemented method may receive a first transaction object corresponding to a first payment transaction. The first transaction object may comprise first transaction details. The computer-implemented method may generate an identification token for the first transaction object based on a determination that the first payment transaction is not a duplicate payment transaction. The computer-implemented method may add the first transaction object to a streaming data platform. Adding the first transaction object to the streaming data platform may comprise setting a current workflow stage of the first transaction object to a pre-initialization stage. The computer-implemented method may retrieve, by a client registry microservice and based on a current workflow stage indicating the pre-initialization stage, a plurality of transaction objects, including the first transaction object. The computer-implemented method may prepend, by the client registry microservice, a client identifier and a first version number to the identification token to generate a first transaction identifier. The computer-implemented method may update, by the client registry microservice, the current workflow stage of the first transaction object to an initialization state. The computer-implemented method may add, by the client registry microservice, the updated first transaction object to the streaming data platform. The computer-implemented method may remove the updated first transaction object from the streaming data platform and output the updated first transaction object to a validation platform based on a determination that the current workflow stage of the updated first transaction object indicates that the updated first transaction object has completed processing. The computer-implemented method may append a first batch identifier to the first transaction identifier and add the first payment transaction to a first file based on a determination that a format of the updated first transaction object is valid. The computer-implemented method may upload the first file to a portal to initiate the first payment transaction and a plurality of transactions contained in the first file. The computer-implemented method may receive, by a streaming data platform and from an automated clearinghouse network, an indication that processing of the first payment transaction failed. The indication may comprise the first transaction identifier and a code identifying a reason that processing of the first transaction object failed. The code indicating an issue with a first account associated with the transaction may comprise at least one of: an indication that the first account is closed; an indication that the first account is unable to be located or does not exist; or an indication that the first account has an invalid account number. The computer-implemented method may retrieve, by an adjudicator microservice and based on the client identifier associated with the first transaction identifier, customer information. The customer information may comprise at least one of: a customer name, an account number associated with a checking account, a routing number associated with the checking account, a balance of the checking account, an account number associated with a savings account, a routing number associated with the savings account, or a balance of the savings account.

Based on the code identifying the reason that processing of the first payment transaction failed and based on the customer information, the computer-implemented method may determine a solution for reprocessing the transaction using one or more machine learning models trained to resolve issues with failed transactions. The solution for reprocessing the first payment transaction may comprise determining, by the adjudicator microservice and based on the code indicating that the first payment transaction failed due to insufficient funds, whether sufficient funds to cover the first payment transaction exist in a first account. The computer-implemented method may then transfer, by the adjudicator microservice and based on a determination that sufficient funds exist in the first account, funds from the first account to a second account prior to submitting the second file for processing by the automated clearinghouse.

The solution for reprocessing the first payment transaction may comprise determining, by the adjudicator microservice and based on the code indicating that the first payment transaction failed due to insufficient funds, whether sufficient funds to cover the first payment transaction exist in a first account. The computer-implemented method may send, by the adjudicator microservice to a first user device, a request to process the first payment transaction using the first account. The computer-implemented method may receive, by the adjudicator microservice from the first user device, a response indicating approval to process the first payment transaction using the first account. The computer-implemented method may update, by the adjudicator microservice and prior to submitting the second file for processing by the automated clearinghouse, the first transaction details to indicate payment from the first account.

The solution for reprocessing the first payment transaction may comprise determining, by the adjudicator microservice and based on the code indicating that the first payment transaction failed due to insufficient funds, whether an account associated with the first payment transaction comprises overdraft protection. The computer-implemented method may then credit, based on a determination that the account associated with the first payment transaction comprises overdraft protection, funds to the account prior to submitting the second file for processing by the automated clearinghouse.

The solution for reprocessing the first payment transaction may comprise determining, by the adjudicator microservice and based on the code indicating an issue with an account associated with the first payment transaction, whether the customer has a different account. The computer-implemented method may then update, by the adjudicator microservice and prior to submitting the second file for processing by the automated clearinghouse, the first transaction details to indicate payment from the different account.

After a solution is determined, the computer-implemented method may generate a second transaction identifier based on the client identifier, a second version number, and the identification token. The computer-implemented method may append a second batch identifier to the second transaction identifier and add the first payment transaction to a second file. The computer-implemented method may submit, by the adjudicator microservice to the automated clearinghouse network, the second file for processing by the automated clearinghouse.

In some examples, the computer-implemented method may send, by the adjudicator microservice to a first user device, a request to process the first payment transaction using the different account. The computer-implemented method may receive, by the adjudicator microservice from the first user device, a response indicating approval to process the first payment transaction using the different account.

According to some aspects, a transaction exchange platform may comprise a streaming data platform, a plurality of microservices, at least one processor, and memory. The plurality of microservices may comprise at least a first microservice, a client registry microservice, and/or an adjudicator microservice. The memory may store instructions that, when executed by the at least one processor, cause the transaction exchange platform to receive a first transaction object corresponding to a first payment transaction. The first transaction object may comprise first transaction details. The memory may store instructions that, when executed by the at least one processor, cause the transaction exchange platform to generate an identification token for the first transaction object based on a determination that the first payment transaction is not a duplicate payment transaction. The memory may store instructions that, when executed by the at least one processor, cause the transaction exchange platform to add the first transaction object to a streaming data platform. Adding the first transaction object to the streaming data platform may comprise setting a current workflow stage of the first transaction object to a pre-initialization stage. The memory may store instructions that, when executed by the at least one processor, cause the transaction exchange platform to retrieve, by a client registry microservice and based on a current workflow stage indicating the pre-initialization stage, a plurality of transaction objects, including the first transaction object. The memory may store instructions that, when executed by the at least one processor, cause the transaction exchange platform to prepend by the client registry microservice, a client identifier and a first version number to the identification token to generate a first transaction identifier. The memory may store instructions that, when executed by the at least one processor, cause the transaction exchange platform to update, by the client registry microservice, the current workflow stage of the first transaction object to an initialization state. The memory may store instructions that, when executed by the at least one processor, cause the transaction exchange platform to add, by the client registry microservice, the updated first transaction object to the streaming data platform. The memory may store instructions that, when executed by the at least one processor, cause the transaction exchange platform to remove the updated first transaction object from the streaming data platform and output the updated first transaction object to a validation platform based on a determination that the current workflow stage of the updated first transaction object indicates that the updated first transaction object has completed processing. The memory may store instructions that, when executed by the at least one processor, cause the transaction exchange platform to append a first batch identifier to the first transaction identifier and add the first payment transaction to a first file based on a determination that a format of the updated first transaction object is valid. The memory may store instructions that, when executed by the at least one processor, cause the transaction exchange platform to upload the first file to a portal to initiate the first payment transaction and a plurality of transactions contained in the first file. The memory may store instructions that, when executed by the at least one processor, cause the transaction exchange platform to receive, by a streaming data platform and from an automated clearinghouse network, an indication that processing of the first payment transaction failed. The indication may comprise the first transaction identifier and a code identifying a reason that processing of the first transaction object failed. The code indicating an issue with a first account associated with the transaction may comprise at least one of: an indication that the first account is closed; an indication that the first account is unable to be located or does not exist; or an indication that the first account has an invalid account number. The memory may store instructions that, when executed by the at least one processor, cause the transaction exchange platform to retrieve, by an adjudicator microservice and based on the client identifier associated with the first transaction identifier, customer information. The customer information may comprise at least one of: a customer name, an account number associated with a checking account, a routing number associated with the checking account, a balance of the checking account, an account number associated with a savings account, a routing number associated with the savings account, or a balance of the savings account.

Based on the code identifying the reason that processing of the first payment transaction failed and based on the customer information, the memory may store instructions that, when executed by the at least one processor, cause the transaction exchange platform to determine a solution for reprocessing the transaction using one or more machine learning models trained to resolve issues with failed transactions. The solution for reprocessing the first payment transaction may comprise determining, by the adjudicator microservice and based on the code indicating that the first payment transaction failed due to insufficient funds, whether sufficient funds to cover the first payment transaction exist in a first account. The memory may store instructions that, when executed by the at least one processor, cause the transaction exchange platform to transfer, by the adjudicator microservice and based on a determination that sufficient funds exist in the first account, funds from the first account to a second account prior to submitting the second file for processing by the automated clearinghouse.

The solution for reprocessing the first payment transaction may comprise determining, by the adjudicator microservice and based on the code indicating that the first payment transaction failed due to insufficient funds, whether sufficient funds to cover the first payment transaction exist in a first account. The memory may store instructions that, when executed by the at least one processor, cause the transaction exchange platform to send, by the adjudicator microservice to a first user device, a request to process the first payment transaction using the first account. The memory may store instructions that, when executed by the at least one processor, cause the transaction exchange platform to receive, by the adjudicator microservice from the first user device, a response indicating approval to process the first payment transaction using the first account. The memory may store instructions that, when executed by the at least one processor, cause the transaction exchange platform to update, by the adjudicator microservice and prior to submitting the second file for processing by the automated clearinghouse, the first transaction details to indicate payment from the first account.

The solution for reprocessing the first payment transaction may comprise determining, by the adjudicator microservice and based on the code indicating that the first payment transaction failed due to insufficient funds, whether an account associated with the first payment transaction comprises overdraft protection. The memory may store instructions that, when executed by the at least one processor, cause the transaction exchange platform to credit, based on a determination that the account associated with the first payment transaction comprises overdraft protection, funds to the account prior to submitting the second file for processing by the automated clearinghouse.

The solution for reprocessing the first payment transaction may comprise determining, by the adjudicator microservice and based on the code indicating an issue with an account associated with the first payment transaction, whether the customer has a different account. The memory may store instructions that, when executed by the at least one processor, cause the transaction exchange platform to update, by the adjudicator microservice and prior to submitting the second file for processing by the automated clearinghouse, the first transaction details to indicate payment from the different account.

After a solution is determined, the memory may store instructions that, when executed by the at least one processor, cause the transaction exchange platform to generate a second transaction identifier based on the client identifier, a second version number, and the identification token. The memory may store instructions that, when executed by the at least one processor, cause the transaction exchange platform to append a second batch identifier to the second transaction identifier and add the first payment transaction to a second file. The memory may store instructions that, when executed by the at least one processor, cause the transaction exchange platform to submit, by the adjudicator microservice to the automated clearinghouse network, the second file for processing by the automated clearinghouse.

In some examples, the memory may store instructions that, when executed by the at least one processor, cause the transaction exchange platform to send, by the adjudicator microservice to a first user device, a request to process the first payment transaction using the different account. The memory may store instructions that, when executed by the at least one processor, cause the transaction exchange platform to receive, by the adjudicator microservice from the first user device, a response indicating approval to process the first payment transaction using the different account.

According to some aspects, one or more non-transitory computer readable media may comprise instructions that, when executed by at least one processor, cause a transaction exchange platform to perform steps. Those steps may comprise receiving a first transaction object corresponding to a first payment transaction, wherein the first transaction object comprises first transaction details; generating an identification token for the first transaction object based on a determination that the first payment transaction is not a duplicate payment transaction; adding the first transaction object to a streaming data platform, wherein adding the first transaction object to the streaming data platform comprises setting a current workflow stage of the first transaction object to a pre-initialization stage; retrieving, by a client registry microservice and based on a current workflow stage indicating the pre-initialization stage, a plurality of transaction objects, wherein the plurality of transaction objects comprises the first transaction object; prepending, by the client registry microservice, a client identifier and a first version number to the identification token to generate a first transaction identifier; updating, by the client registry microservice, the current workflow stage of the first transaction object to an initialization state; adding, by the client registry microservice, the updated first transaction object to the streaming data platform; removing the updated first transaction object from the streaming data platform and outputting the updated first transaction object to a validation platform based on a determination that the current workflow stage of the updated first transaction object indicates that the updated first transaction object has completed processing; appending a first batch identifier to the first transaction identifier and adding the first payment transaction to a first file based on a determination that a format of the updated first transaction object is valid; uploading the first file to a portal to initiate the first payment transaction and a plurality of transactions contained in the first file; receiving, by a streaming data platform and from an automated clearinghouse network, an indication that processing of the first payment transaction failed, wherein the indication comprises the first transaction identifier and a code identifying a reason that processing of the first transaction object failed; retrieving, by an adjudicator microservice and based on the client identifier associated with the first transaction identifier, customer information; determining, based on the code identifying the reason that processing of the first payment transaction failed and based on the customer information, a solution for reprocessing the transaction using one or more machine learning models trained to resolve issues with failed transactions; generating a second transaction identifier based on the client identifier, a second version number, and the identification token; appending a second batch identifier to the second transaction identifier and adding the first payment transaction to a second file; and submitting, by the adjudicator microservice to the automated clearinghouse network, the second file for processing by the automated clearinghouse.

The techniques described above provide solutions to the problem of entire files being rejected by a clearinghouse. In this regard, a submission to a clearinghouse, such as the FedACH system, could be worth up to $10 B. Accordingly, any delays of processing the submission could result in reputational harm, as well as the loss of large sums of money. Additionally, the delays and man-hours required to identify and correct the error could lead to further loss. Accordingly, the techniques described herein allow for a computing system to recognize duplicates and/or errors, take corrective action when duplicates and/or errors are detected, generate unique identifiers to detect and/or avoid duplicate transactions, and remediate one or more transactions when they are rejected by a clearinghouse. Each of these processes improves the efficiency and efficacy with which transaction are processed, thereby improving the overall functionality of the transaction exchange platform. Specifically, the techniques, examples, and/or embodiments described above provide several solutions to detect and prevent duplicate transactions in transaction files and detect errors with transactions. These solutions ensure efficient processing of transaction files by downstream processors (e.g., FedACH system).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:

retrieving, by a client registry microservice from a streaming data platform and based on a workflow stage of a first transaction object being set to a pre-initialization stage, a plurality of transaction objects, wherein the plurality of transaction objects comprises a first transaction object associated with a first payment transaction;

determining, by a screening microservice and using a predictive model, whether first transaction details associated with the first payment transaction indicate a likelihood that processing of the first transaction object is going to occur without errors;

prepending, by the client registry microservice and based on a determination that processing of the first payment transaction is likely to succeed without errors, a client identifier to an identification token, associated with the first transaction object, to generate a first transaction identifier;

updating, by the client registry microservice, the workflow stage of the first transaction object to an initialization state;

based on a determination that the workflow stage of the first transaction object indicates that the transaction object has completed processing, removing the first transaction object from the streaming data platform and outputting the first transaction object to a validation platform;

based on a determination that a format of the first payment transaction is valid, appending a batch identifier to the first transaction identifier and adding the first payment transaction to a file; and uploading the file to a portal to initiate the first payment transaction and a plurality of transactions contained in the file.

2. The computer-implemented method of claim 1, further comprising:

receiving, in response to uploading the file to the portal, an indication that processing of the file has failed;

based on the indication that processing of the file has failed, generating, by the validation platform, a second batch identifier, wherein the second batch identifier is different from the batch identifier;

appending the second batch identifier to the first transaction identifier and adding the first payment transaction to a second file; and uploading the second file to the portal to re-initiate the first payment transaction.

3. The computer-implemented method of claim 1, wherein the identification token is generated using a hash function.

4. The computer-implemented method of claim 3, wherein the identification token comprises a predetermined number of most significant bits of a resultant of the hash function.

5. The computer-implemented method of claim 1, wherein:

the first payment transaction is an Automated Clearing House (ACH) transaction; and the file is a National Automated Clearing House Association (NACHA) file.

6. The computer-implemented method of claim 1, further comprising:

determining, by the screening microservice, whether the first transaction object is a duplicate payment transaction by comparing the first transaction details to a data structure comprising transaction details of a plurality of payment transactions; wherein the generating the identification token for the first transaction object is further based on a determination that the first transaction object is not a duplicate of the plurality of payment transactions; and adding the first transaction object to a streaming data platform, wherein adding the first transaction object to the streaming data platform comprises setting a workflow stage of the first transaction object to the pre-initialization stage.

7. The computer-implemented method of claim 6, wherein the determination that the first transaction object is not a duplicate of the plurality of payment transactions is based on a number of the first transaction details not matching a number of transaction details associated with any of the plurality of payment transactions.

8. A transaction exchange platform comprising:

at least one processor; and memory storing instructions that, when executed by the at least one processor, cause the transaction exchange platform to:

retrieve, by a client registry microservice from a streaming data platform and based on a workflow stage of a first transaction object being set to a pre-initialization stage, a plurality of transaction objects, wherein the plurality of transaction objects comprises a first transaction object associated with a first payment transaction;

determine, by a screening microservice and using a predictive model, whether first transaction details associated with the first payment transaction indicate a likelihood that processing of the first transaction object is going to occur without errors;

prepend, by the client registry microservice and based on a determination that processing of the first payment transaction is likely to succeed without errors, a client identifier to an identification token, associated with the first transaction object, to generate a first transaction identifier;

update, by the client registry microservice, the workflow stage of the first transaction object to an initialization state;

based on a determination that the workflow stage of the first transaction object indicates that the transaction object has completed processing, remove the first transaction object from the streaming data platform and outputting the first transaction object to a validation platform;

based on a determination that a format of the first payment transaction is valid, append a batch identifier to the first transaction identifier and add the first payment transaction to a file; and upload the file to a portal to initiate the first payment transaction and a plurality of transactions contained in the file.

9. The transaction exchange platform of claim 8, wherein the instructions that, when executed by the at least one processor, cause the transaction exchange platform to:

receive, in response to uploading the file to the portal, an indication that processing of the file has failed;

based on the indication that processing of the file has failed, generate, by the validation platform, a second batch identifier, wherein the second batch identifier is different from the batch identifier;

append the second batch identifier to the first transaction identifier and add the first payment transaction to a second file; and upload the second file to the portal to re-initiate the first payment transaction.

10. The transaction exchange platform of claim 8, wherein the identification token is generated using a hash function.

11. The transaction exchange platform of claim 10, wherein the identification token comprises a predetermined number of most significant bits of a resultant of the hash function.

12. The transaction exchange platform of claim 8, wherein:

the first payment transaction is an Automated Clearing House (ACH) transaction; and the file is a National Automated Clearing House Association (NACHA) file.

13. The transaction exchange platform of claim 8, wherein the instructions that, when executed by the at least one processor, cause the transaction exchange platform to:

determine, by the screening microservice, whether the first transaction object is a duplicate payment transaction by comparing first transaction details associated with the first payment transaction to a data structure comprising transaction details of a plurality of payment transactions, wherein generating the identification token for the first transaction object is further based on a determination that the first transaction object is not a duplicate of the plurality of payment transactions; and add the first transaction object to a streaming data platform, wherein adding the first transaction object to the streaming data platform comprises setting a workflow stage of the first transaction object to the pre-initialization stage.

14. The transaction exchange platform of claim 13, wherein the determination that the first transaction object is not a duplicate of the plurality of payment transactions is based on a number of the first transaction details not matching a number of transaction details associated with any of the plurality of payment transactions.

15. One or more non-transitory computer-readable media comprising instructions that, when executed, cause a transaction exchange platform to:

retrieve, by a client registry microservice from a streaming data platform and based on a workflow stage of a first transaction object being set to a pre-initialization stage, a plurality of transaction objects, wherein the plurality of transaction objects comprises a first transaction object associated with a first payment transaction;

determine, by a screening microservice and using a predictive model, whether first transaction details associated with the first payment transaction indicate a likelihood that processing of the first transaction object is going to occur without errors;

prepend, by the client registry microservice and based on a determination that processing of the first payment transaction is likely to succeed without errors, a client identifier to an identification token, associated with the first transaction object, to generate a first transaction identifier;

update, by the client registry microservice, the workflow stage of the first transaction object to an initialization state;

based on a determination that the workflow stage of the first transaction object indicates that the transaction object has completed processing, remove the first transaction object from the streaming data platform and outputting the first transaction object to a validation platform;

based on a determination that a format of the first payment transaction is valid, append a batch identifier to the first transaction identifier and add the first payment transaction to a file; and upload the file to a portal to initiate the first payment transaction and a plurality of transactions contained in the file.

16. The one or more non-transitory computer-readable media of claim 15, wherein the instructions that, when executed, cause the transaction exchange platform to:

receive, in response to uploading the file to the portal, an indication that processing of the file has failed;

based on the indication that processing of the file has failed, generate, by the validation platform, a second batch identifier, wherein the second batch identifier is different from the batch identifier;

append the second batch identifier to the first transaction identifier and adding add the first payment transaction to a second file; and upload the second file to the portal to re-initiate the first payment transaction.

17. The one or more non-transitory computer-readable media of claim 15, wherein the identification token comprises a predetermined number of most significant bits of a hash function.

18. The one or more non-transitory computer-readable media of claim 15, wherein:

the first payment transaction is an Automated Clearing House (ACH) transaction; and the file is a National Automated Clearing House Association (NACHA) file.

19. The one or more non-transitory computer-readable media of claim 15, wherein the instructions that, when executed, cause the transaction exchange platform to:

determine, by a screening microservice of the streaming data platform, whether the first transaction object is a duplicate payment transaction by comparing first transaction details associated with the first payment transaction to a data structure comprising transaction details of a plurality of payment transactions, wherein generating;

the identification token for the first transaction object is further based on a determination that the first transaction object is not a duplicate of the plurality of payment transactions; and add the first transaction object to a streaming data platform, wherein adding the first transaction object to the streaming data platform comprises setting a workflow stage of the first transaction object to the pre-initialization stage.

20. The one or more non-transitory computer-readable media of claim 19, wherein the determination that the first transaction object is not a duplicate of the plurality of payment transactions is based on a number of the first transaction details not matching a number of transaction details associated with any of the plurality of payment transactions.

\* \* \* \* \*